US012762264B2

(12) United States Patent
Hirano et al.

(10) Patent No.: US 12,762,264 B2
(45) Date of Patent: Oct. 13, 2026

(54) SEARCHABLE ENCRYPTION SYSTEM, DATA MANAGEMENT DEVICE, SEARCHABLE ENCRYPTION METHOD, AND COMPUTER READABLE MEDIUM

(71) Applicant: Mitsubishi Electric Corporation, Tokyo (JP)

(72) Inventors: Takato Hirano, Tokyo (JP); Yutaka Kawai, Tokyo (JP); Yoshihiro Koseki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 171 days.

(21) Appl. No.: 18/734,629

(22) Filed: Jun. 5, 2024

(65) Prior Publication Data

US 2024/0322997 A1 Sep. 26, 2024

Related U.S. Application Data

(63) Continuation of application No. PCT/JP2021/048616, filed on Dec. 27, 2021.

(51) Int. Cl.
*G06F 21/62* (2013.01)
*G06F 21/60* (2013.01)
(Continued)

(52) U.S. Cl.
CPC ........ *G06F 21/6218* (2013.01); *G06F 21/602* (2013.01); *G06F 21/62* (2013.01); *H04L 9/0819* (2013.01); *H04L 9/14* (2013.01)

(58) Field of Classification Search
CPC ............... G06F 21/6227; G06F 21/602; G06F 16/24542; G06F 16/242; G06F 21/62;
(Continued)

(56) References Cited

U.S. PATENT DOCUMENTS 8,184,813 B2 * 5/2012 Kaji ...................... H04L 9/0891 713/176
2010/0246827 A1 * 9/2010 Lauter .................. H04L 9/0836 380/278

(Continued)

FOREIGN PATENT DOCUMENTS

JP 2015-169842 A 9/2015
JP 2016-76759 A 5/2016

(Continued)

OTHER PUBLICATIONS

Hirano et al., "Key Updating in Searchable Symmetric Encryption", 2021 Symposium on Cryptography and Information Security (SCIS2021), Jan. 2021, pp. 1-8.

(Continued)

*Primary Examiner* — Shaqueal D Wade-Wright
(74) *Attorney, Agent, or Firm* — Birch, Stewart, Kolasch & Birch, LLP

(57) ABSTRACT

A registration request device (400) includes a generation unit (420) and a request unit (430). The generation unit (420) acquires a registration key of a registration secret key composed of the registration key and a registration auxiliary key, plaintext data, and a public parameter, and encrypts the plaintext data using the registration key and the public parameter so as to generate encrypted data. The registration secret key is generated using a master key and the public parameter, and is composed of the registration key used for encrypting data and the registration auxiliary key used for transforming encrypted data. The request unit (430) transmits the encrypted data to a data management device. The data management device transforms the encrypted data using the registration auxiliary key and the public parameter, and registers transformed encrypted data obtained by trans- (Continued)

formation in a registration database in association with an identifier that identifies the plaintext data.

13 Claims, 39 Drawing Sheets

(51) Int. Cl.
*H04L 9/08* (2006.01)
*H04L 9/14* (2006.01)

(58) Field of Classification Search
CPC ... G06F 21/604; H04L 9/0861; H04L 9/3093; H04L 9/088; H04L 9/0847; H04L 9/0866
See application file for complete search history.

(56) References Cited

U.S. PATENT DOCUMENTS

| | | | | |
|---|---|---|---|---|
| 2016/0330022 | A1* | 11/2016 | Ito | H04L 9/0825 |
| 2016/0380768 | A1* | 12/2016 | Koike | H04L 9/30 380/277 |
| 2018/0365433 | A1 | 12/2018 | Hayasaka et al. | |
| 2020/0065305 | A1* | 2/2020 | Kawai | G06F 21/6227 |
| 2021/0234684 | A1 | 7/2021 | Maruyama et al. | |
| 2022/0391351 | A1 | 12/2022 | Jimbo et al. | |
| 2023/0289345 | A1 | 9/2023 | Hirano et al. | |
| 2024/0022397 | A1* | 1/2024 | Naito | G06F 21/6209 |
| 2024/0273173 | A1* | 8/2024 | Isshiki | G06F 21/32 |

FOREIGN PATENT DOCUMENTS

| | | | |
|---|---|---|---|
| JP | 2018-22384 | A | 2/2018 |
| JP | 2021-141524 | A | 9/2021 |
| WO | WO 2017/122696 | A1 | 7/2017 |
| WO | WO 2020/003821 | A1 | 1/2020 |
| WO | WO 2021/095384 | A1 | 5/2021 |
| WO | WO 2022/153394 | A1 | 7/2022 |

OTHER PUBLICATIONS

International Search Report (PCT/ISA/210) issued in PCT/JP2021/048616, dated Mar. 22, 2022.

* cited by examiner

Fig. 15

691: REGISTRATION DATABASE

| DATA NAME (IDENTIFIER) | TRANSFORMED ENCRYPTED TAG |
|---|---|
| ID (D1) | TET1_{TOKYO}, TET1_{OSAKA} |
| ID (D2) | TET2_{OSAKA}, TET2_{AICHI} |
| ID (D3) | TET3_{TOKYO} |
| ID (D4) | TET4_{HIROSHIMA}, TET4_{KYOTO} |
| ID (D5) | TET5_{TOKYO} |
| ... | ... |

Fig. 26

INDEX SEARCH RESULT RES

| KEYWORD (w) | DATA NAME TO BE FOUND AS MATCH (res) |
|---|---|
| TOKYO | ID(D1), ID(D3) |
| OSAKA | ID(D1), ID(D2) |
| AICHI | ID(D2) |
| ... | ... |

Fig. 28

691A: REGISTRATION DATABASE

| INDEX NAME | TRANSFORMED ENCRYPTED INDEX |
| --- | --- |
| ID (EI1) | TEI1 |
| ID (IE2) | TEI2 |
| ... | ... |

SEARCHABLE ENCRYPTION SYSTEM, DATA MANAGEMENT DEVICE, SEARCHABLE ENCRYPTION METHOD, AND COMPUTER READABLE MEDIUM

CROSS REFERENCE TO RELATED APPLICATIONS

This application is a Continuation of PCT International Application No. PCT/JP2021/048616, filed on Dec. 27, 2021, all of which is hereby expressly incorporated by reference into the present application.

TECHNICAL FIELD

The present disclosure relates to a registration request device, a search request device, a data management device, a searchable encryption system, a searchable encryption method, and a searchable encryption program.

BACKGROUND ART

Searchable encryption is a technology to search for encrypted data while the encrypted data remains encrypted. That is, searchable encryption is a technology to search for encrypted data without decrypting the encrypted data.

In recent years, searchable encryption is attracting attention as a security technology for protecting confidential information from eavesdropping by server administrators and eavesdropping by malicious software in cloud services. That is, searchable encryption is attracting attention as a security technology for managing data on the Internet.

As to operation of a searchable encryption scheme, a registrant encrypts data and then stores it on a server in a registration process. In a search process, a searcher encrypts a search keyword and transmits it to the server. Then, the server checks the search keyword against data that has been encrypted and stored without decrypting the encrypted search keyword and the data so as to determine whether the search keyword matches the data.

In a cryptographic technology, keys may be periodically updated and keys that have been used may be revoked in consideration of a risk of key leakage. Therefore, it is conceivable that keys are updated and revoked also in searchable encryption.

In searchable encryption, if a key is simply replaced with a new key, data encrypted with the old key cannot be retrieved using the new key. Therefore, the old key cannot be discarded and needs to be kept after all. In addition, search keywords need to be encrypted using all the keys that are kept. Alternatively, pieces of data encrypted with the old key need to be re-encrypted with the new key so that the new key can cover all of them.

Patent Literature 1 discloses a method for controlling searchable-encryption searches performed by each user by dividing a key to be used for searchable-encryption searches into several keys and distributing them.

CITATION LIST

Patent Literature

Patent Literature 1: WO 2020/003821 A1

SUMMARY OF INVENTION

Technical Problem

In Patent Literature 1, if one of the distributed keys is disabled for a specific searcher, the searcher cannot perform searchable-encryption searches even though the searcher has the key.

In Patent Literature 1, a searcher can perform searchable-encryption searches using a divided distributed key, but a registrant does not use a divided distributed key and encrypts and registers data using a key before being divided. Therefore, a problem is that searchable-encryption searches by the searcher can be controlled, but encryption and registration of data by the registrant cannot be controlled.

Patent Literature 1 also discloses a transformation method in which encrypted data generated with an old key is re-encrypted using a proxy re-encryption technology. The proxy re-encryption technology is a technology to re-encrypt encrypted data generated with an old key so as to obtain encrypted data generated with a new key without involving decryption. It is difficult to perform searchable-encryption searches for this encrypted data, and this encrypted data is generated using well-known cryptography in order to restore original data. That is, the above re-encryption process is the re-encryption process on this encrypted data that can be decrypted. Therefore, in Patent Literature 1, a problem is that encrypted data for which searchable-encryption searches are to be performed, that is, encrypted tags and encrypted indexes cannot be re-encrypted with a new key.

Furthermore, Patent Literature 1 discloses a specific method for generating encrypted data for which searchable-encryption searches are to be performed. However, this method always generates encrypted data with the same value for the same data. Therefore, in Patent Literature 1, a problem is that it is not possible to probabilistically generate encrypted data, which is important for cryptographic security, that is, it is not possible to generate encrypted data with always different values even for the same data.

The present disclosure is primarily aimed at controlling generation of encrypted data and registration of encrypted data, using divided keys, for encrypted data for which searchable-encryption searches can be performed.

Solution to Problem

A registration request device according to the present disclosure includes a generation unit to acquire a registration key of a registration secret key, plaintext data, and a public parameter, and encrypt the plaintext data using the registration key and the public parameter so as to generate encrypted data, the registration secret key being generated using a master key and the public parameter, and being composed of the registration key used for encrypting data and a registration auxiliary key used for transforming encrypted data; and a request unit to transmit the encrypted data to a data management device that transforms the encrypted data using the registration auxiliary key and the public parameter, and registers transformed encrypted data obtained by transformation in a registration database in association with an identifier that identifies the plaintext data.

Advantageous Effects of Invention

The present disclosure provides effects such that generation of encrypted data and registration of encrypted data can be controlled, using divided keys, for encrypted data for which searchable-encryption searches can be performed.

BRIEF DESCRIPTION OF DRAWINGS

FIG. 15 is a figure illustrating an example of a configuration of a registration database according to Embodiment 1;

FIG. 26 is a figure illustrating an example of a configuration of a search result according to Embodiment 2;

FIG. 28 is a figure illustrating an example of a configuration of the registration database according to Embodiment 2;

DESCRIPTION OF EMBODIMENTS

Figure 1:
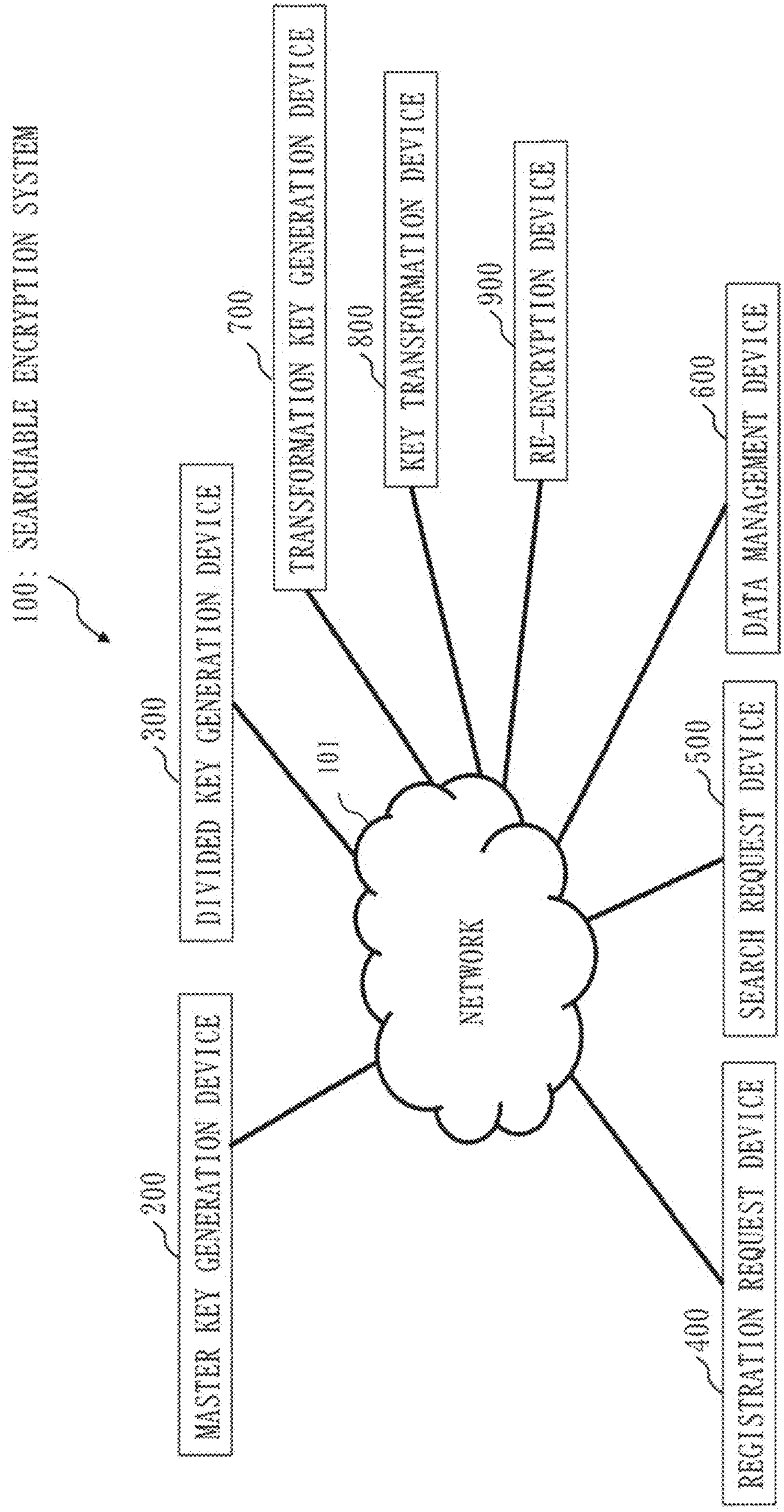
FIG. 1 is a figure illustrating an example of a configuration of a searchable encryption system according to Embodiment 1.

The embodiments will be described hereinafter with reference to the drawings. In the drawings, the same elements or corresponding elements are denoted by the same reference sign. In the description of the embodiments, description will be suitably omitted or simplified for the same or corresponding portions. Arrows in the drawings mainly indicate flows of data or flows of processing.

Embodiment 1

A searchable encryption system 100 according to this embodiment will be described based on FIGS. 1 to 22.

*Description of Configuration*

FIG. 1 is a figure illustrating an example of a configuration of the searchable encryption system 100 according to this embodiment.

The searchable encryption system 100 includes a master key generation device 200, a divided key generation device 300, a registration request device 400, a search request device 500, a data management device 600, a transformation key generation device 700, a key transformation device 800, and a re-encryption device 900.

The devices in the searchable encryption system 100 communicate with one another through a network 101.

Figure 2:
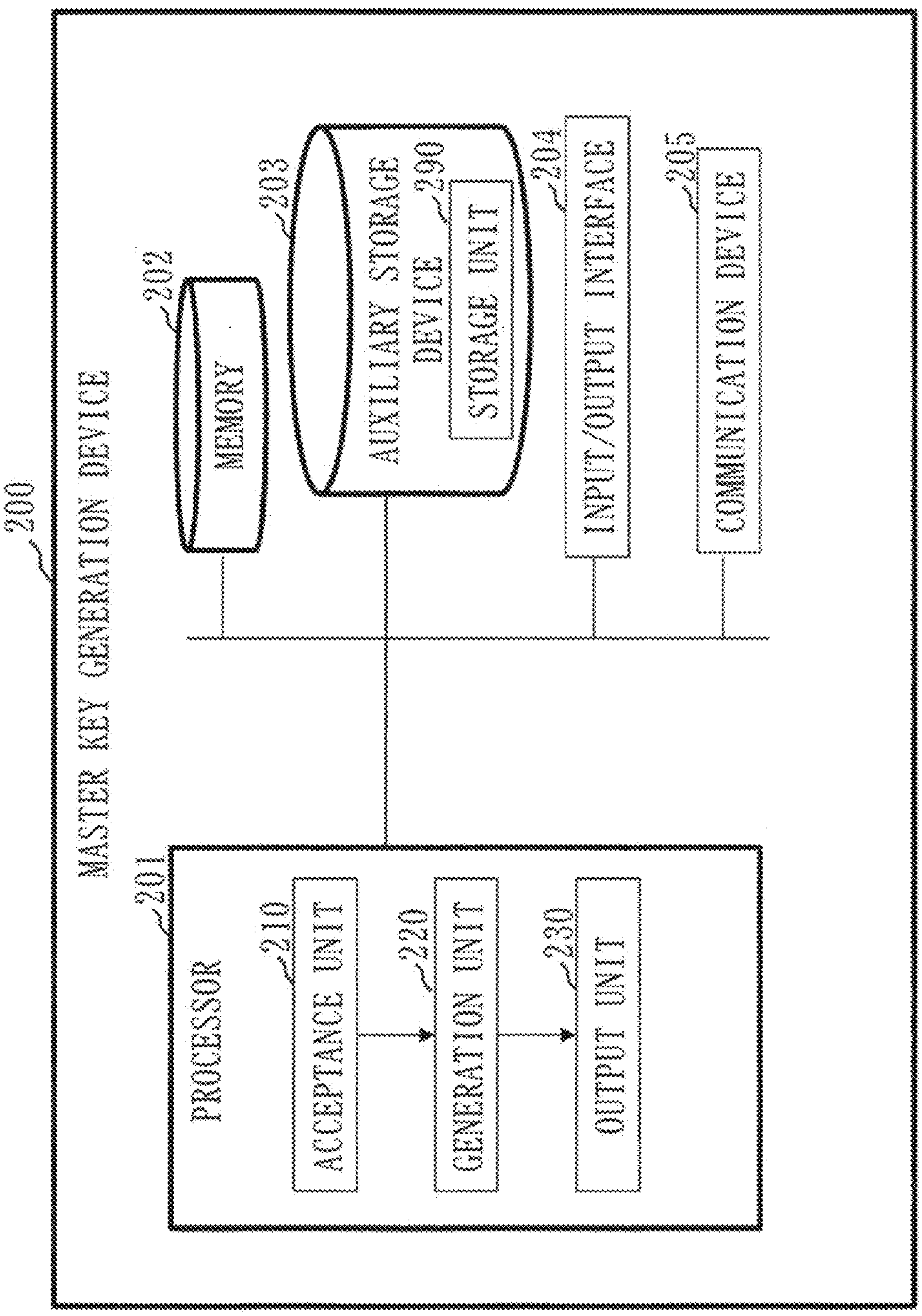
FIG. 2 is a figure illustrating an example of a configuration of a master key generation device according to Embodiment 1.

FIG. 2 is a figure illustrating an example of a configuration of the master key generation device 200 according to this embodiment.

The master key generation device 200 is a computer that includes hardware such as a processor 201, a memory 202, an auxiliary storage device 203, and an input/output interface 204. These hardware components are connected with one another through signal lines.

The processor 201 is an IC that performs operational processing and controls other hardware components. For example, the processor 201 is a CPU, a DSP, or a GPU.

IC is an abbreviation for integrated circuit.

CPU is an abbreviation for central processing unit.

DSP is an abbreviation for digital signal processor.

GPU is an abbreviation for graphics processing unit.

The memory 202 is a volatile or non-volatile storage device. The memory 202 is also called a main storage device or a main memory. For example, the memory 202 is a RAM. Data stored in the memory 202 is saved in the auxiliary storage device 203 as necessary.

RAM is an abbreviation for random access memory.

The auxiliary storage device 203 is a non-volatile storage device. For example, the auxiliary storage device 203 is a ROM, an HDD, or a flash memory. Data stored in the auxiliary storage device 203 is loaded into the memory 202 as necessary.

ROM is an abbreviation for read only memory.

HDD is an abbreviation for hard disk drive.

The input/output interface 204 is a port to which an input device and an output device are connected. For example, the input/output interface 204 is a USB terminal, the input device is a keyboard and a mouse, and the output device is a display. Input to and output from the master key generation device 200 are performed using the input/output interface 204.

USB is an abbreviation for Universal Serial Bus.

A communication device 205 is a receiver and a transmitter. For example, the communication device 205 is a communication chip or a NIC. Communication of the master key generation device 200 is performed using the communication device 205.

NIC is an abbreviation for network interface card.

The master key generation device 200 includes elements such as an acceptance unit 210, a generation unit 220, and an output unit 230. These elements are realized by software.

The auxiliary storage device 203 stores a master key generation program to cause a computer to function as the acceptance unit 210, the generation unit 220 (master key generation unit), and the output unit 230 (master key output unit). The master key generation program is loaded into the memory 202 and executed by the processor 201.

The auxiliary storage device 203 further stores an OS. At least part of the OS is loaded into the memory 202 and executed by the processor 201.

The processor 201 executes the master key generation program while executing the OS.

OS is an abbreviation for operating system.

Input data and output data of the master key generation program are stored in a storage unit 290.

The auxiliary storage device 203 functions as the storage unit 290. However, a storage device such as the memory 202, a register in the processor 201, and a cache memory in the processor 201 may function as the storage unit 290 in place of the auxiliary storage device 203 or together with the auxiliary storage device 203.

The master key generation device 200 may include a plurality of processors as an alternative to the processor 201. The plurality of processors share the functions of the processor 201.

The master key generation program can be recorded (stored) in a computer readable format in a non-volatile recording medium such as an optical disc or a flash memory.

Figure 3:
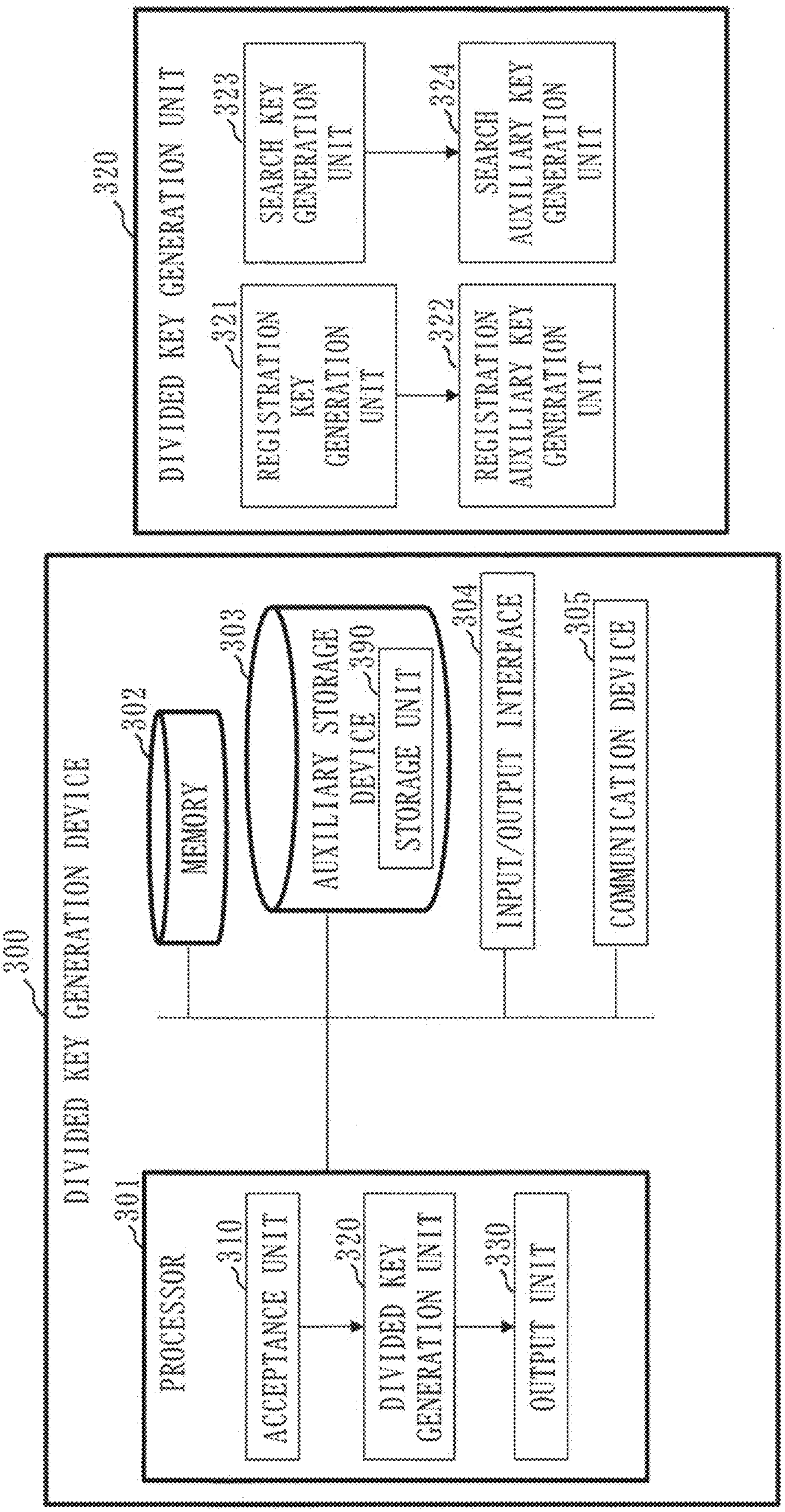
FIG. 3 is a figure illustrating an example of a configuration of a divided key generation device according to Embodiment 1.

FIG. 3 is a figure illustrating an example of a configuration of the divided key generation device 300 according to this embodiment.

The divided key generation device 300 is a computer that includes hardware such as a processor 301, a memory 302, an auxiliary storage device 303, an input/output interface 304, and a communication device 305. These hardware components are connected with one another through signal lines.

The processor 301 is an IC that performs operational processing and controls other hardware components. For example, the processor 301 is a CPU, a DSP, or a GPU.

The memory 302 is a volatile or non-volatile storage device. The memory 302 is also called a main storage device or a main memory. For example, the memory 302 is a RAM. Data stored in the memory 302 is saved in the auxiliary storage device 303 as necessary.

The auxiliary storage device 303 is a non-volatile storage device. For example, the auxiliary storage device 303 is a ROM, an HDD, or a flash memory. Data stored in the auxiliary storage device 303 is loaded into the memory 302 as necessary.

The input/output interface 304 is a port to which an input device and an output device are connected. For example, the input/output interface 304 is a USB terminal, the input device is a keyboard and a mouse, and the output device is a display. Input to and output from the divided key generation device 300 are performed using the input/output interface 304.

The communication device 305 is a receiver and a transmitter. For example, the communication device 305 is a communication chip or a NIC. Communication of the divided key generation device 300 is performed using the communication device 305.

The divided key generation device 300 includes elements such as an acceptance unit 310, a divided key generation unit 320, and an output unit 330. These elements are realized by software.

The auxiliary storage device 303 stores a divided key generation program to cause a computer to function as the acceptance unit 310, the divided key generation unit 320, and the output unit 330. The divided key generation program is loaded into the memory 302 and executed by the processor 301.

The auxiliary storage device 303 further stores an OS. At least part of the OS is loaded into the memory 302 and executed by the processor 301.

The processor 301 executes the divided key generation program while executing the OS.

Input data and output data of the divided key generation program are stored in a storage unit 390.

The auxiliary storage device 303 functions as the storage unit 390. However, a storage device such as the memory 302, a register in the processor 301, and a cache memory in the processor 301 may function as the storage unit 390 in place of the auxiliary storage device 303 or together with the auxiliary storage device 303.

The divided key generation device 300 may include a plurality of processors as an alternative to the processor 301. The plurality of processors share the functions of the processor 301.

The divided key generation program can be recorded (stored) in a computer readable format in a non-volatile recording medium such as an optical disc or a flash memory.

Figure 4:
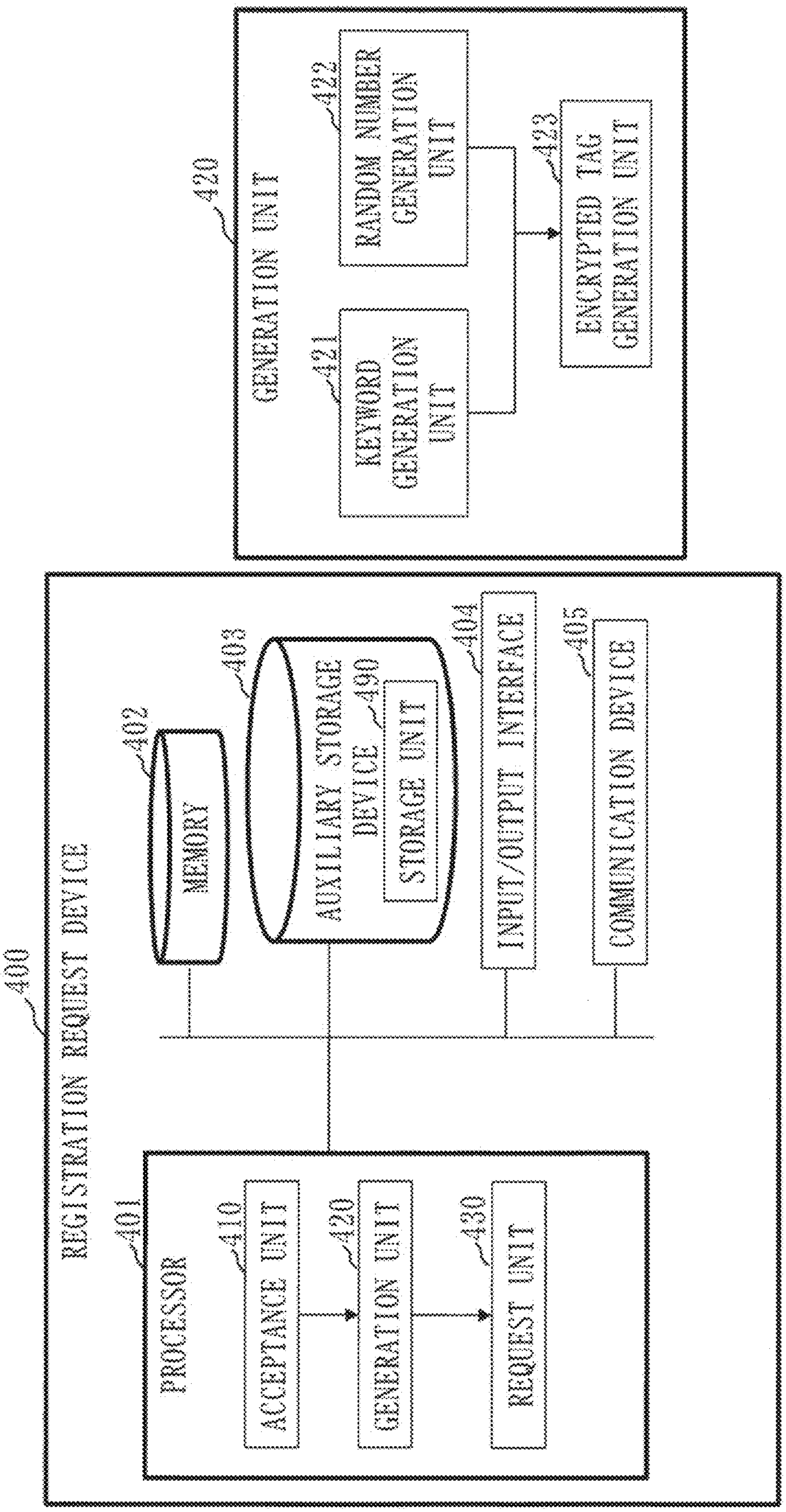
FIG. 4 is a figure illustrating an example of a configuration of a registration request device according to Embodiment 1.

FIG. 4 is a figure illustrating an example of a configuration of the registration request device 400 according to this embodiment.

The registration request device 400 is a computer that includes hardware such as a processor 401, a memory 402, an auxiliary storage device 403, an input/output interface 404, and a communication device 405. These hardware components are connected with one another through signal lines.

The processor 401 is an IC that performs operational processing and controls other hardware components. For example, the processor 401 is a CPU, a DSP, or a GPU.

The memory 402 is a volatile or non-volatile storage device. The memory 402 is also called a main storage device or a main memory. For example, the memory 402 is a RAM. Data stored in the memory 402 is saved in the auxiliary storage device 403 as necessary.

The auxiliary storage device 403 is a non-volatile storage device. For example, the auxiliary storage device 403 is a ROM, an HDD, or a flash memory. Data stored in the auxiliary storage device 403 is loaded into the memory 402 as necessary.

The input/output interface 404 is a port to which an input device and an output device are connected. For example, the input/output interface 404 is a USB terminal, the input device is a keyboard and a mouse, and the output device is a display. Input to and output from the registration request device 400 are performed using the input/output interface 404.

The communication device 405 is a receiver and a transmitter. For example, the communication device 405 is a communication chip or a NIC. Communication of the registration request device 400 is performed using the communication device 405.

The registration request device 400 includes elements such as an acceptance unit 410, a generation unit 420, and a request unit 430. These elements are realized by software.

The generation unit 420 includes elements such as a keyword generation unit 421, a random number generation unit 422, and an encrypted tag generation unit 423.

The auxiliary storage device 403 stores a registration request program to cause a computer to function as the acceptance unit 410, the generation unit 420, and the request unit 430. The registration request program is loaded into the memory 402 and executed by the processor 401.

The auxiliary storage device 403 further stores an OS. At least part of the OS is loaded into the memory 402 and executed by the processor 401.

The processor 401 executes the registration request program while executing the OS.

Input data and output data of the registration request program are stored in a storage unit 490.

The auxiliary storage device 403 functions as the storage unit 490. However, a storage device such as the memory 402, a register in the processor 401, and a cache memory in the processor 401 may function as the storage unit 490 in place of the auxiliary storage device 403 or together with the auxiliary storage device 403.

The registration request device 400 may include a plurality of processors as an alternative to the processor 401. The plurality of processors share the functions of the processor 401.

The registration request program can be recorded (stored) in a computer readable format in a non-volatile recording medium such as an optical disc or a flash memory.

Figure 5:
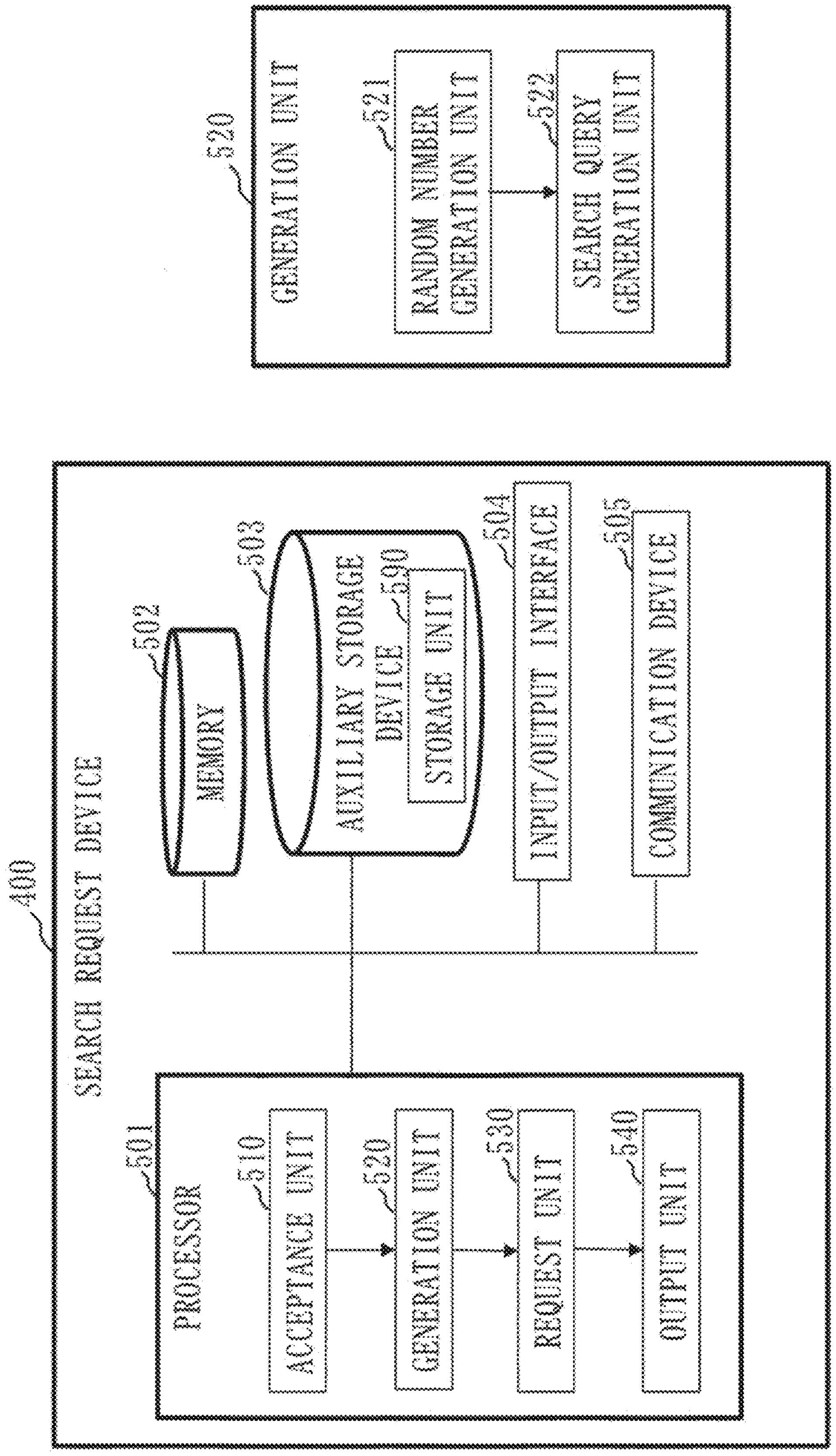
FIG. 5 is a figure illustrating an example of a configuration of a search request device according to Embodiment 1.

FIG. 5 is a figure illustrating an example of a configuration of the search request device 500 according to this embodiment.

The search request device 500 is a computer that includes hardware such as a processor 501, a memory 502, an auxiliary storage device 503, an input/output interface 504, and a communication device 505. These hardware components are connected with one another through signal lines.

The processor 501 is an IC that performs operational processing and controls other hardware components. For example, the processor 501 is a CPU, a DSP, or a GPU.

The memory 502 is a volatile or non-volatile storage device. The memory 502 is also called a main storage device or a main memory. For example, the memory 502 is a RAM. Data stored in the memory 502 is saved in the auxiliary storage device 503 as necessary.

The auxiliary storage device 503 is a non-volatile storage device. For example, the auxiliary storage device 503 is a ROM, an HDD, or a flash memory. Data stored in the auxiliary storage device 503 is loaded into the memory 502 as necessary.

The input/output interface 504 is a port to which an input device and an output device are connected. For example, the input/output interface 504 is a USB terminal, the input device is a keyboard and a mouse, and the output device is a display. Input to and output from the search request device 500 are performed using the input/output interface 504.

The communication device 505 is a receiver and a transmitter. For example, the communication device 505 is a communication chip or a NIC. Communication of the search request device 500 is performed using the communication device 505.

The search request device 500 includes elements such as an acceptance unit 510, a generation unit 520, a request unit 530, and an output unit 540. These elements are realized by software.

The auxiliary storage device 503 stores a search request program to cause a computer to function as the acceptance unit 510, the generation unit 520, the request unit 530, and the output unit 540. The search request program is loaded into the memory 502 and executed by the processor 501.

The auxiliary storage device 503 further stores an OS. At least part of the OS is loaded into the memory 502 and executed by the processor 501.

The processor 501 executes the search request program while executing the OS.

Input data and output data of the search request program are stored in a storage unit 590.

The auxiliary storage device 503 functions as the storage unit 590. However, a storage device such as the memory 502, a register in the processor 501, and a cache memory in the processor 501 may function as the storage unit 590 in place of the auxiliary storage device 503 or together with the auxiliary storage device 503.

The search request device 500 may include a plurality of processors as an alternative to the processor 501. The plurality of processors share the functions of the processor 501.

The search request program can be recorded (stored) in a computer readable format in a non-volatile recording medium such as an optical disc or a flash memory.

Figure 6:
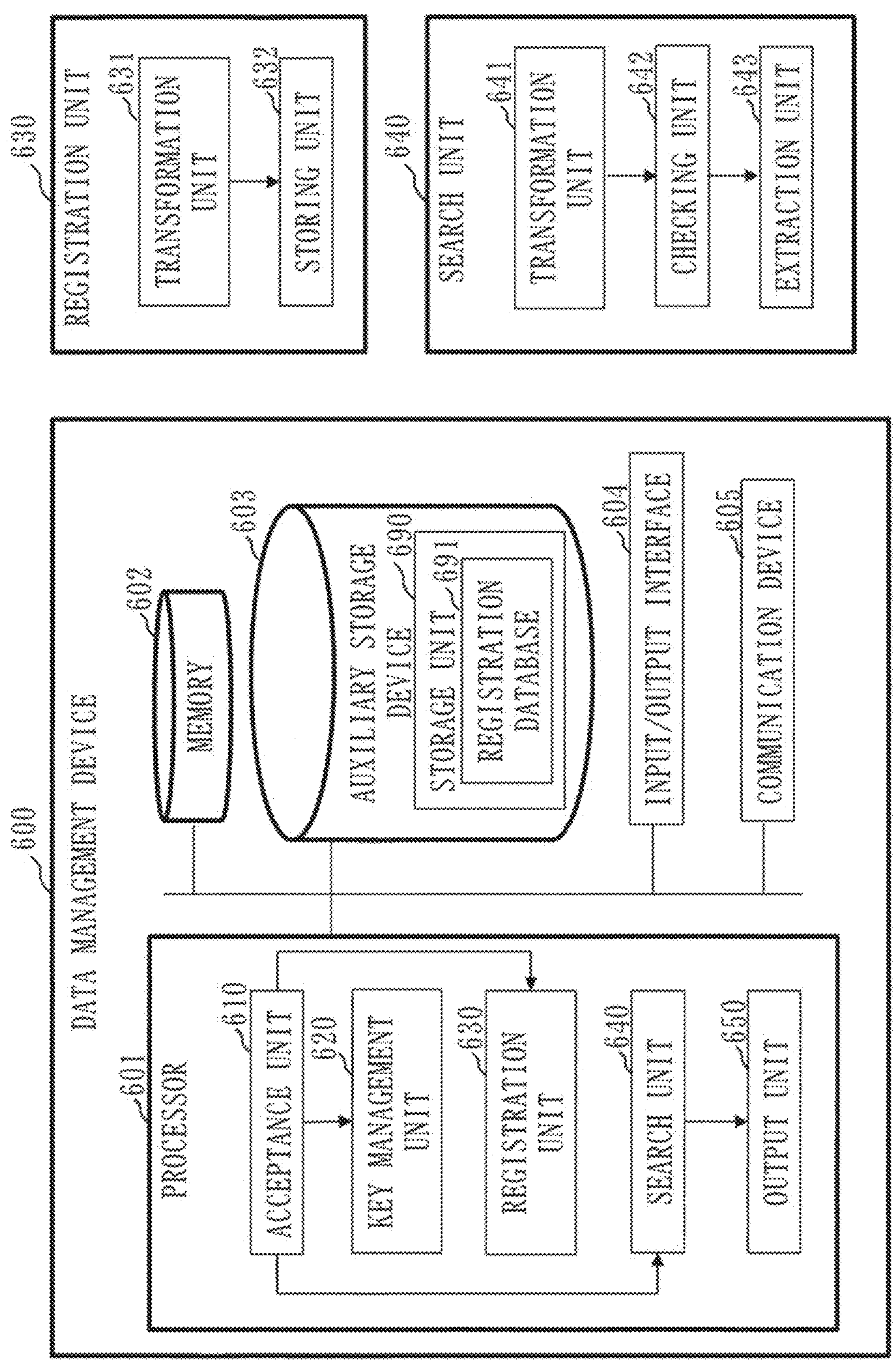
FIG. 6 is a figure illustrating an example of a configuration of a data management device according to Embodiment 1.

FIG. 6 is a figure illustrating an example of a configuration of the data management device 600 according to this embodiment.

The data management device 600 is a computer that includes hardware such as a processor 601, a memory 602, an auxiliary storage device 603, an input/output interface 604, and a communication device 605. These hardware components are connected with one another through signal lines.

The processor 601 is an IC that performs operational processing and controls other hardware components. For example, the processor 601 is a CPU, a DSP, or a GPU.

The memory 602 is a volatile or non-volatile storage device. The memory 602 is also called a main storage device or a main memory. For example, the memory 602 is a RAM. Data stored in the memory 602 is saved in the auxiliary storage device 603 as necessary.

The auxiliary storage device 603 is a non-volatile storage device. For example, the auxiliary storage device 603 is a ROM, an HDD, or a flash memory. Data stored in the auxiliary storage device 603 is loaded into the memory 602 as necessary.

The input/output interface 604 is a port to which an input device and an output device are connected. For example, the input/output interface 604 is a USB terminal, the input device is a keyboard and a mouse, and the output device is a display. Input to and output from the data management device 600 are performed using the input/output interface 604.

The communication device 605 is a receiver and a transmitter. For example, the communication device 605 is a communication chip or a NIC. Communication of the data management device 600 is performed using the communication device 605.

The data management device 600 includes elements such as an acceptance unit 610, a key management unit 620, a registration unit 630, a search unit 640, and an output unit 650. These elements are realized by software.

The registration unit 630 includes elements such as a transformation unit 631 and a storing unit 632.

The search unit 640 includes elements such as a transformation unit 641, a checking unit 642, and an extraction unit 643.

The auxiliary storage device 603 stores a data management program to cause a computer to function as the acceptance unit 610, the key management unit 620, the registration unit 630, the search unit 640, and the output unit 650. The data management program is loaded into the memory 602 and executed by the processor 601.

The auxiliary storage device 603 further stores an OS. At least part of the OS is loaded into the memory 602 and executed by the processor 601.

The processor 601 executes the data management program while executing the OS.

Input data and output data of the data management program are stored in a storage unit 690.

The auxiliary storage device 603 functions as the storage unit 690. However, a storage device such as the memory 602, a register in the processor 601, and a cache memory in the processor 601 may function as the storage unit 690 in place of the auxiliary storage device 603 or together with the auxiliary storage device 603.

The storage unit 690 stores a registration database 691.

The data management device 600 may include a plurality of processors as an alternative to the processor 601. The plurality of processors share the functions of the processor 601.

The data management program can be recorded (stored) in a computer readable format in a non-volatile recording medium such as an optical disc or a flash memory.

Figure 7:
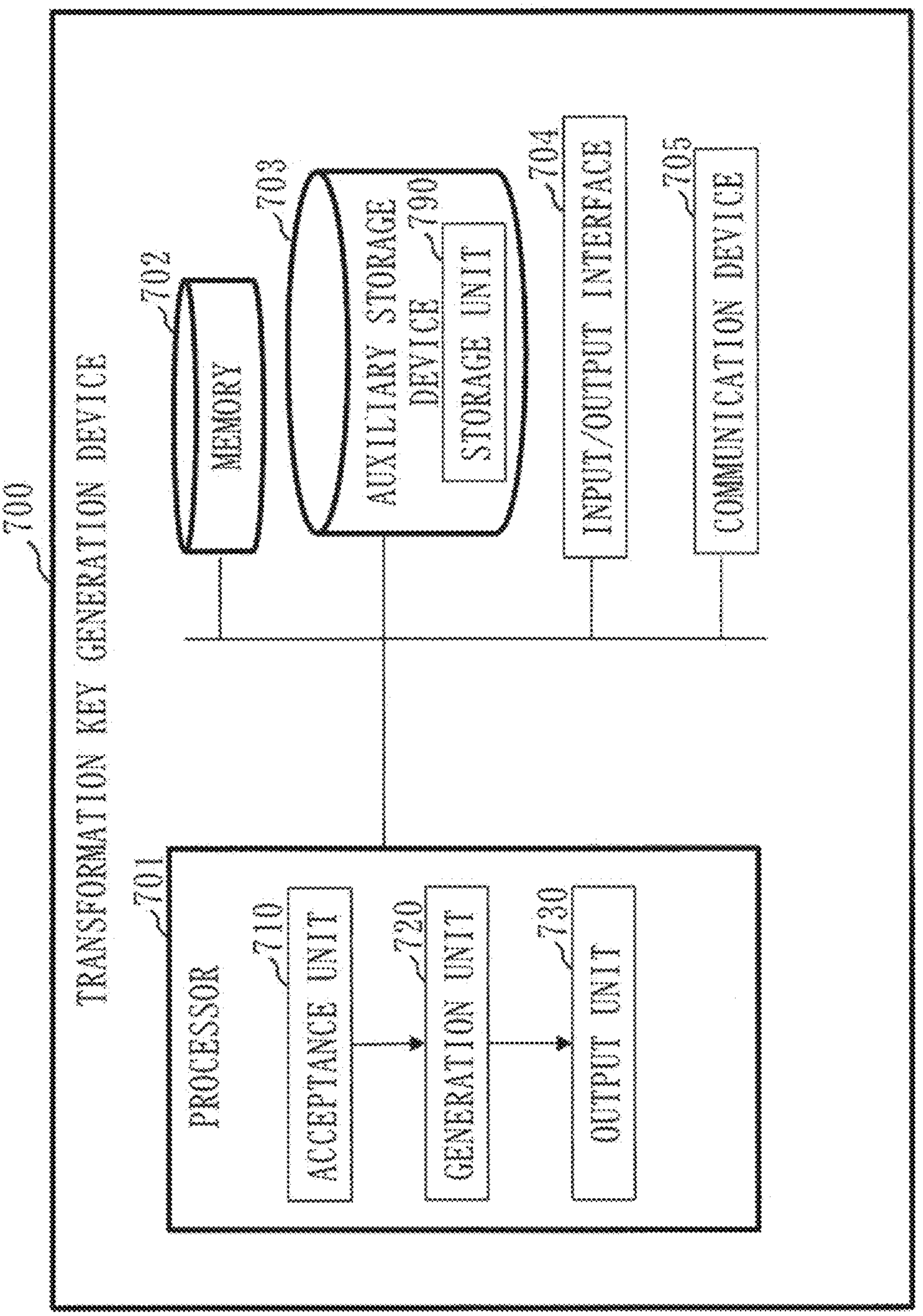
FIG. 7 is a figure illustrating an example of a configuration of a transformation key generation device according to Embodiment 1.

FIG. 7 is a figure illustrating an example of a configuration of the transformation key generation device 700 according to this embodiment.

The transformation key generation device 700 is a computer that includes hardware such as a processor 701, a memory 702, an auxiliary storage device 703, an input/output interface 704, and a communication device 705. These hardware components are connected with one another through signal lines.

The processor 701 is an IC that performs operational processing and controls other hardware components. For example, the processor 701 is a CPU, a DSP, or a GPU.

The memory 702 is a volatile or non-volatile storage device. The memory 702 is also called a main storage device or a main memory. For example, the memory 702 is a RAM. Data stored in the memory 702 is saved in the auxiliary storage device 703 as necessary.

The auxiliary storage device 703 is a non-volatile storage device. For example, the auxiliary storage device 703 is a ROM, an HDD, or a flash memory. Data stored in the auxiliary storage device 703 is loaded into the memory 702 as necessary.

The input/output interface 704 is a port to which an input device and an output device are connected. For example, the input/output interface 704 is a USB terminal, the input device is a keyboard and a mouse, and the output device is a display. Input to and output from the transformation key generation device 700 are performed using the input/output interface 704.

The communication device 705 is a receiver and a transmitter. For example, the communication device 705 is a communication chip or a NIC. Communication of the transformation key generation device 700 is performed using the communication device 705.

The transformation key generation device 700 includes elements such as an acceptance unit 710, a generation unit 720, and an output unit 730. These elements are realized by software.

The auxiliary storage device 703 stores a transformation key generation program to cause a computer to function as the acceptance unit 710, the generation unit 720, and the output unit 730. The transformation key generation program is loaded into the memory 702 and executed by the processor 701.

The auxiliary storage device 703 further stores an OS. At least part of the OS is loaded into the memory 702 and executed by the processor 701.

The processor 701 executes the transformation key generation program while executing the OS.

Input data and output data of the transformation key generation program are stored in a storage unit 790.

The auxiliary storage device 703 functions as the storage unit 790. However, a storage device such as the memory 702, a register in the processor 701, and a cache memory in the processor 701 may function as the storage unit 790 in place of the auxiliary storage device 703 or together with the auxiliary storage device 703.

The transformation key generation device 700 may include a plurality of processors as an alternative to the processor 701. The plurality of processors share the functions of the processor 701.

The transformation key generation program can be recorded (stored) in a computer readable format in a non-volatile recording medium such as an optical disc or a flash memory.

Figure 8:
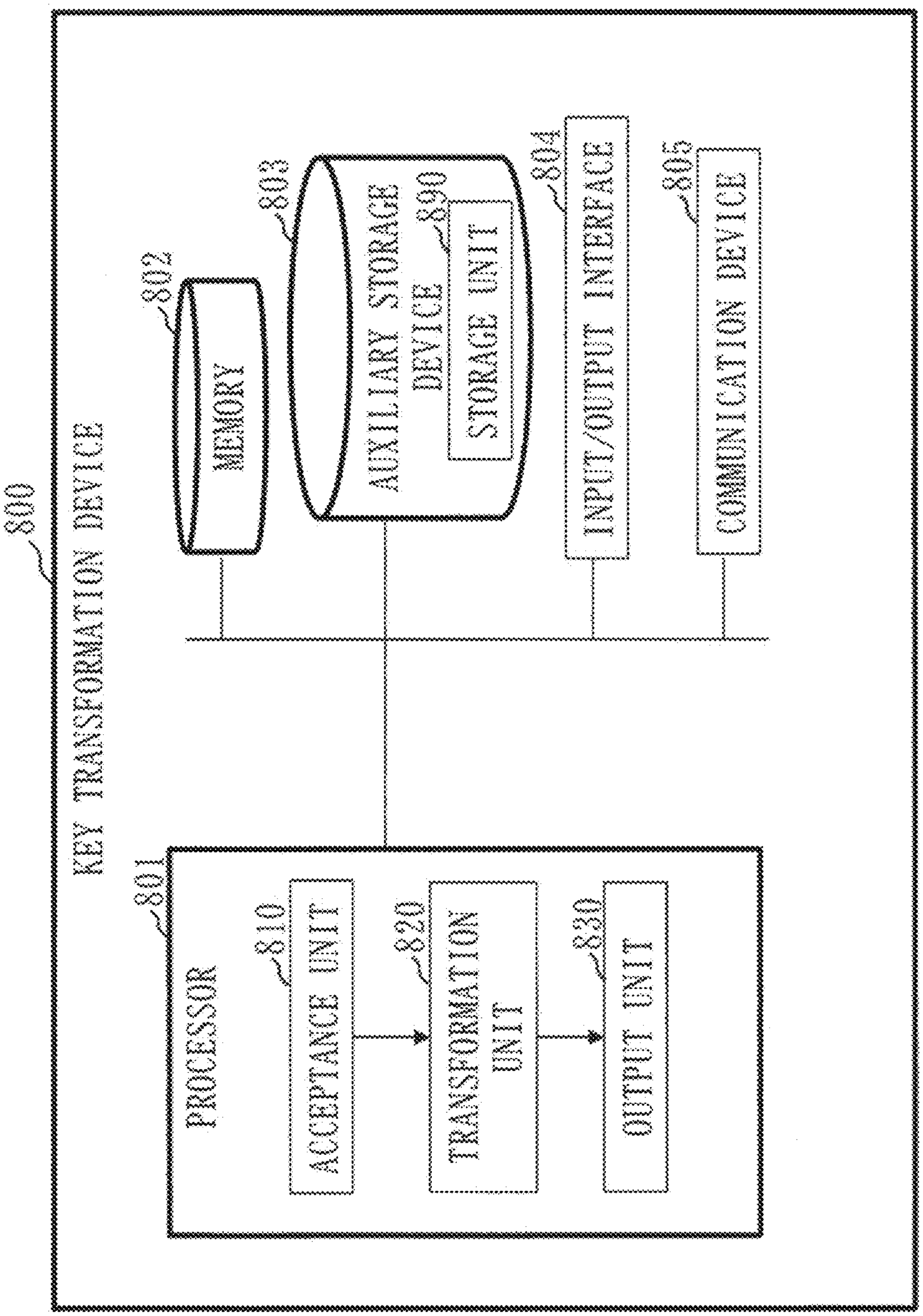
FIG. 8 is a figure illustrating an example of a configuration of a key transformation device according to Embodiment 1.

FIG. 8 is a figure illustrating an example of a configuration of the key transformation device 800 according to this embodiment.

The key transformation device 800 is a computer that includes hardware such as a processor 801, a memory 802, an auxiliary storage device 803, an input/output interface 804, and a communication device 805. These hardware components are connected with one another through signal lines.

The processor 801 is an IC that performs operational processing and controls other hardware components. For example, the processor 801 is a CPU, a DSP, or a GPU.

The memory 802 is a volatile or non-volatile storage device. The memory 802 is also called a main storage device or a main memory. For example, the memory 802 is a RAM. Data stored in the memory 802 is saved in the auxiliary storage device 803 as necessary.

The auxiliary storage device 803 is a non-volatile storage device. For example, the auxiliary storage device 803 is a ROM, an HDD, or a flash memory. Data stored in the auxiliary storage device 803 is loaded into the memory 802 as necessary.

The input/output interface 804 is a port to which an input device and an output device are connected. For example, the input/output interface 804 is a USB terminal, the input device is a keyboard and a mouse, and the output device is a display. Input to and output from the key transformation device 800 are performed using the input/output interface 804.

The communication device 805 is a receiver and a transmitter. For example, the communication device 805 is a communication chip or a NIC. Communication of the key transformation device 800 is performed using the communication device 805.

The key transformation device 800 includes elements such as an acceptance unit 810, a transformation unit 820, and an output unit 830. These elements are realized by software.

The auxiliary storage device 803 stores a key transformation program to cause a computer to function as the acceptance unit 810, the transformation unit 820, and the output unit 830. The key transformation program is loaded into the memory 802 and executed by the processor 801.

The auxiliary storage device 803 further stores an OS. At least part of the OS is loaded into the memory 802 and executed by the processor 801.

The processor 801 executes the key transformation program while executing the OS.

Input data and output data of the key transformation program are stored in a storage unit 890.

The auxiliary storage device 803 functions as the storage unit 890. However, a storage device such as the memory 802, a register in the processor 801, and a cache memory in the processor 801 may function as the storage unit 890 in place of the auxiliary storage device 803 or together with the auxiliary storage device 803.

The key transformation device 800 may include a plurality of processors as an alternative to the processor 801. The plurality of processors share the functions of the processor 801.

The key transformation program can be recorded (stored) in a computer readable format in a non-volatile recording medium such as an optical disc or a flash memory.

Figure 9:
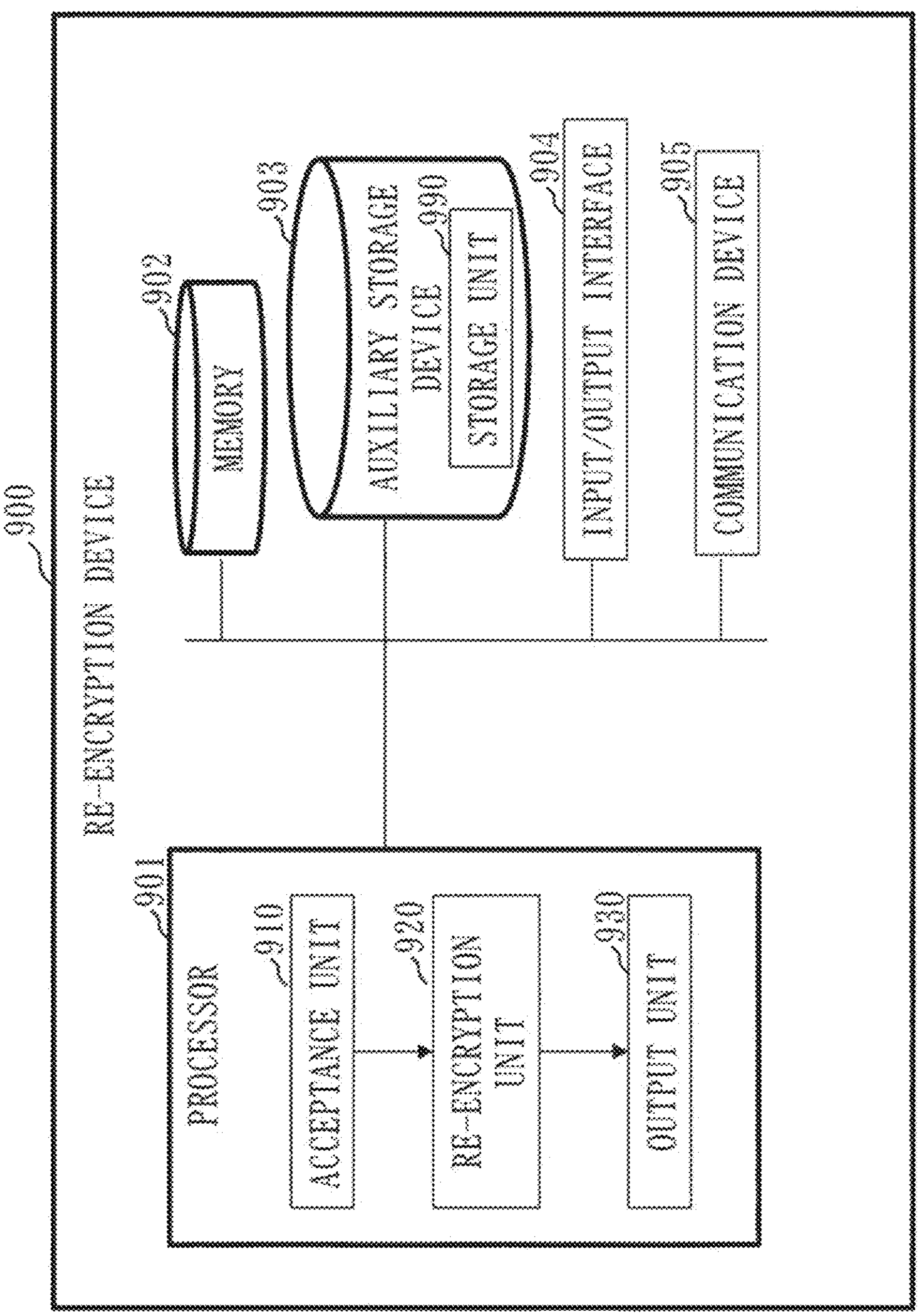
FIG. 9 is a figure illustrating an example of a configuration of a re-encryption device according to Embodiment 1.

FIG. 9 is a figure illustrating an example of a configuration of the re-encryption device 900 according to this embodiment.

The re-encryption device 900 is a computer that includes hardware such as a processor 901, a memory 902, an auxiliary storage device 903, an input/output interface 904, and a communication device 905. These hardware components are connected with one another through signal lines. The processor 901 is an IC that performs operational processing and controls other hardware components. For example, the processor 901 is a CPU, a DSP, or a GPU.

The memory 902 is a volatile or non-volatile storage device. The memory 902 is also called a main storage device or a main memory. For example, the memory 902 is a RAM. Data stored in the memory 902 is saved in the auxiliary storage device 903 as necessary.

The auxiliary storage device 903 is a non-volatile storage device. For example, the auxiliary storage device 903 is a ROM, an HDD, or a flash memory. Data stored in the auxiliary storage device 903 is loaded into the memory 902 as necessary.

The input/output interface 904 is a port to which an input device and an output device are connected. For example, the input/output interface 904 is a USB terminal, the input device is a keyboard and a mouse, and the output device is a display. Input to and output from the re-encryption device 900 are performed using the input/output interface 904.

The communication device 905 is a receiver and a transmitter. For example, the communication device 905 is a communication chip or a NIC. Communication of the re-encryption device 900 is performed using the communication device 905.

The re-encryption device 900 includes elements such as an acceptance unit 910, a re-encryption unit 920, and an output unit 930. These elements are realized by software.

The auxiliary storage device 903 stores a re-encryption program to cause a computer to function as the acceptance unit 910, the re-encryption unit 920, and the output unit 930. The re-encryption program is loaded into the memory 902 and executed by the processor 901.

The auxiliary storage device 903 further stores an OS. At least part of the OS is loaded into the memory 902 and executed by the processor 901.

The processor 901 executes the re-encryption program while executing the OS.

Input data and output data of the re-encryption program are stored in a storage unit 990.

The auxiliary storage device 903 functions as the storage unit 990. However, a storage device such as the memory 902, a register in the processor 901, and a cache memory in the processor 901 may function as the storage unit 990 in place of the auxiliary storage device 903 or together with the auxiliary storage device 903. The re-encryption device 900 may include a plurality of processors as an alternative to the processor 901. The plurality of processors share the functions of the processor 901.

The re-encryption program can be recorded (stored) in a computer readable format in a non-volatile recording medium such as an optical disc or a flash memory.

*Description of Operation*

The operation of the searchable encryption system 100 according to this embodiment will now be described. A procedure for the operation of the searchable encryption system 100 is equivalent to a searchable encryption method. A program that realizes the operation of the searchable encryption system 100 is equivalent to a searchable encryption program.

Figure 10:
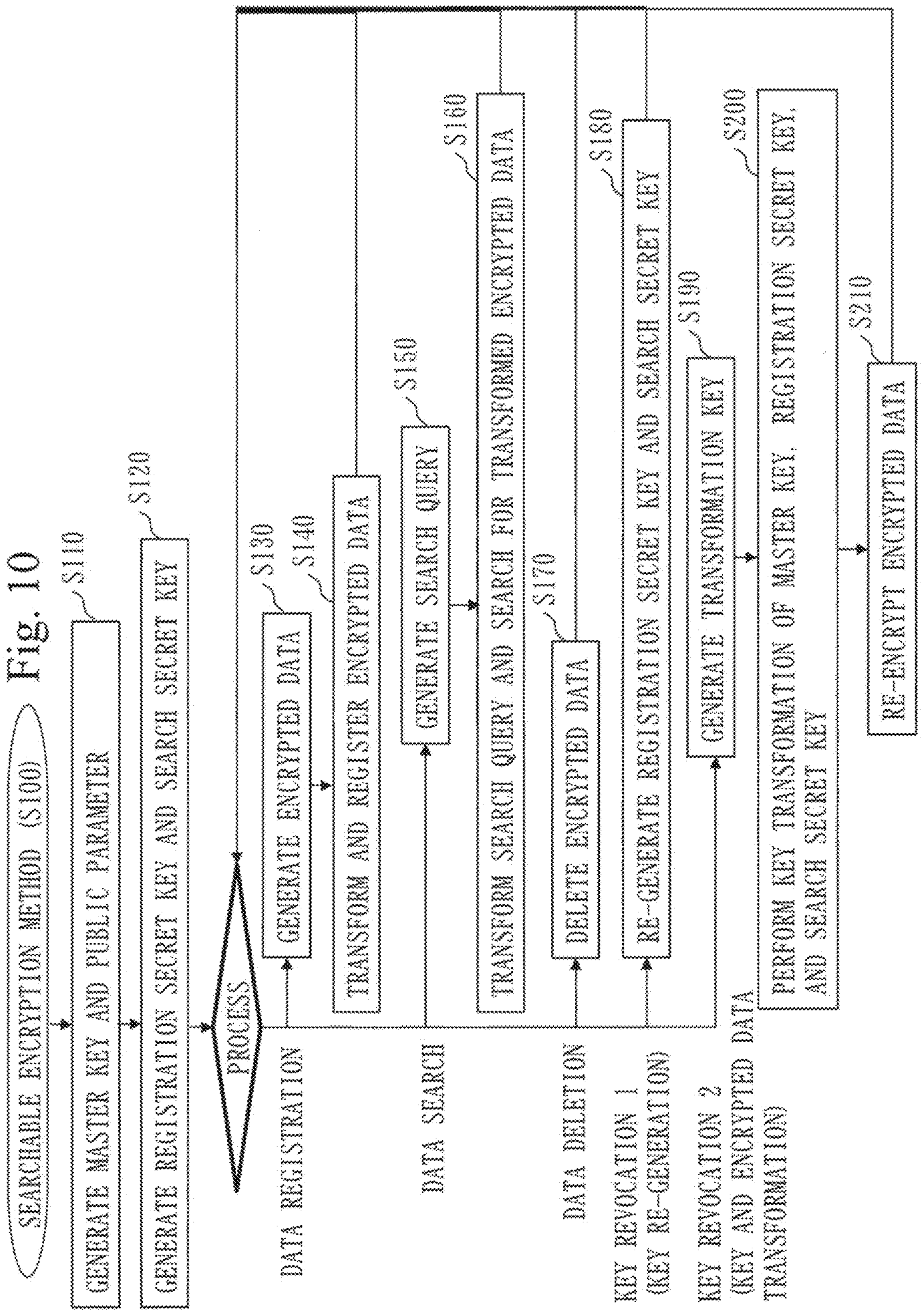
FIG. 10 is a flowchart illustrating operation of the searchable encryption system according to Embodiment 1.

FIG. 10 is a flowchart illustrating the operation of the searchable encryption system 100 according to this embodiment.

<Master Key Generation: S110>

In step S110, the master key generation device 200 generates a master key MK and a public parameter PP.

Figure 11:
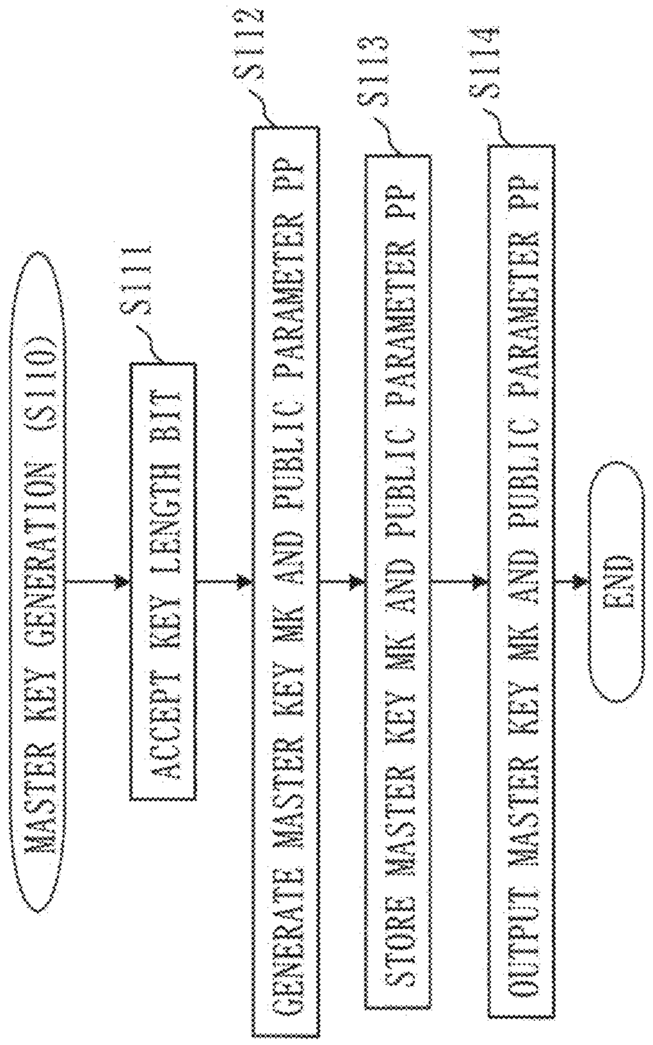
FIG. 11 is a flowchart illustrating a procedure for master key generation according to Embodiment 1.

FIG. 11 is a flowchart illustrating a procedure for master key generation (S110) according to this embodiment.

The master key generation (S110) is a process executed by the master key generation device 200.

In step S111, the acceptance unit 210 accepts a key length BIT.

The key length BIT is the length of the master key MK and is represented by a positive integer (natural number).

In step S112, the generation unit 220 generates the master key MK and the public parameter PP based on the key length BIT.

Specifically, this is as described below.

First, the generation unit 220 randomly selects two prime numbers (P, Q) with the same bit length as BIT/2.

Next, the generation unit 220 calculates a product N (=P*Q) of the prime number P and the prime number Q.

Next, the generation unit 220 randomly selects an integer g from a set of integers of 1 to (N−1) {1, 2, . . . , N−1}.

Next, the generation unit 220 divides the square of the integer g by the product N to calculate a remainder G (=g*g mod N). "x mod y" denotes a remainder when an integer x is divided by an integer y.

A product obtained by calculating (P−1)*(Q−1) will be denoted as "Z".

Next, the generation unit 220 randomly selects an integer X from a set of integers of 1 to (Z−1) {1, 2, . . . , Z−1}.

The generation unit 220 also selects a cryptographic function F. The cryptographic function F is a cryptographic hash function. Specific examples of the cryptographic function F are SHA-256 and SHA-512.

Then, the generation unit 220 generates the master key MK and the public parameter PP.

The master key MK includes the prime number P, the prime number Q, the remainder G, the integer Z, and the integer X.

The public parameter PP includes the product N and an identifier of the cryptographic function F.

The master key MK is expressed as indicated below.

$$MK=(P,Q,G,Z,X)$$

The public parameter PP is expressed as indicated below.

$$PP=(N,F)$$

In step S113, the generation unit 220 saves and stores the master key MK and the public parameter PP in the storage unit 290.

In step S114, the output unit 230 outputs the master key MK and the public parameter PP.

For example, the output unit 230 uses the communication device 205 to transmit the master key MK to the divided key generation device 300 and the key transformation device 800.

The master key MK is used for generating a registration secret key EK or a search secret key SK. Alternatively, the master key MK is used when the master key MK is transformed.

Furthermore, the output unit 230 outputs the public parameter PP.

For example, the output unit 230 uses the communication device 205 to transmit the public parameter PP to each of the divided key generation device 300, the registration request device 400, the search request device 500, the data management device 600, the transformation key generation device 700, the key transformation device 800, and the re-encryption device 900.

The public parameter PP is used for generating the registration secret key EK, generating the search secret key SK, registering encrypted data C, searching for the encrypted data C, generating a search query SQ, re-generating the registration secret key EK, re-generating the search secret key SK, generating a transformation key TK, performing key transformation of the master key MK, performing key transformation of the registration secret key EK, performing key transformation of the search secret key SK, and re-encrypting the encrypted data C.

Referring back to FIG. 10, the description will be continued from step S120.

<Divided Key Generation: S120>

In step S120, the divided key generation device 300 generates the registration secret key EK and the search secret key SK using the master key MK and the public parameter PP.

The registration secret key EK is used for encrypting data and transforming encrypted data when it is registered.

The registration secret key EK is composed of a registration key EK1 and a registration auxiliary key EK2.

The registration key EK1 is used for encrypting data.

The registration auxiliary key EK2 is used for transforming encrypted data.

The search secret key SK is used for generating a query to be used for a search based on a keyword to be used for the search and transforming the generated query. The search secret key SK is composed of a search key SK1 and a search auxiliary key SK2.

The search key SK1 is used for generating a query to be used for a search based on a keyword to be used for the search.

The search auxiliary key SK2 is used for transforming the generated query.

Figure 12:
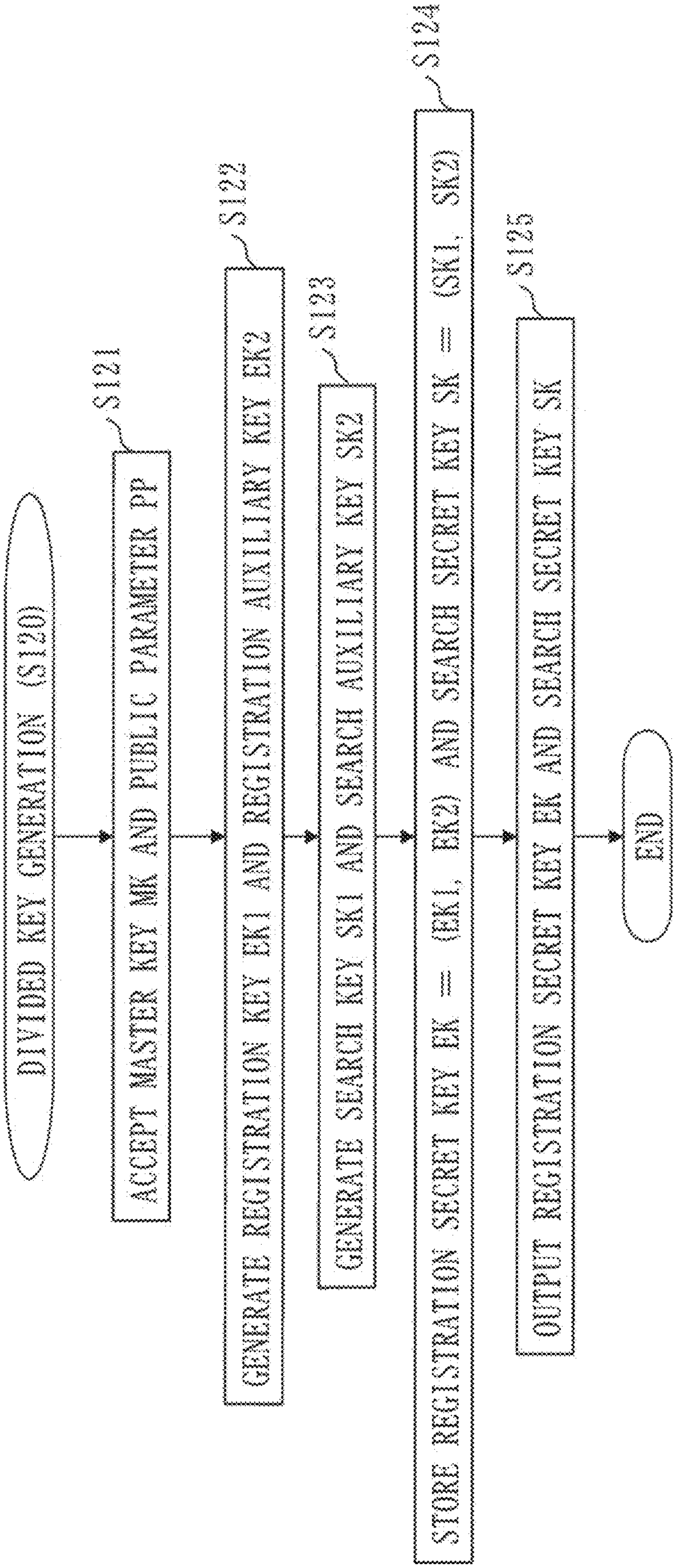
FIG. 12 is a flowchart illustrating a procedure for divided key generation according to Embodiment 1.

FIG. 12 is a flowchart illustrating a procedure for divided key generation (S120) according to this embodiment.

The divided key generation (S120) is a process executed by the divided key generation device 300.

In step S121, the acceptance unit 310 accepts the master key MK and the public parameter PP, and saves and stores the master key MK and the public parameter PP in the storage unit 390.

However, if the master key MK and the public parameter PP have already been stored, step S121 is not necessary.

In step S122, the divided key generation unit 320 generates the registration secret key EK=(EK1, EK2) using the master key MK and the public parameter PP. First, the divided key generation unit 320 randomly selects an integer ek1 from a set of integers of 1 to (Z−1) {1, 2, . . . , Z−1}.

Next, the divided key generation unit 320 calculates EK1=G^ek1 mod N. Next, the divided key generation unit 320 finds an integer EK2 from 1 to (Z−1) such that "X=ek1*EK2 mod Z". This can be calculated efficiently using the extended Euclidean algorithm.

In step S123, the divided key generation unit 320 generates the search secret key SK=(SK1, SK2) using the master key MK and the public parameter PP.

First, the divided key generation unit 320 randomly selects an integer sk1 from a set of integers of 1 to (Z−1) {1, 2, . . . , Z−1}.

Next, the divided key generation unit 320 calculates SK1=G^sk1 mod N. Next, the divided key generation unit 320 finds an integer SK2 from 1 to (Z−1) such that "X=sk1*SK2 mod Z". This can be calculated efficiently using the extended Euclidean algorithm.

In step S124, the divided key generation unit 320 saves and stores the registration secret key EK and the search secret key SK in the storage unit 390.

In step S125, the output unit 330 outputs the registration secret key EK and the search secret key SK.

For example, the output unit 330 uses the communication device 305 to transmit the registration key EK1 to the registration request device 400.

For example, the output unit 330 uses the communication device 305 to transmit the search key SK1 to the search request device 500.

For example, the output unit 330 uses the communication device 305 to transmit the registration auxiliary key EK2 and the search auxiliary key SK2 to the data management device 600.

For example, the output unit 330 uses the communication device 305 to transmit the registration secret key EK and the search secret key SK to the key transformation device 800.

The registration key EK1 is used for generating the encrypted data C. The registration auxiliary key EK2 is used for transforming the encrypted data C.

The search key SK1 is used for generating the search query SQ. The search auxiliary key SK2 is used for transforming the search query SQ.

Referring back to FIG. 10, the description will be continued from step S130. Step S130 to step S140, step S150 to step S160, step S170, step S180, and step S190 to step S210 are executed repeatedly.

If the encrypted data C is to be registered, the process proceeds to step S130. For example, if a user inputs a registration command for the encrypted data C into the registration request device 400, the process proceeds to step S130.

If the encrypted data C is to be searched for, the process proceeds to step S150.

For example, if the user inputs a search command for the encrypted data C into the search request device 500, the process proceeds to step S150.

If the encrypted data C is to be deleted based on a data name, the process proceeds to step S170.

For example, if the user inputs a deletion command for the encrypted data C into the registration request device 400, the process proceeds to step S170.

If the registration secret key EK and the search secret key SK are to be re-generated, the process proceeds to step S180.

For example, the divided key generation device 300 periodically compares a usage period of each of the registration secret key EK and the search secret key SK with a reference period. Then, if the usage period of the registration secret key EK or the search secret key SK has exceeded the reference period, the process proceeds to step S180.

For example, an administrator determines that one of the registration key EK1 and the registration auxiliary key EK2 or one of the search key SK1 and the search auxiliary key SK2 has leaked. Then, if the administrator inputs an update command for these secret keys into the divided key generation device 300, the process proceeds to step S180.

If the registration secret key EK and the search secret key SK are to be transformed and the encrypted data C is to be re-encrypted, the process proceeds to step S190.

For example, the administrator determines that the registration key EK1 and the registration auxiliary key EK2 have leaked, or the search key SK1 and the search auxiliary key SK2 have leaked. Then, if the administrator inputs commands for updating these secret keys and re-encrypting the encrypted data C into the transformation key generation device 700, the key transformation device 800, and the re-encryption device 900, the process proceeds to step S190.

<Registration Request: S130>

In step S130, the registration request device 400 generates the encrypted data C, and transmits the encrypted data C to the data management device 600.

The generation unit 420 of the registration request device 400 acquires the registration key EK1, plaintext data D, and the public parameter PP. Then, the generation unit 420 generates the encrypted data C by encrypting the plaintext data D using the registration key EK1 and the public parameter PP. At this time, the generation unit 420 generates a random number used in generating the encrypted data C, using the public parameter PP. Then, the generation unit 420 generates the encrypted data using the registration key EK1, the public parameter PP, and the random number. The encrypted data can be randomized by this random number.

In this embodiment, the generation unit 420 encrypts a registration keyword contained in the plaintext data D using the registration key EK1, the public parameter PP, and the random number, and generates an encrypted tag ET obtained by encryption as the encrypted data C.

Specifically, this is as described below.

Figure 13:
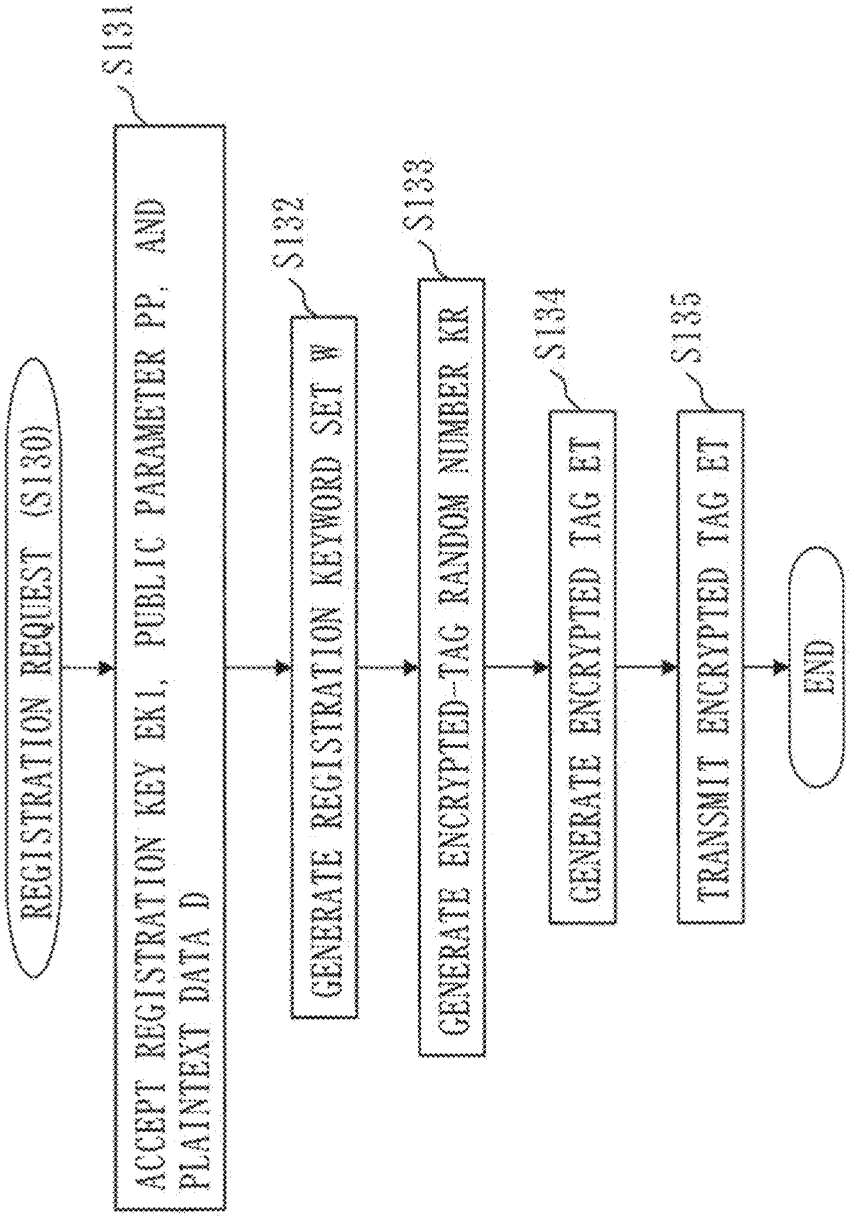
FIG. 13 is a flowchart illustrating a procedure for registration request according to Embodiment 1.

FIG. 13 is a flowchart illustrating a procedure for registration request (S130) according to this embodiment.

The registration request (S130) is a process executed by the registration request device 400.

In step S131, the acceptance unit 410 accepts the registration key EK1, the public parameter PP, and the plaintext data D, and saves and stores the registration key EK1 and the public parameter PP in the storage unit 490.

If the registration key EK1 and the public parameter PP have already been stored, only the registration key EK1 is replaced and stored.

The plaintext data D is data that has not been encrypted.

The plaintext data D includes a data name ID(D) as meta data. An identifier is unique data.

More than one piece of the plaintext data D may be accepted. In that case, step S132 to step S135 are executed for each piece of the plaintext data D.

In step S132, the keyword generation unit 421 generates a registration keyword set W.

The registration keyword set W is a set of keywords related to the plaintext data D.

Specifically, the keyword generation unit 421 extracts one or more keywords from the plaintext data D by performing processing such as morphological analysis or natural language processing on the plaintext data D. The extracted keywords constitute the registration keyword set W.

For example, it is assumed that the registration keyword set W is composed of n keywords. That is, it is assumed that the registration keyword set W is {w1, . . . , wn}. Note that n is an integer of 1 or greater.

Instead of arranging that the keyword generation unit 421 generates the registration keyword set W, the acceptance unit 410 may accept, via the input/output interface 404, the registration keyword set W to be input into the registration request device 400.

In step S133, the random number generation unit 422 generates an encrypted-tag random number KR using the public parameter PP.

The encrypted-tag random number KR is a random number for encrypting the registration keyword set W to be described later.

Specifically, the random number generation unit 422 randomly selects integers from a set of integers of 1 to (N−1)

{1, 2, . . . , N−1}. The number of random integers selected here is the same number as the number of elements in the registration keyword set W. This set of random integers is the encrypted-tag random number KR. For example, when the registration keyword set W is {w1, . . . , wn}, the encrypted-tag random number KR is {kr1, . . . , krn}.

If randomization is not required in consideration of high-speed searchable encryption processing, the values of kr1 to krn may be set as kr1= . . . =krn=1.

In step S134, the encrypted tag generation unit 423 encrypts the registration keyword set W using the registration key EK1, the public parameter PP, and the encrypted-tag random number KR so as to generate the encrypted tag ET.

Specifically, for the registration keyword set W={w1, . . . , wn} and the encrypted-tag random number KR={kr1, . . . , krn}, the encrypted tag generation unit 423 calculates an encrypted tag element ETi for every i. Note that i is an integer from 1 to n.

$$ETi = (ETi1, ETi2)$$

$$ETi1 = EK1^{\wedge}(F(W) * kri) \bmod N$$

$$ETi2 = kri$$

Next, the encrypted tag generation unit 423 generates the encrypted tag ET, as indicated below.

$$ET = (ID(D), ET1, \ldots, ETn)$$

This encrypted tag ET is the encrypted data C in this embodiment.

In step S135, the request unit 430 transmits the encrypted tag ET to the data management device 600.

Referring back to FIG. 10, the description will be continued from step S140.

<Registration Operation: S140>

In step S140, the data management device 600 receives the encrypted data C, and transforms the encrypted data C and registers it in the storage unit 690. In this embodiment, the encrypted data C is the encrypted tag ET.

The registration unit 630 of the data management device 600 transforms the encrypted data C using the registration auxiliary key EK2 and the public parameter PP. The registration unit 630 registers transformed encrypted data obtained by transformation in the registration database 691 in association with an identifier ID(D) that identifies the plaintext data D.

Specifically, this is as described below.

Figure 14:
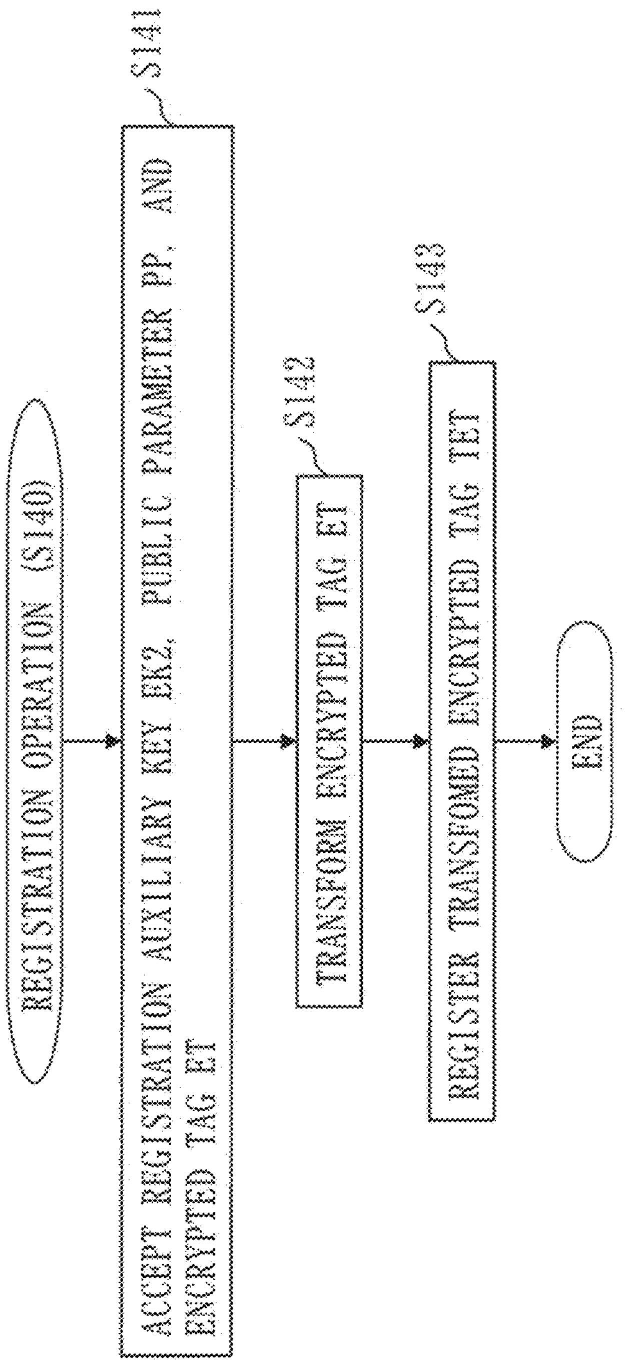
FIG. 14 is a flowchart illustrating a procedure for registration operation according to Embodiment 1.

FIG. 14 is a flowchart illustrating a procedure for registration operation (S140) according to this embodiment.

The registration operation (S140) is a process executed by the data management device 600.

In step S141, the acceptance unit 610 accepts the registration auxiliary key EK2, the public parameter PP, and the encrypted tag ET. Then, the key management unit 620 saves and stores the registration auxiliary key EK2 and the public parameter PP in the storage unit 690.

If the registration auxiliary key EK2 and the public parameter PP have already been stored, only the registration auxiliary key EK2 is replaced and stored.

More than one encrypted tag ET may be accepted. In that case, step S142 and step S143 are executed for each encrypted tag ET.

In step S142, the transformation unit 631 transforms the encrypted tag ET using the registration auxiliary key EK2 and the public parameter PP so as to generate a transformed encrypted tag TET.

Specifically, for the encrypted tag ET={ID(D), ET1, . . . , ETn}, the transformation unit 631 calculates a transformed encrypted tag element TETi for every i. Note that i is an integer from 1 to n and ETi=(ETi1, ETi2).

$$TETi = (TETi1, TETi2)$$

$$TETi1 = ETi1^{\wedge}EK2 \bmod N$$

$$TETi2 = ETi2$$

Next, the transformation unit 631 generates the transformed encrypted tag TET, as indicated below.

$$TET = (ID(D), TET1, \ldots, TETn)$$

In step S143, the storing unit 632 registers the transformed encrypted tag TET in the registration database 691.

The registration database 691 is saved and stored in the storage unit 690 of the data management device 600.

FIG. 15 is a figure illustrating an example of the registration database 691 according to this embodiment.

In FIG. 15, data in one row corresponds to one transformed encrypted tag TET.

In data of one row, a data name ID(D) and a transformed encrypted tag TET are associated with each other.

Referring back to FIG. 10, the description will be continued from step S150.

<Search Request: S150>

In step S150, the search request device 500 generates the search query SQ, and transmits the search query SQ to the data management device 600.

The generation unit 520 of the search request device 500 acquires the search key SK1, a search keyword sw, and the public parameter PP, and generates the search query SQ based on the search keyword sw, using the search key SK1 and the public parameter PP. The generation unit 520 generates a random number to be used in generating the search query SQ, using the public parameter PP, and generates the search query SQ using the search key SK1, the public parameter PP, and the random number. The request unit 530 of the search request device 500 transmits the search query SQ to the data management device. Then, the request unit 530 acquires, as search result DATA, the identifier ID(D) corresponding to the encrypted data C that matches the search query SQ from the data management device 600.

Specifically, this is as described below.

Figure 16:
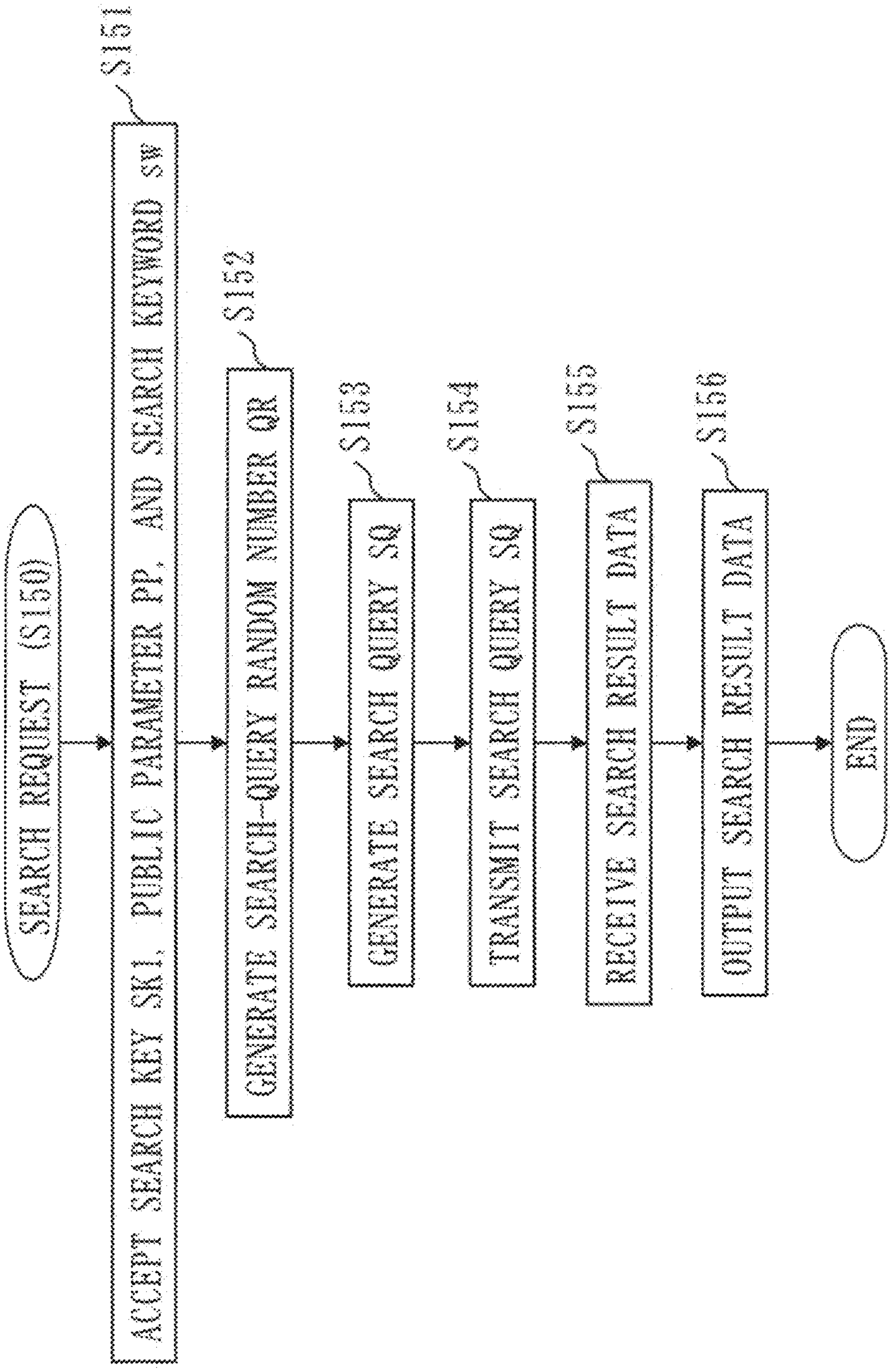
FIG. 16 is a flowchart illustrating a procedure for search request according to Embodiment 1.

FIG. 16 is a flowchart illustrating a procedure for search request (S150) according to this embodiment.

The search request (S150) is a process executed by the search request device 500.

In step S151, the acceptance unit 510 accepts the search key SK1, the public parameter PP, and the search keyword sw. Then, the acceptance unit 510 saves and stores the search key SK1 and the public parameter PP in the storage unit 590.

If the search key SK1 and the public parameter PP have already been stored, only the search key SK1 is replaced and stored.

The search keyword sw is keyword data that has not been encrypted.

More than one search keyword sw may be accepted. In that case, step S152 and step S153 are executed for each search keyword sw.

In step S152, a random number generation unit 521 generates a search-query random number QR using the public parameter PP.

The search-query random number QR is a random number for encrypting the search query SQ.

Specifically, the random number generation unit 521 randomly selects an integer QR from a set of integers of 1 to (N−1) {1, 2, . . . , N−1}.

If randomization is not required in consideration of high-speed searchable encryption processing, the value of QR may be set as QR=1.

In step S153, a search query generation unit 522 encrypts the search keyword sw using the search key SK1, the public parameter PP, and the search-query random number QR so as to generate the search query SQ.

Specifically, the search query generation unit 522 calculates the following search query SQ for the search keyword sw and the search-query random number QR.

$$SQ = (SQ1, SQ2)$$

$$SQ1 = SK1^{\wedge}(F(sw) * QR) \bmod N$$

$$SQ2 = QR$$

In step S154, the request unit 530 transmits the search query SQ to the data management device 600.

In step S155, the request unit 530 uses the communication device 505 to receive the search result DATA from the data management device 600.

The search result DATA is a set of data names ID(D) of encrypted tags that match the search query SQ. That is, it is a set of data names of data that match the search query SQ.

In step S156, the output unit 540 outputs the search result DATA. For example, the output unit 540 displays the search result DATA on the display via the input/output interface 504.

If the search result DATA is an empty set, the output unit 540 outputs a search error message.

The search error message indicates that there is no plaintext data D found as a match in a searchable-encryption search.

Referring back to FIG. 10, the description will be continued from step S160.

<Search Operation: S160>

In step S160, the data management device 600 searches for transformed encrypted data that matches the search query SQ. In this embodiment, transformed encrypted data, which is the encrypted data C that has been transformed, is the transformed encrypted tag TET.

The search unit 640 of the data management device 600 acquires the search auxiliary key SK2 and the public parameter PP, and transforms the search query SQ using the search auxiliary key SK2 and the public parameter PP. The search unit 640 checks a transformed search query TSQ obtained by transformation against transformed encrypted data, and extracts the identifier ID(D) of transformed encrypted data that matches the transformed search query TSQ.

Specifically, this is as described below.

Figure 17:
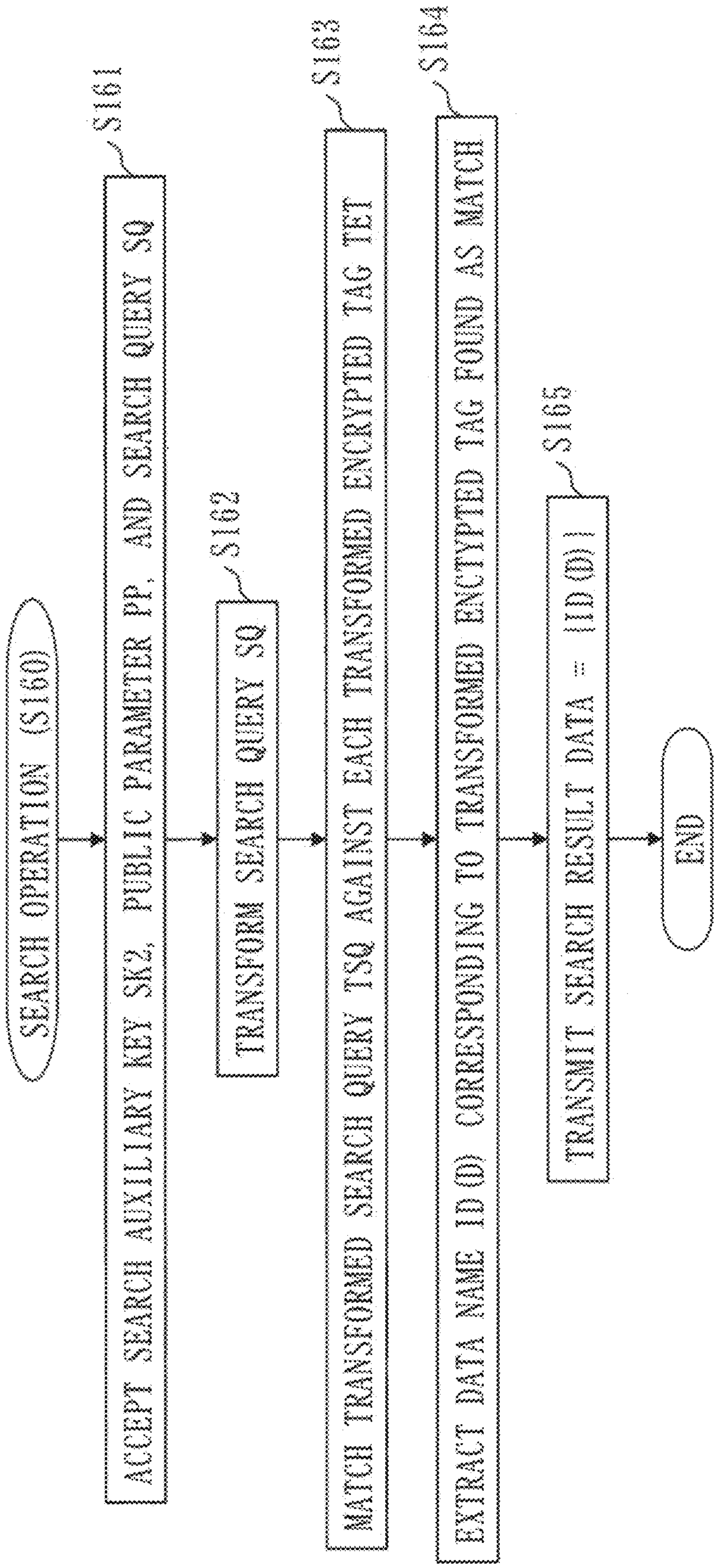
FIG. 17 is a flowchart illustrating a procedure for search operation according to Embodiment 1.

FIG. 17 is a flowchart illustrating a procedure for search operation (S160) according to this embodiment.

The search operation (S160) is a process executed by the data management device 600.

In step S161, the acceptance unit 610 accepts the search auxiliary key SK2, the public parameter PP, and the search query SQ. Then, the key management unit 620 saves and stores the search auxiliary key SK2 and the public parameter PP in the storage unit 690.

If the search auxiliary key SK2 and the public parameter PP have already been stored, only the search auxiliary key SK2 is replaced and stored.

More than one search query SQ may be accepted. In that case, step S162 to step S164 are executed for each search query SQ.

In step S162, the transformation unit 641 transforms the search query SQ using the search auxiliary key SK2 and the public parameter PP so as to generate the transformed search query TSQ.

Specifically, the transformation unit 641 calculates the transformed search query TSQ for the search query SQ={SQ1, SQ2}, as indicated below.

$$TSQ = (TSQ1, TSQ2)$$

$$TSQ1 = SQ1^{\wedge}SK2 \bmod N$$

$$TSQ2 = SQ2$$

In step S163, the checking unit 642 checks the transformed search query TSQ against each transformed encrypted tag TET in the registration database 691 so as to find a transformed encrypted tag TET that matches the transformed search query TSQ. Specifically, the checking unit 642 checks the transformed search query against each transformed encrypted tag TET, as indicated below. Note that i is an integer from 1 to m, and k is an integer of 1 or greater.

$$TET = (ID(D), TET1, \ldots, TETk)$$

$$TETi = (TETi1, TETi2)$$

$$M1 = TETi1^{\wedge}TSQ2 \bmod N$$

$$M2 = TSQ1^{\wedge}TETi2 \bmod N$$

$$M1 = ?\,M2$$

That is, whether M1 and M2 are equal is calculated for each transformed encrypted tag TET. If they are equal, a match is determined.

For example, when i=k=1, the transformed encrypted tag TET=(ID(D), TET1) can be expressed as indicated below.

$$\begin{aligned} TET11 &= G^{\wedge}(ek1 * EK2 * F(w) * kr) \\ &= G^{\wedge}(X * F(w) * kr) \end{aligned}$$

$$TET12 = kr$$

The transformed search query TSQ=(TSQ1, TSQ2) can be expressed as indicated below.

$$TSQ1 = G^{\wedge}(sk1 * SK2 * F(kw) * QR)$$
$$= G^{\wedge}(X * F(kw) * QR)$$
$$TSQ2 = QR$$

In this case, M1 and M2 can be expressed as indicated below.

$$M1 = G^{\wedge}(X * F(w) * kr)^{\wedge}QR \bmod N$$
$$= G^{\wedge}(X * F(w) * kr * QR) \bmod N$$
$$M2 = G^{\wedge}(X * F(w) * QR)^{\wedge}kr \bmod N$$
$$= G^{\wedge}(X * F(sw)(QR(kr) \bmod N$$

Therefore, if w is equal to sw, M1 is equal to M2. If w is not equal to sw, M1 is not equal to M2.

In step S164, the extraction unit 643 extracts the ID(D) of every transformed encrypted tag TET that has matched the transformed search query TSQ in step S163 so as to generate the search result DATA.

Specifically, the extraction unit 643 extracts the ID(D) of every transformed encrypted tag TET=(ID(D), TET1, . . . , TETk) found as a match and includes it in the search result DATA. Note that k is an integer of 1 or greater.

In step S165, the output unit 650 uses the communication device 605 to transmit the search result DATA to the search request device 500.

Referring back to FIG. 10, the description will be continued from step S170.

<Data Deletion: S170>

In step S170, the data management device 600 deletes the encrypted data C corresponding to a deletion file name. In this embodiment, transformed encrypted data, which is the encrypted data C that has been transformed, is the transformed encrypted tag TET.

The registration unit 630 of the data management device 600 acquires the identifier ID(D) of the plaintext data D to be deleted from the registration database 691, and deletes the transformed encrypted data corresponding to the identifier ID(D) from the registration database 691.

Specifically, this is as described below.

Figure 18:
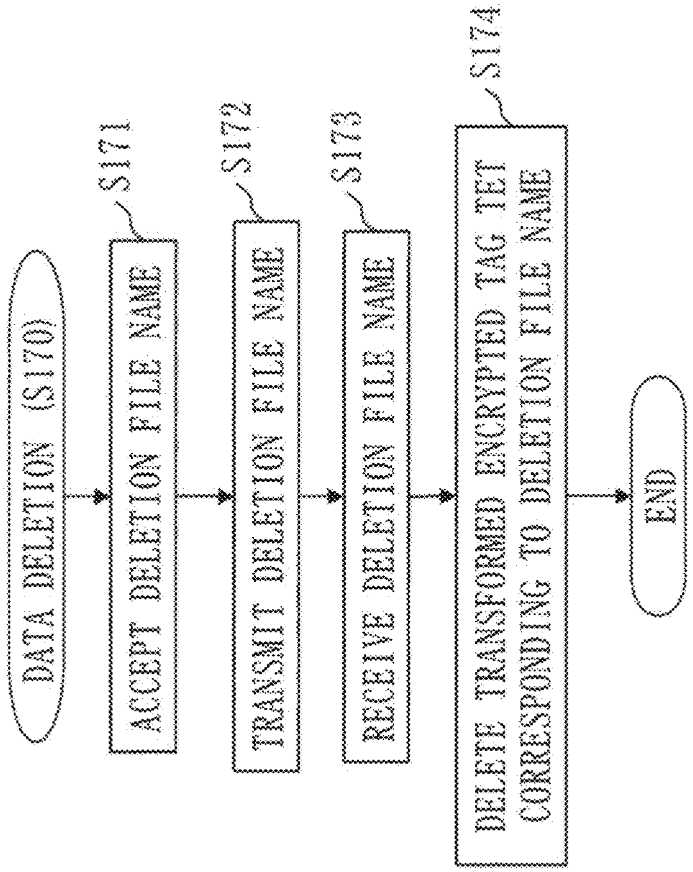
FIG. 18 is a flowchart illustrating a procedure for data deletion according to Embodiment 1.

FIG. 18 is a flowchart illustrating a procedure for data deletion (S170) according to this embodiment.

The data deletion (S170) is a process executed by the registration request device 400 and the data management device 600. However, in place of the registration request device 400, the search request device 500 or another device may be used.

In step S171, the acceptance unit 410 of the registration request device 400 accepts the deletion file name.

For example, the acceptance unit 410 accepts, via the input/output interface 404, the deletion file name that is input into the registration request device 400. Alternatively, the acceptance unit 410 may accept the deletion file name from an application program executed in the registration request device 400.

In step S172, the request unit 430 of the registration request device 400 uses the communication device 405 to transmit the deletion file name to the data management device 600.

In step S173, the acceptance unit 610 of the data management device 600 uses the communication device 605 to receive the deletion file name.

In step S174, the registration unit 630 of the data management device 600 deletes the transformed encrypted tag TET corresponding to the deletion file name from the registration database 691.

Specifically, the registration unit 630 deletes the transformed encrypted tag TET that includes the same data name ID(D) as the deletion file name.

Referring back to FIG. 10, the description will be continued from step S180.

<Divided Key Re-Generation: S180>

In step S180, the divided key generation device 300 re-generates a registration secret key EK' and a search secret key SK'. The divided key generation device 300 randomly re-generates the registration secret key EK' and the search secret key SK' using the master key MK and the public parameter PP. Then, the divided key generation device 300 replaces the registration secret key EK and the search secret key SK that have already been used with the registration secret key EK' and the search secret key SK'.

Figure 19:
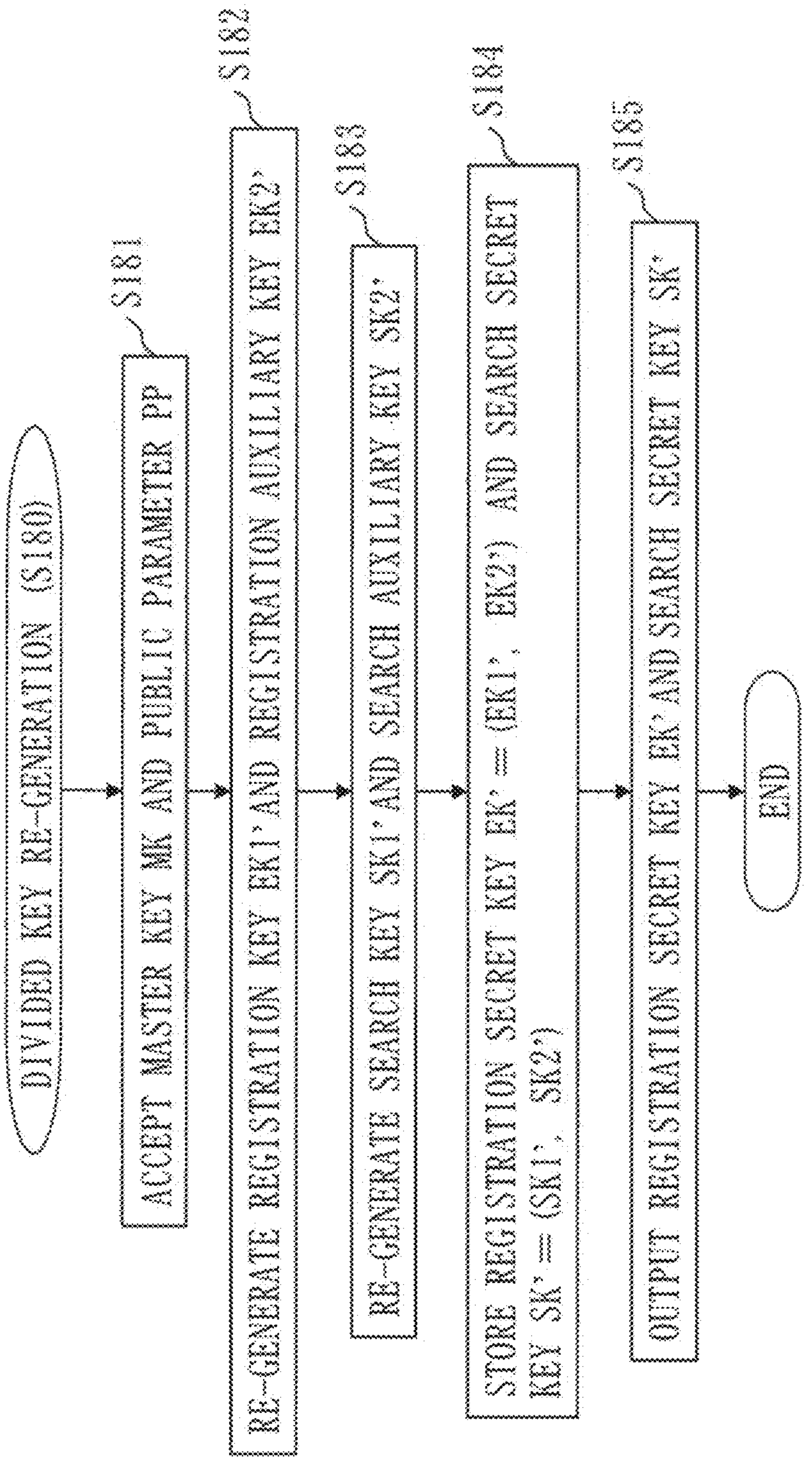
FIG. 19 is a flowchart illustrating a procedure for divided key re-generation according to Embodiment 1.

FIG. 19 is a flowchart illustrating a procedure for divided key re-generation (S180) according to this embodiment.

The divided key re-generation (S180) is a process executed by the divided key generation device 300.

In step S181, the acceptance unit 310 accepts the master key MK and the public parameter PP, and saves and stores the master key MK and the public parameter PP in the storage unit 390.

However, if the master key MK and the public parameter PP have already been stored, step S121 is not necessary.

In step S182, the divided key generation unit 320 re-generates the registration secret key EK'=(EK1', EK2') using the master key MK and the public parameter PP.

How it is re-generated specifically is the same as how the registration secret key EK is generated in step S122, so that it is omitted here.

In step S183, the divided key generation unit 320 re-generates the search secret key SK'=(SK1', SK2') using the master key MK and the public parameter PP. How it is re-generated specifically is the same as how the search secret key SK is generated in step S123, so that it is omitted here.

In step S184, the divided key generation unit 320 saves and stores the registration secret key EK' and the search secret key SK' as the registration secret key EK and the search secret key SK in the storage unit 390.

If the registration secret key EK and the search secret key SK have already been stored in the storage unit 390, the stored registration secret key EK and search secret key SK are replaced with the registration secret key EK' and the search secret key SK' newly generated in step S182 and step S183, respectively.

In step S185, the output unit 330 outputs the registration secret key EK' and the search secret key SK'.

For example, the output unit 330 uses the communication device 305 to transmit a registration key EK1' to the registration request device 400.

For example, the output unit 330 uses the communication device 305 to transmit a search key SK1' to the search request device 500.

For example, the output unit 330 uses the communication device 305 to transmit a registration auxiliary key EK2' and a search auxiliary key SK2' to the data management device 600.

For example, the output unit 330 uses the communication device 305 to transmit the registration secret key EK' and the search secret key SK' to the key transformation device 800.

The registration key EK1' is used for generating the encrypted data C.

The registration auxiliary key EK2' is used for transforming the encrypted data C.

The search key SK1' is used for generating the search query SQ.

The search auxiliary key SK2' is used for transforming the search query SQ.

Referring back to FIG. 10, the description will be continued from step S190.

<Transformation Key Generation: S190>

In step S190, the transformation key generation device 700 generates the transformation key TK for performing key transformation of the master key MK, the registration secret key EK, and the search secret key SK and for re-encrypting the transformed encrypted tag TET.

Figure 20:
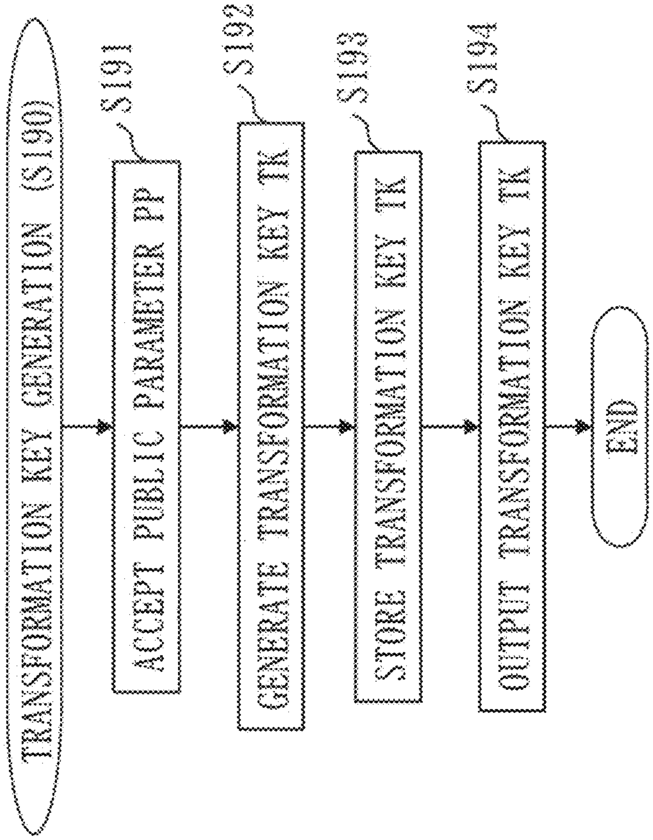
FIG. 20 is a flowchart illustrating a procedure for transformation key generation according to Embodiment 1.

FIG. 20 is a flowchart illustrating a procedure for transformation key generation (S190) according to this embodiment.

The transformation key generation (S190) is a process executed by the transformation key generation device 700.

In step S191, the acceptance unit 710 accepts the public parameter PP, and saves and stores the public parameter PP in the storage unit 790.

However, if the public parameter PP has already been stored, step S181 is not necessary.

In step S192, the generation unit 720 generates the transformation key TK using the public parameter PP.

Specifically, the divided key generation unit 320 randomly selects an integer TK from a set of integers of 1 to (N−1) {1, 2, . . . m, N−1}.

In step S193, the generation unit 720 saves and stores the transformation key TK in the storage unit 790.

In step S194, the output unit 730 outputs the transformation key TK.

For example, the output unit 730 uses the communication device 705 to transmit the transformation key TK to the key transformation device 800.

The transformation key TK is used for key transformation of the master key MK, the registration secret key EK, and the search secret key SK. It is also used for re-encrypting the transformed encrypted tag TET.

Referring back to FIG. 10, the description will be continued from step S200.

<Key Transformation: S200>

In step S200, the key transformation device 800 performs key transformation of the master key MK, the registration secret key EK, and the search secret key SK.

The key transformation device 800 performs key transformation of the master key MK, the registration secret key EK, and the search secret key SK using the transformation key TK. The key transformation device 800 outputs a key-transformed master key MK', a key-transformed registration secret key EK', and a key-transformed search secret key SK' obtained by key transformation.

Specifically, this is as described below.

Figure 21:
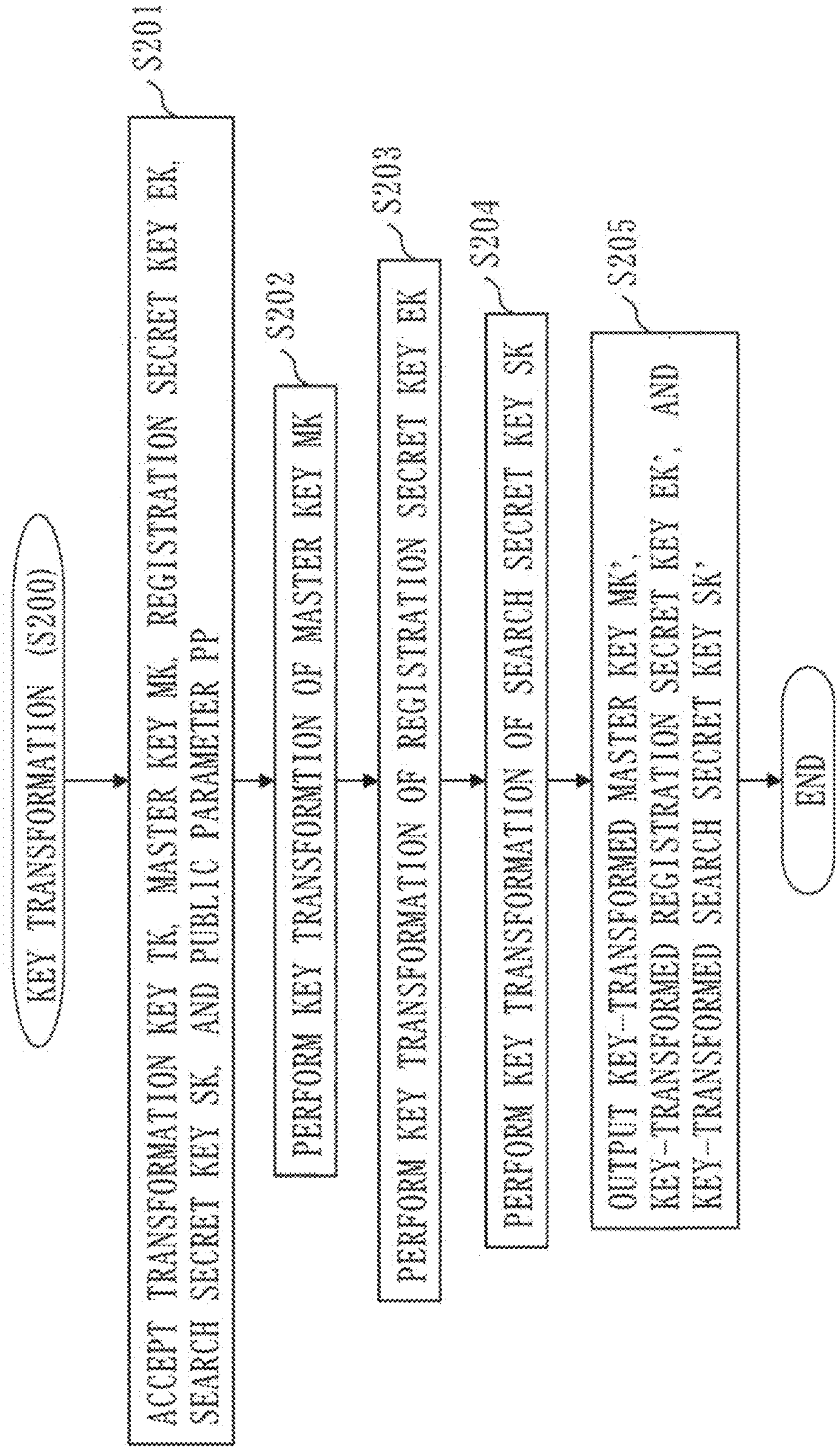
FIG. 21 is a flowchart illustrating a procedure for key transformation according to Embodiment 1.

FIG. 21 is a flowchart illustrating a procedure for key transformation (S200) according to this embodiment.

The key transformation (S200) is a process executed by the key transformation device 800.

In step S201, the acceptance unit 810 accepts the transformation key TK, the master key MK, the registration secret key EK, the search secret key SK, and the public parameter PP. Then, the acceptance unit 810 saves and stores the transformation key TK, the master key MK, the registration secret key EK, the search secret key SK, and the public parameter PP in the storage unit 690.

If the transformation key TK, the master key MK, the registration secret key EK, the search secret key SK, and the public parameter PP have already been stored, the transformation key TK, the master key MK, the registration secret key EK, and the search secret key SK are replaced and stored.

In step S202, the transformation unit 820 performs key transformation of the master key MK using the transformation key TK and the public parameter PP so as to generate the key-transformed master key MK'.

Specifically, the transformation unit 820 calculates the key-transformed master key MK' for the master key MK=(P, Q, G, Z, X), as indicated below.

$$MK' = *P, Q, G', Z, X')$$

$$G' = G^{\wedge}(TK^{\wedge}2) \bmod N$$

$$X' = X * TK^{\wedge}2 \bmod Z$$

In step S203, the transformation unit 820 performs key transformation of the registration secret key EK using the transformation key TK and the public parameter PP so as to generate the key-transformed registration secret key EK'.

Specifically, the transformation unit 820 calculates the key-transformed registration secret key EK' for the registration secret key EK=(EK1, EK2), as indicated below.

$$EK' = (EL1', EK2')$$

$$EK1' = EK1^{\wedge}TK \bmod N \left( = G^{\wedge}\{ek1 * TK\} \bmod N \right)$$

$$EK2' = EK2 * TK$$

In the above, key transformation is performed on the registration key EK1 and the registration auxiliary key EK2 at the same time, but key transformation may be performed only on one of the registration key EK1 and the registration auxiliary key EK2. In particular, the size of the registration key EK1 does not increase even when it is updated, but the size of the registration auxiliary key EK2 increases when it is updated. Therefore, updating only EK1 can prevent an increase in size.

If key transformation is performed only on one of the registration key EK1 and the registration auxiliary key EK2, key transformation is performed only on one of the search key SK1 and the search auxiliary key SK2 also in step S204 later. Furthermore, key transformation of the master key MK in step S203 is changed as indicated below.

$$MK' = (P, Q, G', Z, X')$$

$$G' = G^{\wedge}TK \bmod N$$

$$X' = X * TK \bmod Z$$

In step S204, the transformation unit 820 performs key transformation of the search secret key SK using the transformation key TK and the public parameter PP so as to generate the key-transformed search secret key SK'.

Specifically, the transformation unit 820 calculates the key-transformed search secret key SK' for the search secret key SK=(SK1, SK2), as indicated below.

$$SK' = (SK1', SK2')$$

$$SK1' = SK1^{\wedge}TK \bmod N \left( = G^{\wedge}\{sk1 * TK\} \bmod N \right)$$

$$SK2' = SK2 * TK$$

As described above, if key transformation is performed on only one of the registration key EK1 and the registration auxiliary key EK2 in step S203, key transformation is performed only on one of the search key SK1 and the search auxiliary key SK2 also in step S204. In this case, the key-transformed master key MK' is calculated as G'=G^TK mod N and X'=X*TK mod Z.

In step S205, the output unit 830 outputs the key-transformed master key MK', the key-transformed registration secret key EK', and the key-transformed search secret key SK'.

In particular, the key-transformed master key MK' is stored by being replaced with the master key MK stored in the storage unit 290 of the master key generation device 200 and the master key MK stored in the storage unit 390 of the divided key generation device 300.

The key-transformed registration secret key EK' and the key-transformed search secret key SK' are stored by being replaced with the registration secret key EK and the search secret key SK stored in the storage unit 390 of the divided key generation device 300, respectively.

The key-transformed registration key EK1' is stored by being replaced with the registration key EK1 stored in the storage unit 490 of the registration request device 400.

The key-transformed search key SK1' is stored by being replaced with the search key SK1 stored in the storage unit 590 of the search request device 500.

The key-transformed registration auxiliary key EK2' and the key-transformed search auxiliary key SK2' are stored by being replaced with the registration auxiliary key EK2 and the search auxiliary key SK2 stored in the storage unit 690 of the data management device 600, respectively.

Referring back to FIG. 10, the description will be continued from step S210.

<Re-Encryption: S210>

In step S210, the re-encryption device 900 re-encrypts the transformed encrypted tag TET.

The re-encryption unit 920 of the re-encryption device 900 acquires the transformation key TK, the public parameter PP, and the transformed encrypted data, and re-encrypts the transformed encrypted data using the transformation key TK and the public parameter PP. The re-encryption unit 920 outputs re-encrypted transformed encrypted data obtained by re-encryption.

The registration unit 630 of the data management device 600 acquires the re-encrypted transformed encrypted data from the re-encryption device 900, and replaces the transformed encrypted data registered in the registration database 691 with the re-encrypted transformed encrypted data.

In the following, the re-encrypted transformed encrypted data is a re-encrypted transformed encrypted tag TET'.

Specifically, this is as described below.

Figure 22:
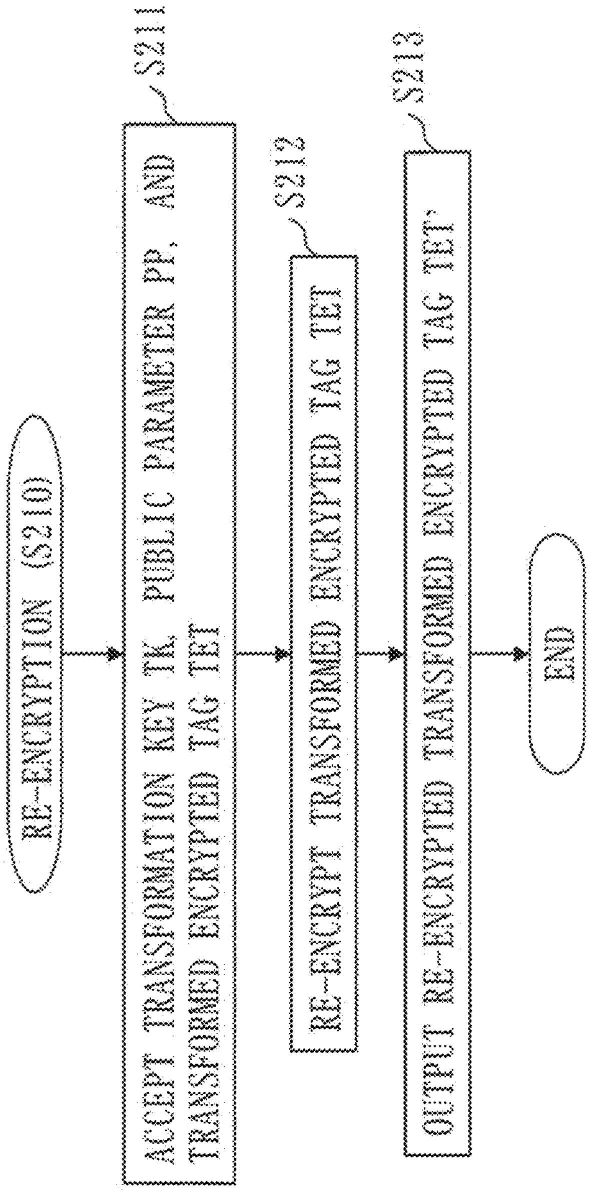
FIG. 22 is a flowchart illustrating a procedure for re-encryption according to Embodiment 1.

FIG. 22 is a flowchart illustrating a procedure for re-encryption (S210) according to this embodiment.

The re-encryption (S210) is a process executed by the re-encryption device 900.

In step S211, the acceptance unit 910 accepts the transformation key TK, the public parameter PP, and the transformed encrypted tag TET, and saves and stores the transformation key TK and the public parameter PP in the storage unit 990.

More than one transformed encrypted tag TET may be accepted. In that case, step S212 and step S213 are executed for each transformed encrypted tag TET.

In step S212, the re-encryption unit 920 re-encrypts the transformed encrypted tag TET using the transformation key TK and the public parameter PP so as to generate the re-encrypted transformed encrypted tag TET'.

Specifically, the re-encryption unit 920 calculates the re-encrypted transformed encrypted tag TET' for the transformed encrypted tag TET=(ID(D), TET1, . . . , TETk), as indicated below. Note that TETi=(TETi1, TETi2) and i is an integer from 1 to k.

$$TET' = (ID(D), TET1', \ldots, TETk')$$

$$TETi' = (TETi1', TETi2')$$

$$TETi1' = TETi1^{\wedge}TK \bmod N$$

$$TETi2' = TETi2$$

If TETi' also needs to be randomized to enhance security in re-encryption, it is calculated as indicated below.

First, an integer RR is randomly selected from a set of integers of 1 to (N−1) {1, 2, . . . , N−1}.

Next, the following is calculated for each TETi'=(TETi1', TETi2').

$$TETi1' = TETi1^{\wedge}(TK * RR) \bmod N$$

$$TETi2' = TETi2 * RR$$

In step S213, the output unit 930 outputs the re-encrypted transformed encrypted tag TET'.

In particular, the re-encrypted transformed encrypted tag TET' is stored by being replaced with the transformed encrypted tag TET stored in the registration database 691 in the storage unit 690 of the data management device 600.

*Description of Effect of the Embodiment*

The searchable encryption system according to this embodiment provides effects such that by dividing and distributing keys, encryption and registration by registrants can be controlled and searchable-encryption searches by searchers can also be controlled.

The searchable encryption system according to this embodiment divides a secret key into two keys by divided key generation. If one of the keys is deleted, a search cannot be performed with only the other one of the keys. Therefore, key revocation can be performed.

Furthermore, the searchable encryption system according to this embodiment can generate new divided keys each time even if divided key generation is performed many times. Therefore, past divided keys will not appear, and key revocation can be achieved securely.

The searchable encryption system according to this embodiment can perform key transformation of divided keys using a transformation key so as to generate new keys, and can also re-encrypt encrypted data corresponding to the new keys in a searchable format without decrypting the encrypted data. Therefore, high security can be achieved, and re-encryption processing can be performed efficiently.

Furthermore, the searchable encryption system according to this embodiment can generate a new transformation key each time even if transformation keys are generated many times. Therefore, past transformation keys will not appear, and key transformation or re-encryption can be achieved securely.

The searchable encryption system according to this embodiment can randomize encrypted tags and search queries using random numbers. Therefore, encrypted tags and search queries can be probabilistically generated to be different values each time. For this reason, it is difficult to infer plaintext data and search keywords contained in encrypted tags and search queries from the encrypted tags and the search queries. Therefore, high security can be achieved.

As described above, the searchable encryption system according to this embodiment makes it possible, by dividing and distributing keys, to achieve updating or revocation of keys and also to re-encrypt encrypted data for searchable-encryption searches with a new key without decrypting the encrypted data. Furthermore, encrypted data can be generated probabilistically.

Embodiment 2

In this embodiment, differences from Embodiment 1 and additions to Embodiment 1 will be mainly described.

In this embodiment, components with substantially the same functions as those in Embodiment 1 will be denoted by the same reference signs, and their description will be omitted.

In this embodiment, an embodiment in which an encrypted index EI is used in place of the encrypted tag ET described in Embodiment 1 will be described.

This embodiment will be described based on FIGS. 23 to 31.

*Description of Configuration*

The configuration of the searchable encryption system 100 is the same as the configuration of FIG. 1 in Embodiment 1.

However, the configuration of the registration request device 400 is partially different from the configuration in Embodiment 1.

Figure 23:
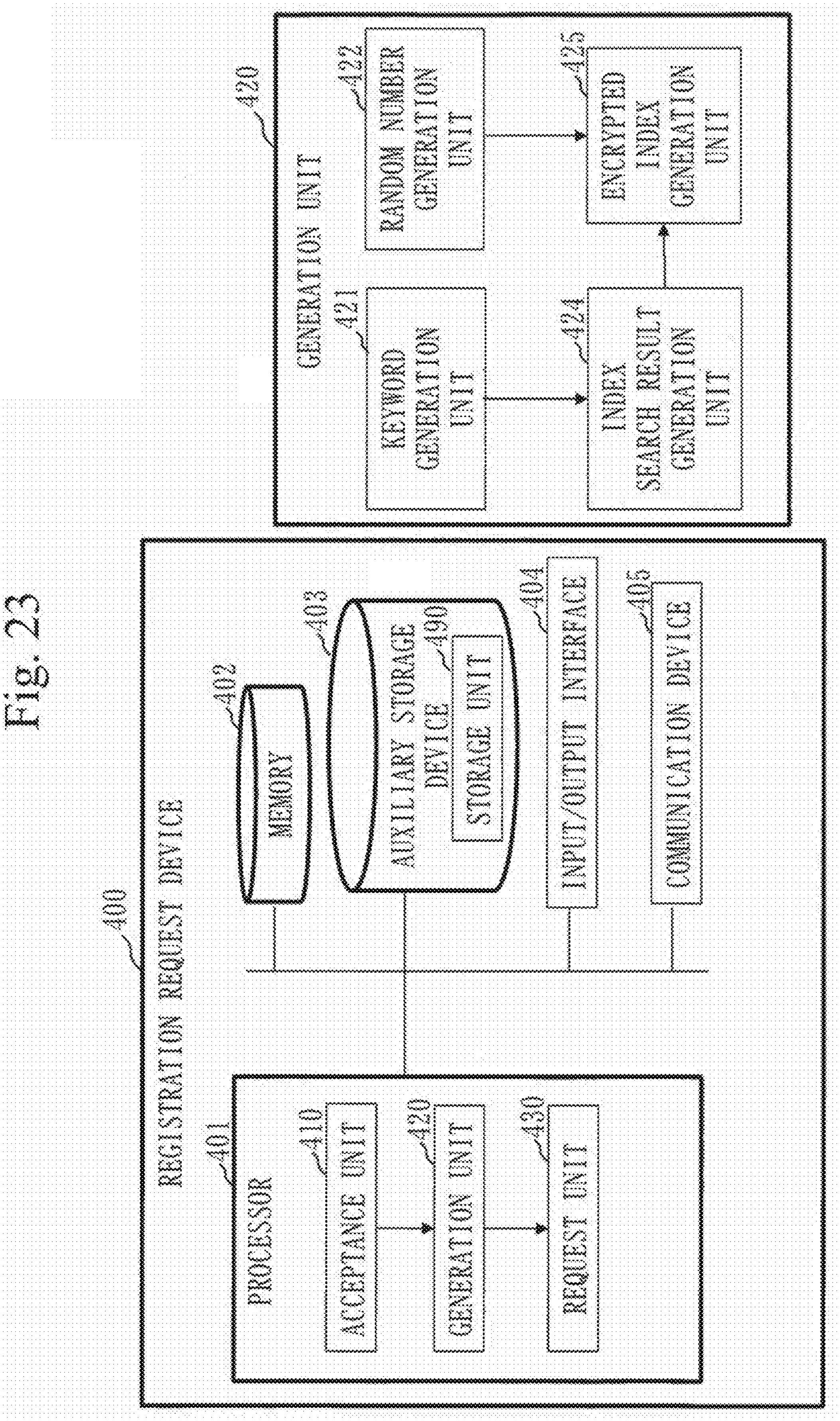
FIG. 23 is a figure illustrating an example of a configuration of the registration request device according to Embodiment 2.

FIG. 23 is a figure illustrating an example of a configuration of the generation unit 420 in the registration request device 400 according to this embodiment.

The registration request device 400 includes elements such as an index search result generation unit 424 and an encrypted index generation unit 425 in place of the encrypted tag generation unit 423 of Embodiment 1.

*Description of Operation*

The operation of the searchable encryption system 100 according to this embodiment will now be described. A procedure for the operation of the searchable encryption system 100 is equivalent to the searchable encryption method. A program that realizes the operation of the searchable encryption system 100 is equivalent to the searchable encryption program.

Figure 24:
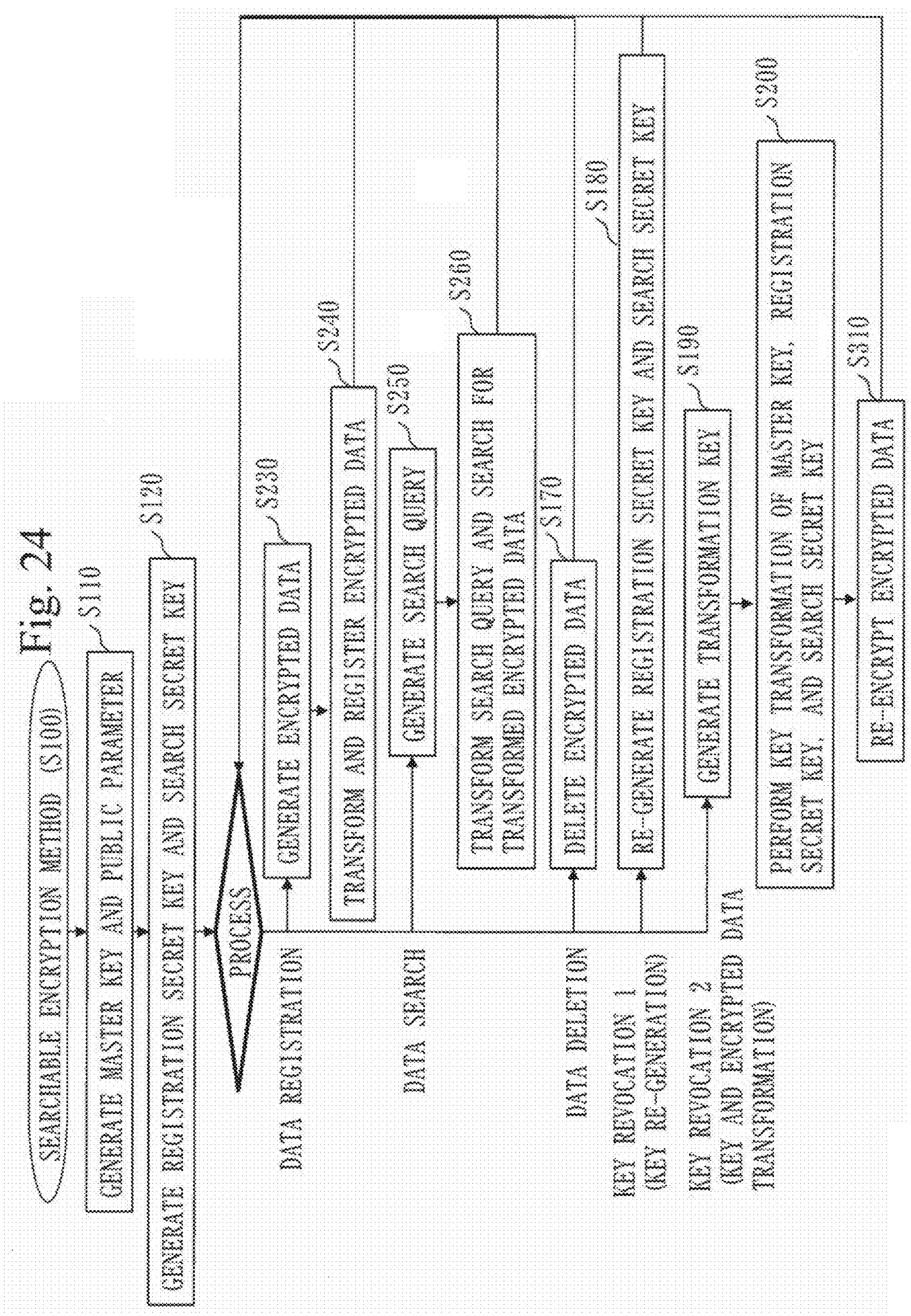
FIG. 24 is a flowchart illustrating operation of the searchable encryption system according to Embodiment 2.

FIG. 24 is a flowchart illustrating the operation of the searchable encryption system 100 according to this embodiment.

Step S110, step S120, step S170, step S180, step S190, and step S200 are as described in Embodiment 1.

Step S230, step S240, step S250, step S260, and step S310 will be described below.

<Registration Request: S230>

In step S230, the registration request device 400 generates the encrypted data C and transmits the encrypted data C to the data management device 600.

The generation unit 420 of the registration request device 400 acquires the registration key EK1, plaintext data D, and the public parameter PP. Then, the generation unit 420 generates the encrypted data C by encrypting the plaintext data D using the registration key EK1 and the public parameter PP. At this time, the generation unit 420 generates a random number used for generating the encrypted data C, using the public parameter PP. Then, the generation unit 420 generates the encrypted data using the registration key EK1, the public parameter PP, and the random number. The encrypted data can be randomized by this random number.

In this embodiment, the generation unit 420 searches for a plurality of pieces of plaintext data using registration keywords contained in each piece of plaintext data of the plurality of pieces of plaintext data. The generation unit 420 encrypts an index search result RES, which indicates a search result in an index structure, using the registration key EK1, the public parameter PP, and a random number, and generates an encrypted index EI obtained by encryption as the encrypted data C.

Specifically, this is as described below.

Figure 25:
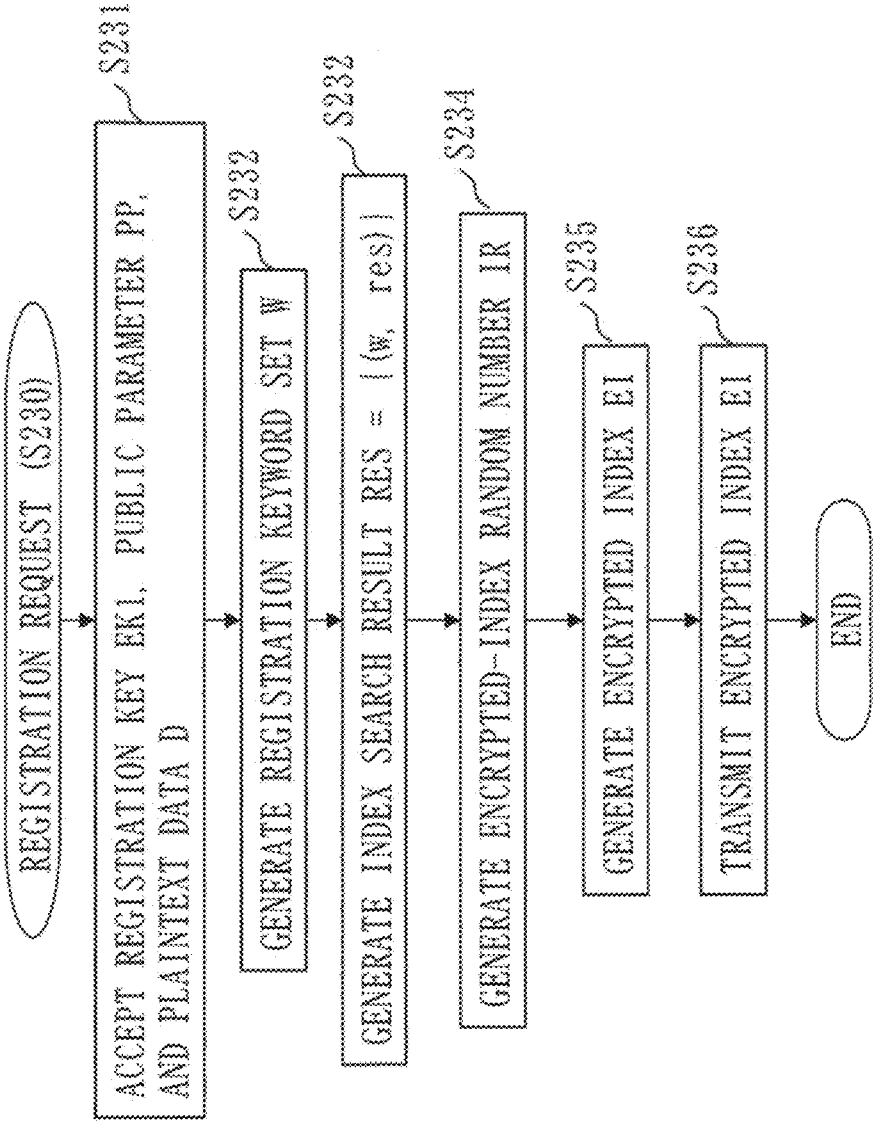
FIG. 25 is a flowchart illustrating a procedure for registration request according to Embodiment 2.

FIG. 25 is a flowchart illustrating a procedure for registration request (S230) according to this embodiment.

The registration request (S230) corresponds to the registration request (S130) in Embodiment 1.

In step S231, the acceptance unit 410 accepts the registration key EK1, the public parameter PP, and plaintext data D.

Step S231 is the same as step S131 in Embodiment 1.

One piece or a plurality pieces of plaintext data D may be accepted. This embodiment will be described assuming that a plurality of pieces of plaintext data D are accepted. In this case, the plurality of pieces of plaintext data are expressed as {D} and it is assumed that n pieces of data are accepted. In this case, the plurality of pieces of plaintext data {D} are expressed as {D1, . . . , Dn}.

In step S232, the keyword generation unit 421 generates a registration keyword set W.

Step S232 is the same as step S132 in Embodiment 1. The registration keyword set W is generated for each piece of plaintext data of the plurality of pieces of plaintext data {D}. These plurality of registration keyword sets are expressed as {W}, and when the plurality of pieces of plaintext data {D} include m pieces of plaintext data, the plurality of registration keyword sets {W} can be expressed as {W1, . . . , Wm}. Note that m is an integer of 1 or greater. In this case, the registration keyword set corresponding to D1 is W1, and the registration keyword set corresponding to Dm is Wm.

In step S233, the index search result generation unit 424 generates an index search result RES based on the plurality of registration keyword sets {W}.

Specifically, for the plurality of registration keyword sets {W}, the index search result generation unit 424 generates data including one or more data names ID(D) corresponding to each registration keyword w included in each registration keyword set Wi. The generated data is the index search result RES. The index search result RES may also be referred to as a search result.

The index search result RES is expressed as indicated below.

$$RES = \{(w, res)\}$$

"w" is a keyword and is included in one registration keyword set Wi of the plurality of registration keyword sets {W}.

"res" is a set of identifiers each of which is a data name ID(D), and res includes one or more identifiers.

FIG. 26 is a figure illustrating an example of a configuration of the index search result RES according to this embodiment.

As illustrated in FIG. 26, the index search result RES has an inverted index structure. That is, it has a structure such that an identifier to be found as a match can be looked up in reverse from a keyword.

In FIG. 26, the index search result RES associates each keyword with one or more data names.

Referring back to FIG. 25, the description will be continued from step S234.

In step S234, the random number generation unit 422 generates an encrypted-index random number IR.

Specifically, the random number generation unit 422 randomly selects integers ir1 and ir2 from a set of integers of 1 to (N−1) {1, 2, . . . , N−1} and generates the encrypted-index random number IR=(ir1, ir2).

If randomization is not required in consideration of high-speed searchable encryption processing, ir1 and ir2 may be set as ir1=ir2=1.

In step S235, the encrypted index generation unit 425 encrypts the index search result RES using the registration key EK1, the public parameter PP, and the encrypted-index random number IR so as to generate an encrypted index EI.

This encrypted index EI is the encrypted data C in this embodiment.

The encrypted index EI is the index search result RES that has been encrypted, and includes encrypted keywords key and encrypted identifiers val.

The encrypted keywords key are the registration keywords w that have been encrypted.

The set of encrypted identifiers val is the set of identifiers res that has been encrypted.

For example, the encrypted index EI is expressed as indicated below.

$$EI = \{(\text{key}, val)\}$$

$$\text{key} = (\text{key1}, \text{key2})$$

$$\text{key1} = EK1^{\wedge}(F(w\|0) * ir1) \bmod N$$

$$\text{key2} = ir1$$

$$val = (val1, val2)$$

$$val1 = EK1^{\wedge}(F(w\|1) * ir2 * res) \bmod N$$

$$val2 = ir2$$

"||" denotes concatenation of character strings. The encrypted index EI has a unique identifier and its value is written as ID(EI).

In order to calculate val2, res may be treated as binary and may be converted into an integer from 1 to N−1 for calculation. Alternatively, the presence or absence of ID(D) included in res may be changed to a bit representation for calculation. For example, if ID(D1) and ID(Dn) correspond to the plurality of keyword sets {W1, . . . , Wn} and a certain registration keyword w, the above val2 can be calculated by handling the bit representation of "ID(D1)||ID(Dn)" after converting it into an integer from 1 to N−1 in the former case. In the latter case, an n-bit representation such as "10 . . . 01" is possible, and the above val2 can be calculated by handling this n-bit value after converting it into an integer from 1 to N−1.

In step S236, the request unit 430 transmits the encrypted index EI to the data management device 600.

<Registration Operation: S240>

In step S240, the data management device 600 receives the encrypted data C, transforms the encrypted data C, and stores it in the storage unit 690. In this embodiment, the encrypted data C is the encrypted index EI.

Figure 27:
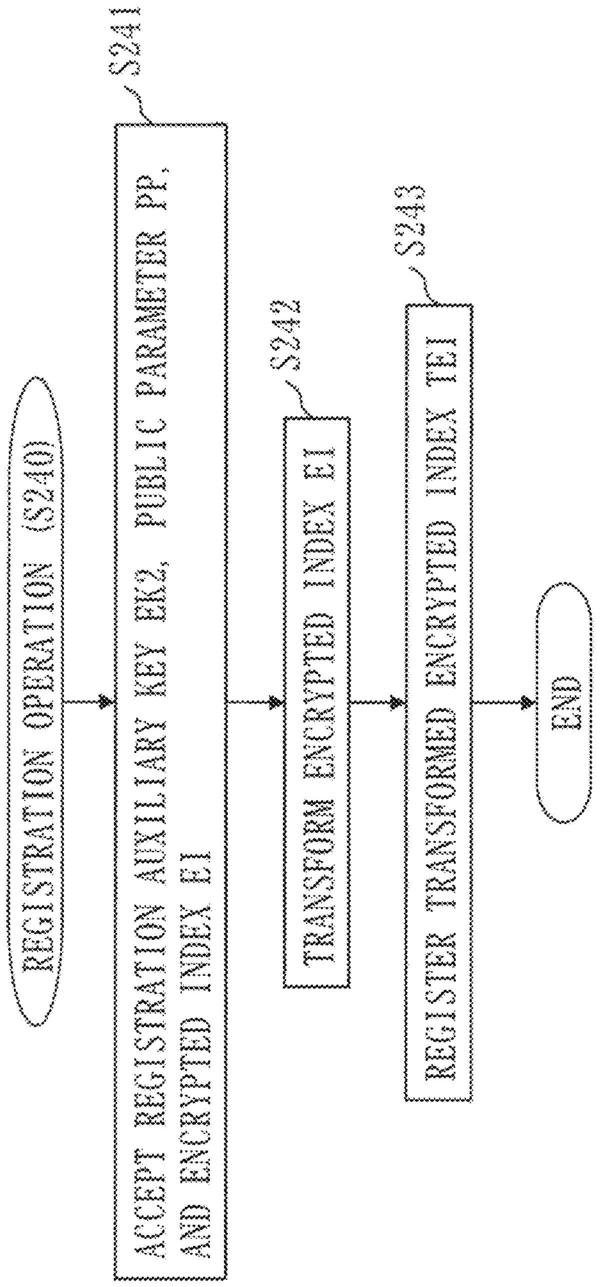
FIG. 27 is a flowchart illustrating a procedure for registration operation according to Embodiment 2.

FIG. 27 is a flowchart illustrating a procedure for registration operation (S240) according to this embodiment.

The registration operation (S240) is a process executed by the data management device 600.

In step S241, the acceptance unit 610 accepts the registration auxiliary key EK2, the public parameter PP, and the encrypted index EI. Then, the key management unit 620 saves and stores the registration auxiliary key EK2 and the public parameter PP in the storage unit 690.

If the registration auxiliary key EK2 and the public parameter PP have already been stored, only the registration auxiliary key EK2 is replaced and stored.

More than one encrypted index EI may be accepted. In that case, step S242 and step S243 are executed for each encrypted index EI.

In step S242, the transformation unit 631 transforms the encrypted index EI using the registration auxiliary key EK2 and the public parameter PP so as to generate a transformed encrypted index TEI.

Specifically, the transformation unit 631 calculates the transformed encrypted index TEI for the encrypted index EI={(key, val)}, as indicated below. Note that key=(key1, key2) and val=(val1, val2).

$$TEI = \{(Tkey, Tval)\}$$

$$Tkey = (Tkey1, Tkey2)$$

$$Tkey1 = \text{key1}^{\wedge}EK2 \bmod N$$

$$Tkey2 = \text{key2}$$

$$Tval = (Tval1, Tval2)$$

$$Tval1 = val1^{\wedge}EK2 \bmod N$$

$$Tval2 = val2$$

In step S243, the storing unit 632 registers the transformed encrypted index TEI in a registration database 691A.

The registration database 691A is saved and stored in the storage unit 690 of the data management device 600.

FIG. 28 is a figure illustrating an example of the registration database 691A according to this embodiment.

In FIG. 28, data of one row corresponds to one transformed encrypted index TEI.

In data of one row, a data name ID(EI) and a transformed encrypted index TEI are associated with each other.

<Search Request: S250>

In step S250, the search request device 500 generates the search query SQ, and transmits the search query SQ to the data management device 600.

Figure 29:
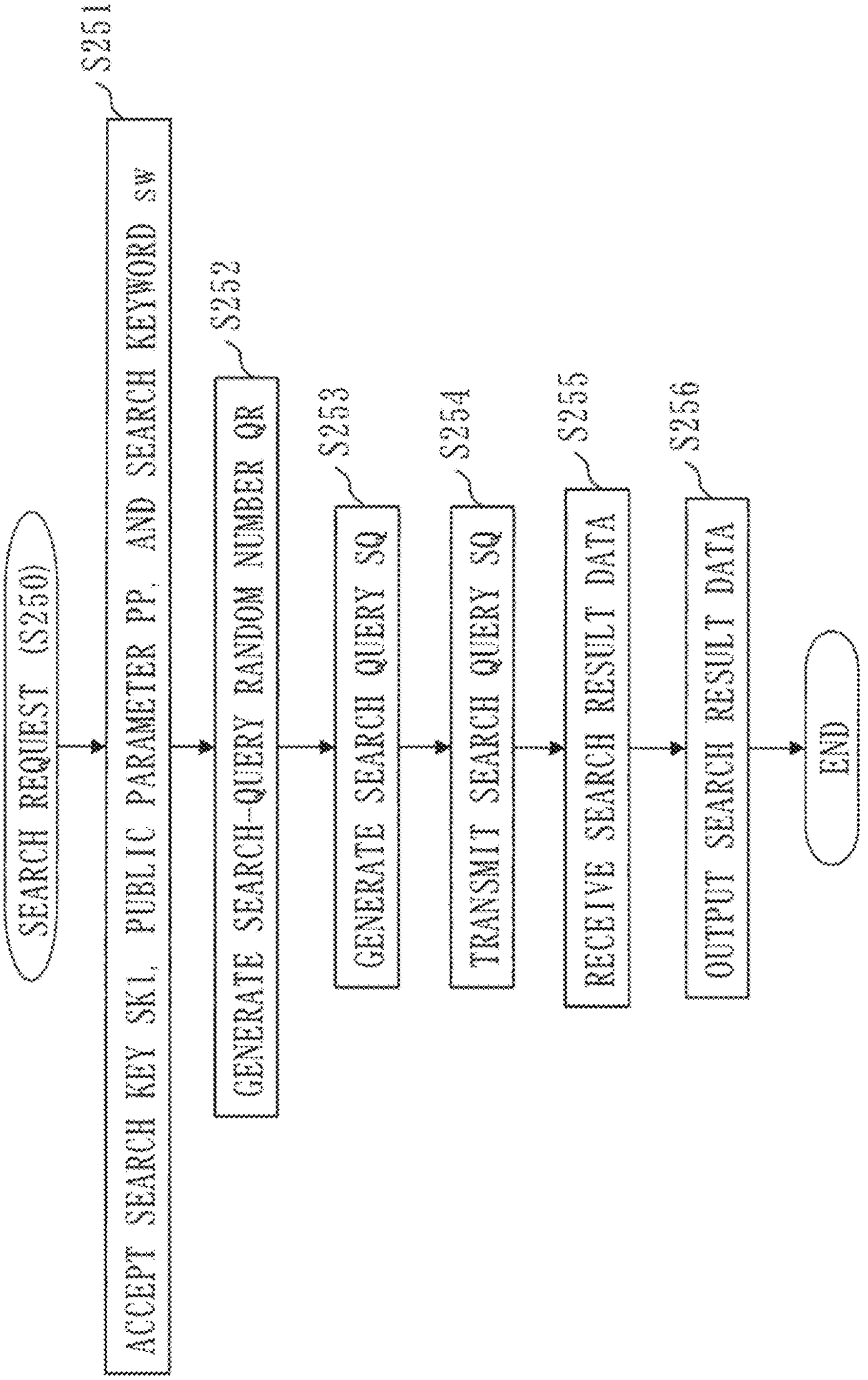
FIG. 29 is a flowchart illustrating a procedure for search request according to Embodiment 2.

FIG. 29 is a flowchart illustrating a procedure for search request (S250) according to this embodiment.

The search request (S250) is a process executed by the search request device 500.

In step S251, the acceptance unit 510 accepts the search key SK1, the public parameter PP, and the search keyword sw.

Step S251 is the same as step S151 in Embodiment 1.

In step S252, the random number generation unit 521 generates a search-query random number QR using the public parameter PP.

The search-query random number QR is a random number for encrypting the search query SQ.

Specifically, the random number generation unit 521 randomly selects integers QR1 and QR2 from a set of integers of 1 to (N−1) {1, 2, . . . , N−1} and generates the search-query random number QR=(qr1, qr2).

If randomization is not required in consideration of high-speed searchable encryption processing, the value of QR may be set as QR=1.

In step S253, the search query generation unit 522 encrypts the search keyword sw using the search key SK1, the public parameter PP, and the search-query random number QR so as to generate the search query SQ.

Specifically, the search query generation unit 522 calculates the following search query SQ for the search keyword sw and the search-query random number QR.

$$SQ = (SQ1, SQ2)$$
$$SQ1 = (SQ11, SQ12)$$
$$SQ11 = SK1^{\wedge}(F(sw\|0) * qr1) \bmod N$$
$$SQ12 = qr1$$
$$SQ2 = (SQ21, SQ22)$$
$$SQ21 = SK1^{\wedge}(F(sw\|1) * qr2) \bmod N$$
$$SQ22 = qr2$$

In step S254, the request unit 530 transmits the search query SQ to the data management device 600.

Step S254 is the same as step S154 in Embodiment 1.

In step S255, the request unit 530 uses the communication device 505 to receive the search result DATA from the data management device 600.

Step S255 is the same as step S155 in Embodiment 1.

In step S256, the output unit 540 outputs the search result DATA.

Step S256 is the same as step S156 in Embodiment 1.

<Search Operation: S260>

In step S260, the data management device 600 searches for transformed encrypted data that matches the search query SQ. In this embodiment, transformed encrypted data, which is the encrypted data C that has been transformed, is the transformed encrypted index TEI.

Figure 30:
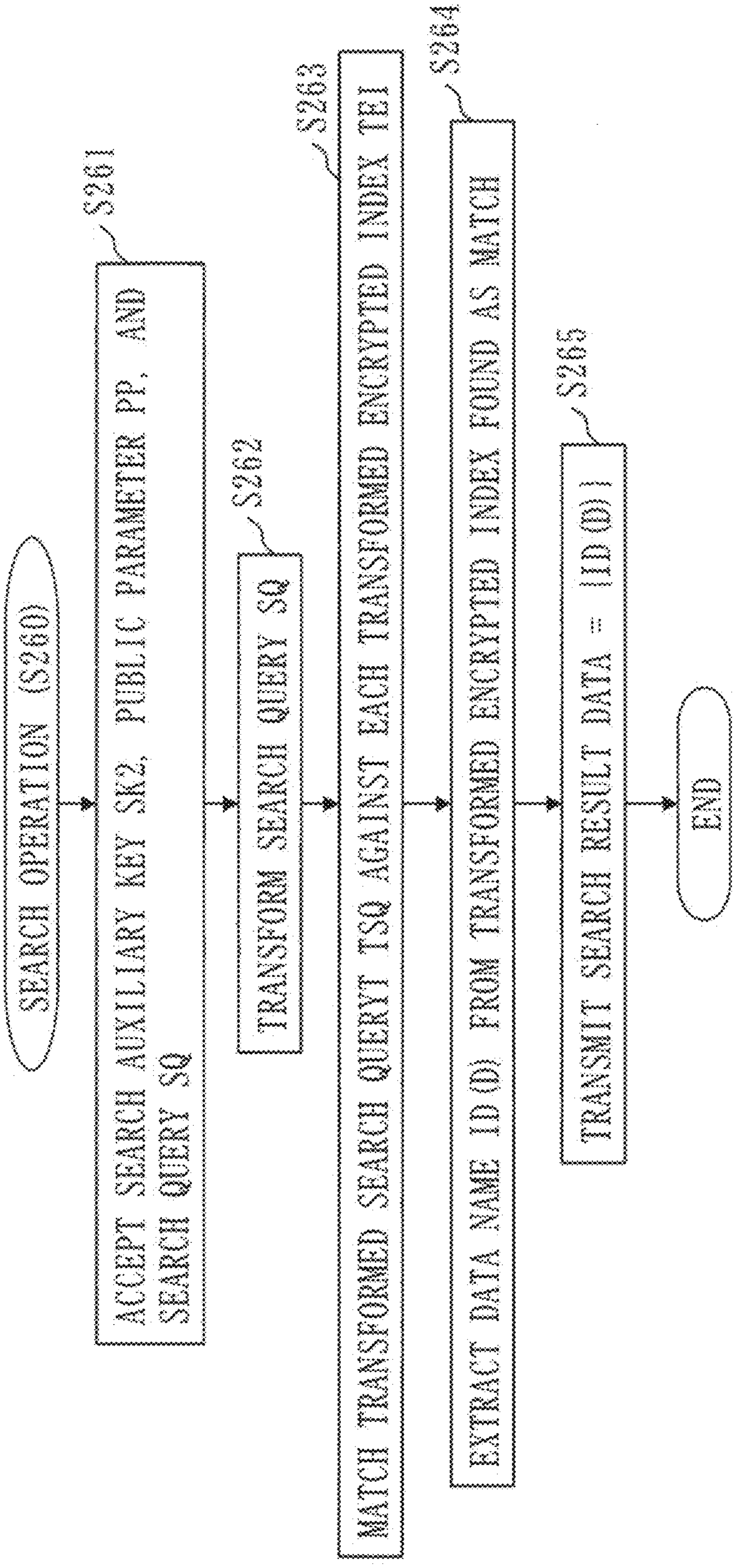
FIG. 30 is a flowchart illustrating a procedure for search operation according to Embodiment 2.

FIG. 30 is a flowchart illustrating a procedure for search operation (S260) according to this embodiment.

The search operation (S260) is a process executed by the data management device 600.

In step S261, the acceptance unit 610 accepts the search auxiliary key SK2, the public parameter PP, and the search query SQ. Then, the key management unit 620 saves and stores the search auxiliary key SK2 and the public parameter PP in the storage unit 690.

If the search auxiliary key SK2 and the public parameter PP have already been stored, only the search auxiliary key SK2 is replaced and stored.

More than one search query SQ may be accepted. In that case, step S262 to step S264 are executed for each search query SQ.

In step S262, the transformation unit 641 transforms the search query SQ using the search auxiliary key SK2 and the public parameter PP so as to generate a transformed search query TSQ.

Specifically, the transformation unit 641 calculates the transformed search query TSQ for the search query SQ={SQ1, SQ2}={(SQ11, SQ12), (SQ21, SQ22)}, as indicated below.

$$TSQ = (TSQ1, TSQ2)$$
$$TSQ1 = (TSQ11, TSQ12)$$
$$TSQ11 = AQ11^{\wedge}SK2 \bmod N$$
$$TSQ12 = SQ12$$
$$TSQ2 = (TSQ11, TSQ12)$$
$$TSQ21 = SQ21^{\wedge}SK2 \bmod N$$
$$TSQ22 = SQ22$$

In step S263, the checking unit 642 checks the transformed search query TSQ against each transformed encrypted index TEI in the registration database 691A so as to find encrypted data with a data name ID(D) that matches the transformed search query TSQ.

Specifically, the checking unit 642 checks the transformed search query TSQ=(TSQ1, TSQ2) against each Tkey of each transformed encrypted index TEI={(Tkey, Tval)}, as indicated below.

$$Tkey = (Tkey1, Tkey2)$$
$$TSQ1 = (TSQ11, TSQ12)$$
$$M11 = Tkey1^{\wedge}TSQ12 \bmod N$$
$$M12 = TSQ11^{\wedge}Tkey2 \bmod N$$
$$M11 = ?M12$$

That is, whether M11 and M12 are equal is calculated for the transformed search query TSQ and each Tkey of each transformed encrypted index TEI. If they are equal, attention is focused on Tval corresponding to that Tkey and the process proceeds to the next step S264. If they are not equal, whether M11 and M12 match is determined for the next Tkey. If M11 and M12 do not match for all Tkey, DATA is treated as an empty set and step S264 is omitted.

M11 and M12 can be expressed as indicated below.

$$M11 = Tkey1^{\wedge}TSQ12 \bmod N$$
$$= G^{\wedge}(ek1 * EK2 * F(w\|0) * ir1)^{\wedge}qr1 \bmod N$$
$$= G^{\wedge}(X * F(w\|0) * ir1 * qr1) \bmod N$$
$$M12 = TSQ11^{\wedge}Tkey2 \bmod N$$
$$= G^{\wedge}(sk1 * SK2 * F(sw\|0) * qr1)^{\wedge}ir1 \bmod N$$
$$= G^{\wedge}(X * F(sw\|0) * qr1 * ir1) \bmod N$$

Therefore, if w is equal to sw, then M11 is equal to M12. If w is not equal to sw, then M11 is not equal to M12.

That is, if the search keyword sw matches any one of the pieces of plaintext data, M11 and M12 always match in one Tval, and the process proceeds to step S264.

In step S264, the extraction unit 643 finds a set of data names ID(D) that match the transformed search query TSQ from Tval associated with Tkey found as a match in step S263.

Specifically, using the transformed search query TSQ=(TSQ1, TSQ2), the extraction unit 643 calculates DATA for Tval associated with They found as a match in step S263, as indicated below.

$$Tval = (Tval1, Tval2)$$

$$TSQ2 = (TSQ21, TSQ22)$$

$$M21 = TSQ1^{\wedge}Tval2 \bmod N$$

$$M22 = Tval1^{\wedge}TSQ22 \bmod N$$

$$\text{DATA} = \text{DLog\_}\{M21\}(M22)$$

Note that DLog_{M21}(M22) represents the discrete logarithm of M22 with M21 as the base.

M2 and DATA can be expressed as indicated below. It is assumed here that the registration keyword w and the search keyword sw match, so that w=sw.

$$M21 = TSQ21^{\wedge}Tval2 \bmod N$$

$$= G^{\wedge}(sk1 * SK2 * F(w\|1) * qr1)^{\wedge}ir1 \bmod N$$

$$= G^{\wedge}(X * F(w\|1) * qr1 * ir1) \bmod N$$

$$M22 = Tval1^{\wedge}TSQ22 \bmod N$$

$$= G^{\wedge}(ek1 * EK2 * F(w\|1) * ir1 * res)^{\wedge}qr2 \bmod N$$

$$= G^{\wedge}(X * F(w\|1) * qr2 * ir2 * res) \bmod N$$

Therefore, M22 is equal to M21^res mod N. If the value of res is small, the discrete logarithm can be calculated efficiently. In this case, DATA is equal to res, and res is a set of identifiers of plaintext data. That is, DATA is the search result for the search keyword sw.

In step S265, the output unit 650 uses the communication device 605 to transmit the search result DATA to the search request device 500.

<Re-Encryption: S310>

In step S310, the re-encryption device 900 re-encrypts the transformed encrypted index TEI.

Figure 31:
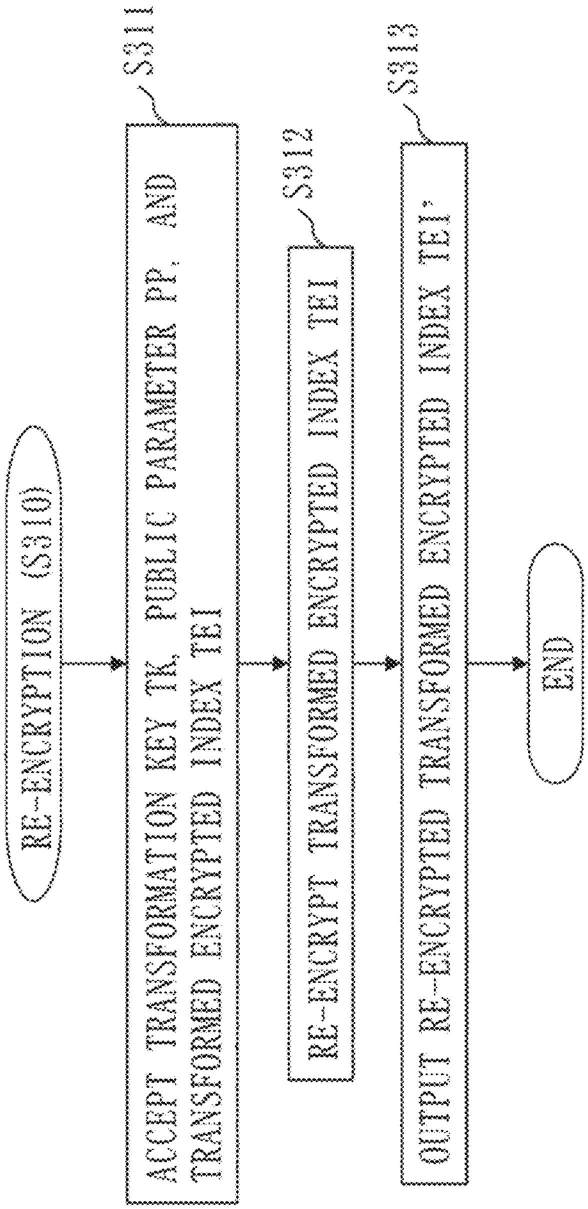
FIG. 31 is a flowchart illustrating a procedure for re-encryption according to Embodiment 2.

FIG. 31 is a flowchart illustrating a procedure for re-encryption (S310) according to this embodiment.

The re-encryption (S310) is a process executed by the re-encryption device 900.

In step S311, the acceptance unit 910 accepts the transformation key TK, the public parameter PP, and the transformed encrypted index TEI, and saves and stores the transformation key TK and the public parameter PP in the storage unit 990.

More than one transformed encrypted index TEI may be accepted. In that case, step S312 and step S313 are executed for each transformed encrypted index TEI.

In step S312, the re-encryption unit 920 re-encrypts the transformed encrypted index TEI using the transformation key TK and the public parameter PP so as to generate a re-encrypted transformed encrypted index TEI'.

Specifically, the re-encryption unit 920 calculates the re-encrypted transformed encrypted index TEI' for the transformed encrypted index TEI={(Tkey, Tval)}, as indicated below.

The following is calculated for each (Tkey, Tval)=((Tkey1, Tkey2), (Tval1, Tval2)).

$$Tkey' = (Tkey1', Tkey2')$$

$$Tkey1' = Tkey1^{\wedge}TK \bmod N$$

$$Tkey2' = Tkey2$$

$$Tval' = (Tval1', Tval2')$$

$$Tval1' = Tval1^{\wedge}TK \bmod N$$

$$Tval2' = Tval2$$

If Tkey and Tval also need to be randomized to enhance security in re-encryption, this is calculated as indicated below.

First, integers RR1 and RR2 are randomly selected from a set of integers of 1 to (N−1) {1, 2, . . . , N−1}.

Next, the following is calculated for each (Tkey', Tval').

$$Tkey' = (Tkey1', Tkey2')$$

$$Tkey1' = Tkey1^{\wedge}(TK * RR1) \bmod N$$

$$Tkey2' = Tkey2 * RR1$$

$$Tval' = (Tval1', Tval2')$$

$$Tval1' = Tval1^{\wedge}(TK * RR2) \bmod N$$

$$Tval2' = Tval2 * RR2$$

In step S313, the output unit 930 outputs the re-encrypted transformed encrypted index TEI'.

In particular, the re-encrypted transformed encrypted index TEI' is stored by being replaced with the transformed encrypted index TEI registered in the registration database 691A in the storage unit 990 of the data management device 600.

*Description of Effect of the Embodiment*

The searchable encryption system according to this embodiment provides the following effect in addition to substantially the same effects as those of Embodiment 1. Identifiers that match search keywords can be collectively extracted without decrypting ciphertexts.

*Supplement to Embodiments*

Figure 32:
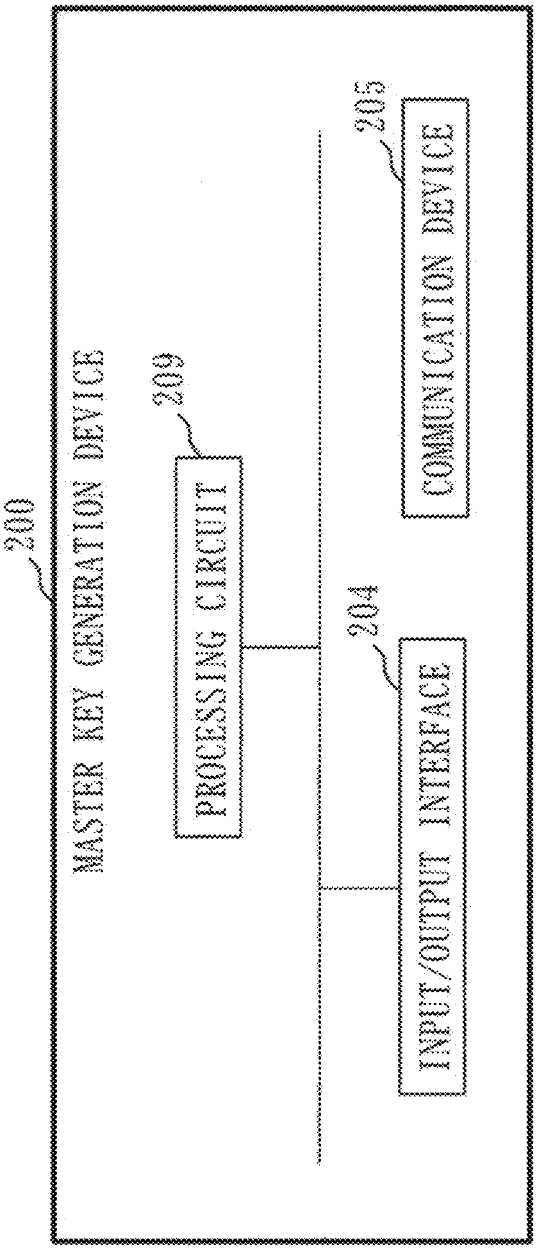
FIG. 32 is a figure illustrating an example of a hardware configuration of the master key generation device according to the embodiments.

FIG. 32 is a figure illustrating an example of a hardware configuration of the master key generation device 200 according to this embodiment. The master key generation device 200 includes a processing circuit 209. The processing circuit 209 is hardware that realizes the acceptance unit 210, the generation unit 220, and the output unit 230.

The processing circuit 209 may be dedicated hardware, or may be the processor 201 that executes programs stored in the memory 202.

When the processing circuit 209 is dedicated hardware, the processing circuit 209 is, for example, a single circuit, a composite circuit, a programmed processor, a parallel-programmed processor, an ASIC, an FPGA, or a combination of these.

ASIC is an abbreviation for application specific integrated circuit. FPGA is an abbreviation for field programmable gate array.

The master key generation device 200 may include a plurality of processing circuits as an alternative to the processing circuit 209.

In the processing circuit 209, some functions may be realized by dedicated hardware and the remaining functions may be realized by software or firmware.

As described above, the functions of the master key generation device 200 can be realized by hardware, software, firmware, or a combination of these.

Figure 33:
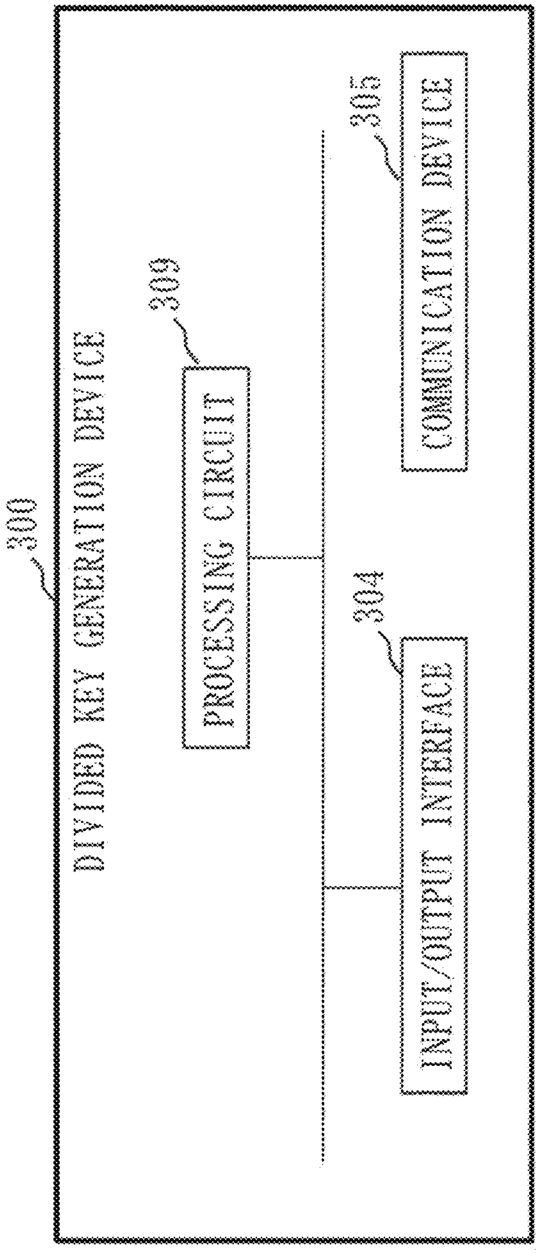
FIG. 33 is a figure illustrating an example of a hardware configuration of the divided key generation device according to the embodiments.

FIG. 33 is a figure illustrating an example of a hardware configuration of the divided key generation device 300 according to this embodiment.

The divided key generation device 300 includes a processing circuit 309.

The processing circuit 309 is hardware that realizes the acceptance unit 310, the divided key generation unit 320, and the output unit 330.

The processing circuit 309 may be dedicated hardware, or may be the processor 301 that executes programs stored in the memory 302.

When the processing circuit 309 is dedicated hardware, the processing circuit 309 is, for example, a single circuit, a composite circuit, a programmed processor, a parallel-programmed processor, an ASIC, an FPGA, or a combination of these.

The divided key generation device 300 may include a plurality of processing circuits as an alternative to the processing circuit 309.

In the processing circuit 309, some functions may be realized by dedicated hardware and the remaining functions may be realized by software or firmware.

As described above, the functions of the divided key generation device 300 can be realized by hardware, software, firmware, or a combination of these.

Figure 34:
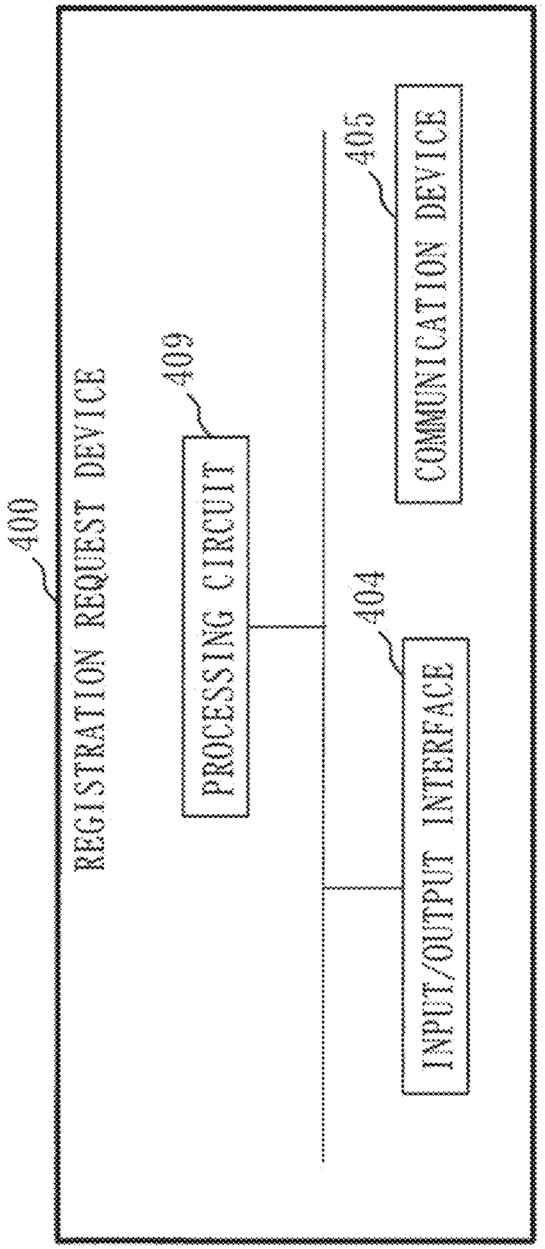
FIG. 34 is a figure illustrating an example of a hardware configuration of the registration request device according to the embodiments.

FIG. 34 is a figure illustrating an example of a hardware configuration of the registration request device 400 according to this embodiment.

The registration request device 400 includes a processing circuit 409.

The processing circuit 409 is hardware that realizes the acceptance unit 410, the generation unit 420, and the request unit 430.

The processing circuit 409 may be dedicated hardware, or may be the processor 401 that executes programs stored in the memory 402.

When the processing circuit 409 is dedicated hardware, the processing circuit 409 is, for example, a single circuit, a composite circuit, a programmed processor, a parallel-programmed processor, an ASIC, an FPGA, or a combination of these.

The registration request device 400 may include a plurality of processing circuits as an alternative to the processing circuit 409.

In the processing circuit 409, some functions may be realized by dedicated hardware and the remaining functions may be realized by software or firmware.

As described above, the functions of the registration request device 400 can be realized by hardware, software, firmware, or a combination of these.

Figure 35:
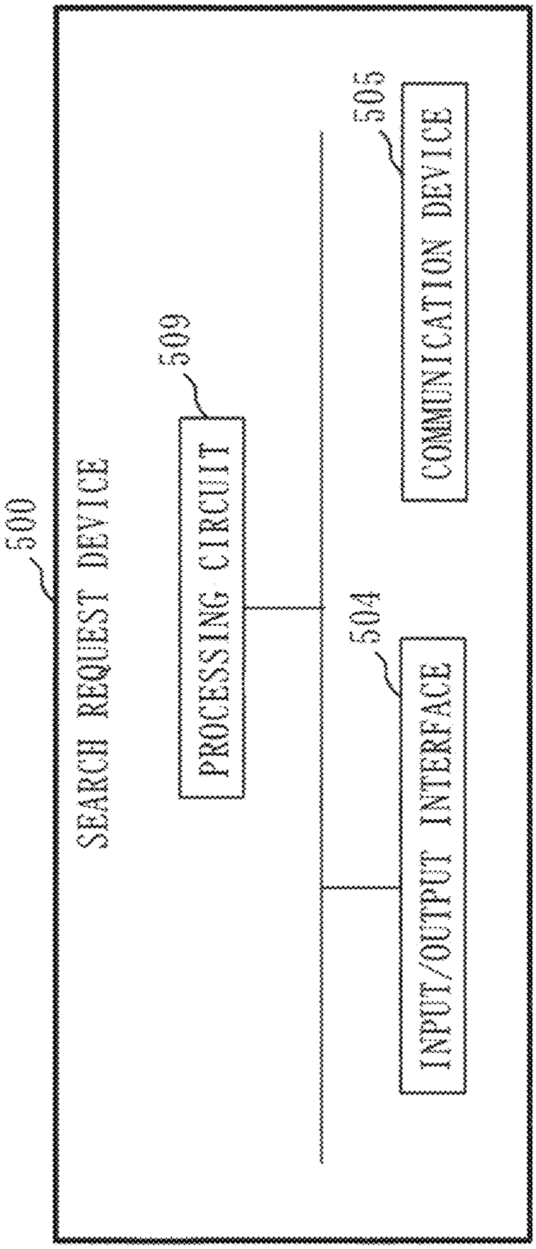
FIG. 35 is a figure illustrating an example of a hardware configuration of the search request device according to the embodiments.

FIG. 35 is a figure illustrating an example of a hardware configuration of the search request device 500 according to this embodiment.

The search request device 500 includes a processing circuit 509.

The processing circuit 509 is hardware that realizes the acceptance unit 510, the generation unit 520, the request unit 530, and the output unit 540.

The processing circuit 509 may be dedicated hardware, or may be the processor 501 that executes programs stored in the memory 502.

When the processing circuit 509 is dedicated hardware, the processing circuit 509 is, for example, a single circuit, a composite circuit, a programmed processor, a parallel-programmed processor, an ASIC, an FPGA, or a combination of these.

The search request device 500 may include a plurality of processing circuits as an alternative to the processing circuit 509.

In the processing circuit 509, some functions may be realized by dedicated hardware and the remaining functions may be realized by software or firmware.

As described above, the functions of the search request device 500 may be realize by hardware, software, firmware, or a combination of these.

Figure 36:
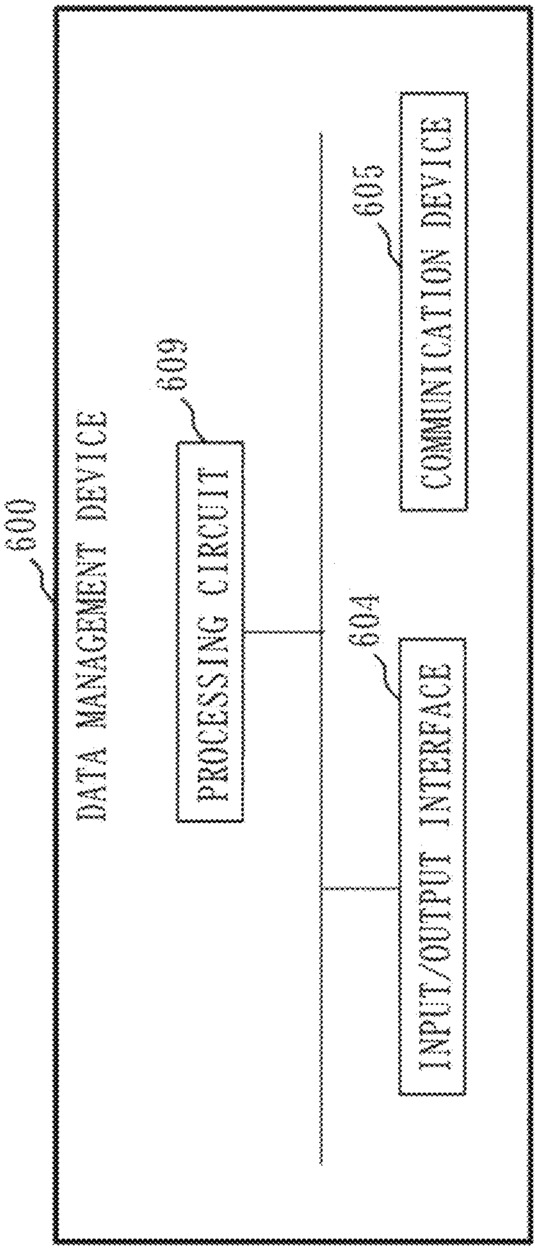
FIG. 36 is a figure illustrating an example of a hardware configuration of the data management device according to the embodiments.

FIG. 36 is a figure illustrating an example of a hardware configuration of the data management device 600 according to this embodiment.

The data management device 600 includes a processing circuit 609.

The processing circuit 609 is hardware that realizes the acceptance unit 610, the key management unit 620, the registration unit 630, the search unit 640, and the output unit 650.

The processing circuit 609 may be dedicated hardware, or may be the processor 601 that executes programs stored in the memory 602.

When the processing circuit 609 is dedicated hardware, the processing circuit 609 is, for example, a single circuit, a composite circuit, a programmed processor, a parallel-programmed processor, an ASIC, an FPGA, or a combination of these.

The data management device 600 may include a plurality of processing circuits as an alternative to the processing circuit 609.

In the processing circuit 609, some functions may be realized by dedicated hardware and the remaining functions may be realized by software or firmware.

As described above, the functions of the data management device 600 can be realized by hardware, software, firmware, or a combination of these.

Figure 37:
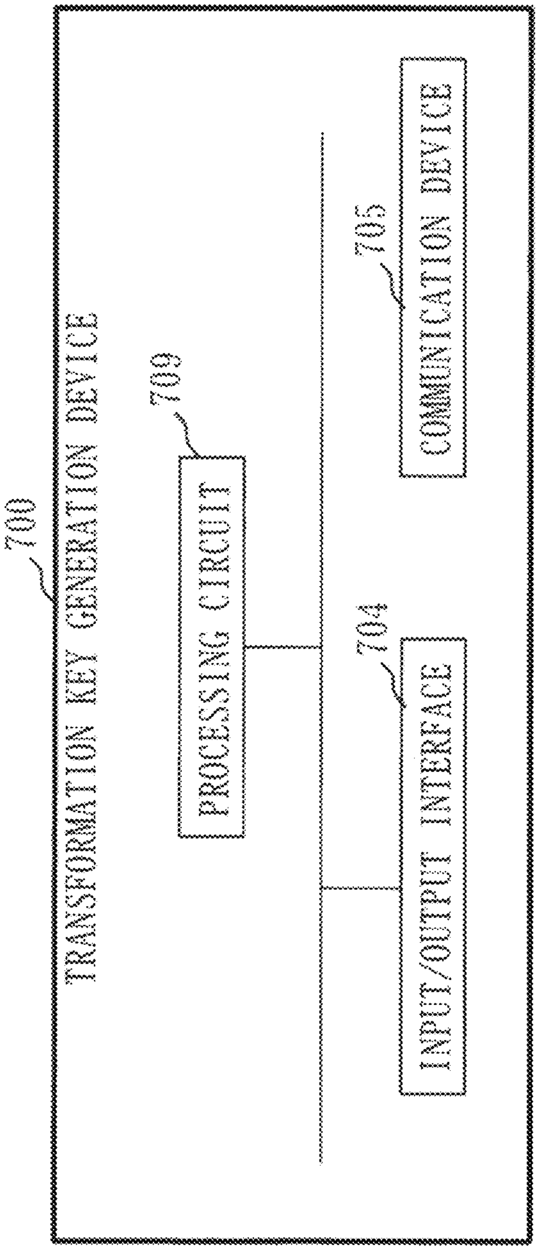
FIG. 37 is a figure illustrating an example of a hardware configuration of the transformation key generation device according to the embodiments.

FIG. 37 is a figure illustrating an example of a hardware configuration of the transformation key generation device 700 according to this embodiment.

The transformation key generation device 700 includes a processing circuit 709.

The processing circuit 709 is hardware that realizes the acceptance unit 710, the generation unit 720, and the output unit 730.

The processing circuit 709 may be dedicated hardware, or may be the processor 701 that executes programs stored in the memory 702.

When the processing circuit 709 is dedicated hardware, the processing circuit 709 is, for example, a single circuit, a composite circuit, a programmed processor, a parallel-programmed processor, an ASIC, an FPGA, or a combination of these.

The transformation key generation device 700 may include a plurality of processing circuits as an alternative to the processing circuit 709.

In the processing circuit 709, some functions may be realized by dedicated hardware and the remaining functions may be realized by software or firmware.

As described above, the functions of the transformation key generation device 700 can be realized by hardware, software, firmware, or a combination of these.

Figure 38:
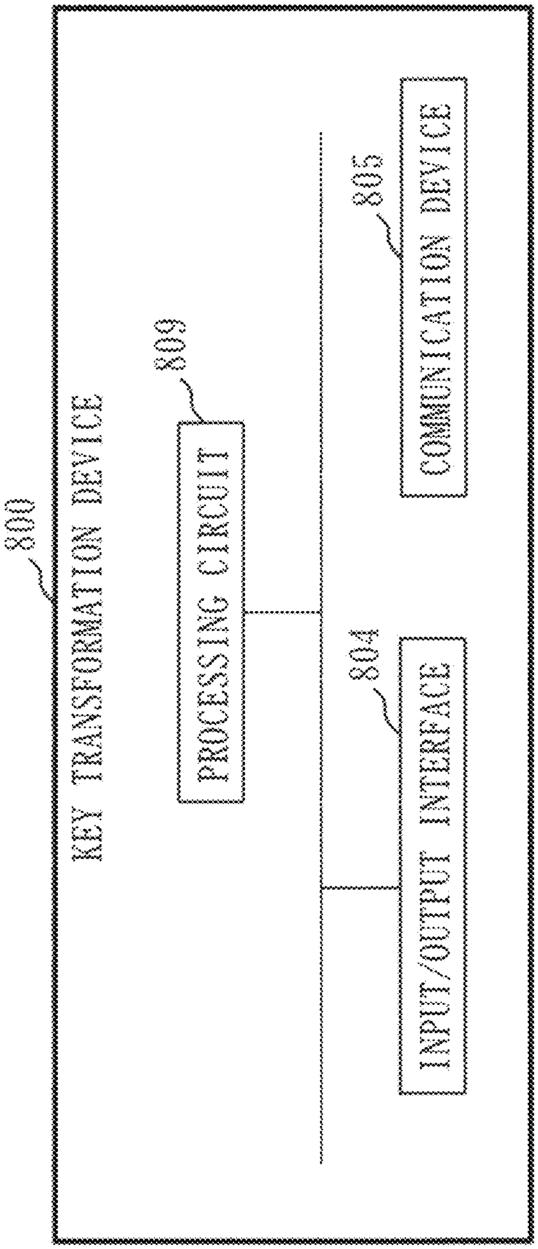
FIG. 38 is a figure illustrating an example of a hardware configuration of the key transformation device according to the embodiments.

FIG. 38 is a figure illustrating an example of a hardware configuration of the key transformation device 800 according to this embodiment.

The key transformation device 800 includes a processing circuit 809. The processing circuit 809 is hardware that realizes the acceptance unit 810, the transformation unit 820, and the output unit 830.

The processing circuit 809 may be dedicated hardware, or may be the processor 801 that executes programs stored in the memory 802.

When the processing circuit 809 is dedicated hardware, the processing circuit 809 is, for example, a single circuit, a composite circuit, a programmed processor, a parallel-programmed processor, an ASIC, an FPGA, or a combination of these.

The key transformation device 800 may include a plurality of processing circuits as an alternative to the processing circuit 809.

In the processing circuit 809, some functions may be realized by dedicated hardware and the remaining functions may be realized by software or firmware.

As described above, the functions of the key transformation device 800 can be realized by hardware, software, firmware, or a combination of these.

Figure 39:
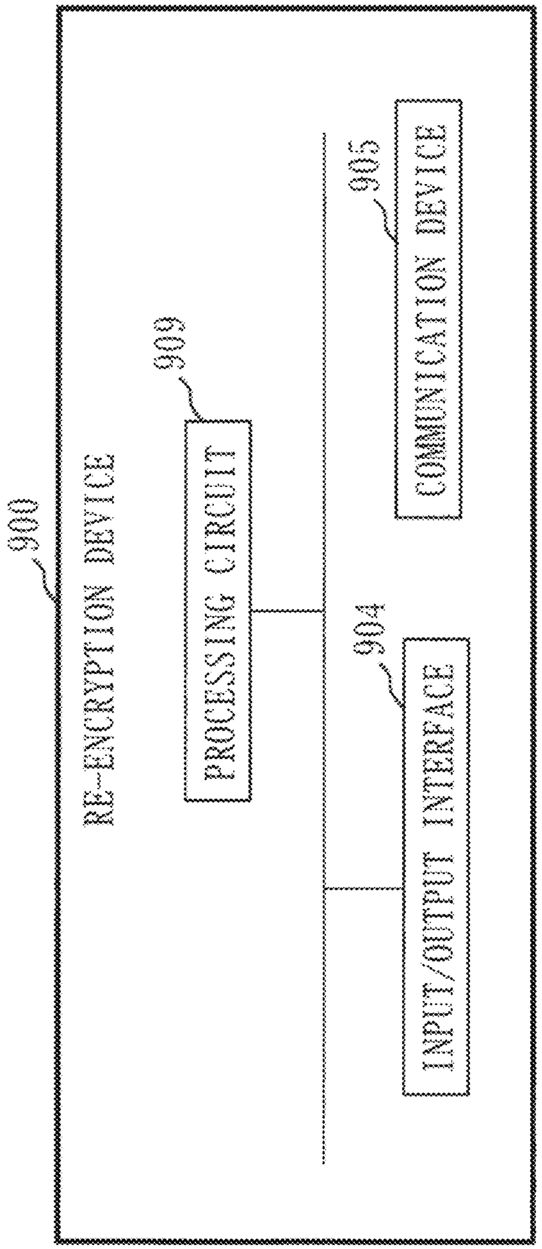
FIG. 39 is a figure illustrating an example of a hardware configuration of the re-encryption device according to the embodiments.

FIG. 39 is a figure illustrating an example of a hardware configuration of the re-encryption device 900 according to this embodiment.

The re-encryption device 900 includes a processing circuit 909.

The processing circuit 909 is dedicated hardware that realizes the acceptance unit 910, the re-encryption unit 920, and the output unit 930.

The processing circuit 909 may be dedicated hardware, or may be the processor 901 that executes programs stored in the memory 902.

When the processing circuit 909 is dedicated hardware, the processing circuit 909 is, for example, a single circuit, a composite circuit, a programmed processor, a parallel-programmed processor, an ASIC, an FPGA, or a combination of these.

The re-encryption device 900 may include a plurality of processing circuits as an alternative to the processing circuit 909.

In the processing circuit 909, some functions may be realized by dedicated hardware and the remaining functions may be realized by software or firmware.

As described above, the functions of the re-encryption device 900 can be realized by hardware, software, firmware, or a combination of these.

Each of the devices described in the embodiments may be realized with a plurality of devices. Two or more of the devices described in the embodiments may be realized with one device.

Each "unit" that is an element of each of the devices described in the embodiments may be interpreted as "process", "step", "circuit", or "circuitry".

In Embodiments 1 and 2 above, each unit of each device of the searchable encryption system has been described as an independent functional block. However, the configuration of each device of the searchable encryption system may be different from the configuration described in the above embodiments. The functional blocks of each device of the searchable encryption system may be arranged in any configuration, provided that the functions described in the above embodiments can be realized. Each device of the searchable encryption system may be a system composed of a plurality of devices, instead of one device.

Portions of Embodiments 1 and 2 may be implemented in combination. Alternatively, one portion of these embodiments may be implemented. These embodiments may be implemented as a whole or partially in any combination.

That is, in Embodiments 1 and 2, each embodiment can be freely combined, or any constituent element in each embodiment can be modified. Alternatively, in each embodiment, any constituent element can be omitted.

The embodiments described above are essentially preferable examples, and are not intended to limit the scope of the present disclosure, the scope of applications of the present disclosure, and the scope of uses of the present disclosure. The embodiments described above can be modified in various ways as necessary. For example, the procedures described using flowcharts or sequence diagrams may be modified as appropriate.

REFERENCE SIGNS LIST

100: searchable encryption system, 101: network, 200: master key generation device, 201: processor, 202: memory, 203: auxiliary storage device, 204: input/output interface, 205: communication device, 209: processing circuit, 210: acceptance unit, 220: generation unit, 230: output unit, 290: storage unit, 300: divided key generation device, 301: processor, 302: memory, 303: auxiliary storage device, 304: input/output interface, 305: communication device, 309: processing circuit, 310: acceptance unit, 320: divided key generation unit, 321: registration key generation unit, 322: registration auxiliary key generation unit, 323: search key generation unit, 324: search auxiliary key generation unit, 330: output unit, 390: storage unit, 400: registration request device, 401: processor, 402: memory, 403: auxiliary storage device, 404: input/output interface, 405: communication device, 409: processing circuit, 410: acceptance unit, 420: generation unit, 421: keyword generation unit, 422: random number generation unit, 423: encrypted tag generation unit, 424: index search result generation unit, 425: encrypted index generation unit, 430: request unit, 490: storage unit, 500: search request device, 501: processor, 502: memory, 503: auxiliary storage device, 504: input/output interface, 505: communication device, 509: processing circuit, 510: acceptance unit, 520: generation unit, 521: random number generation unit, 522: search query generation unit, 530: request unit, 540: output unit, 590: storage unit, 600: data management device, 601: processor, 602: memory, 603: auxiliary storage device, 604: input/output interface, 605: communication device, 609: processing circuit, 610: acceptance unit, 620: key management unit, 630: registration unit, 631: transformation unit, 632: storing unit, 640: search unit, 641: transformation unit, 642: checking unit, 643: extraction unit, 650: output unit, 690: storage unit, 691: registration database, 691A: registration database, 700: transformation key generation device, 701: processor, 702: memory, 703: auxiliary storage device, 704: input/output interface, 705: communication device, 709: processing circuit, 710: acceptance unit, 720: generation unit, 730: output unit, 790: storage unit, 800: key transformation device, 801: processor, 802: memory, 803: auxiliary storage device, 804: input/output interface, 805: communication device, 809: processing circuit, 810: acceptance unit, 820: transformation unit, 830: output unit, 890: storage unit, 900: re-encryption device, 901: processor, 902: memory, 903: auxiliary storage device, 904: input/output interface, 905: communication device, 909: processing circuit, 910: acceptance unit, 920: re-encryption unit, 930: output unit, 990: storage unit.

The invention claimed is:

1. A searchable encryption system comprising:

a registration request device comprising first processing circuitry to acquire a registration key EK1 of a registration secret key EK, plaintext data, and a public parameter, and encrypt the plaintext data using the registration key EK1 and the public parameter so as to generate encrypted data, the registration secret key EK being generated using a master key and the public parameter, and being composed of the registration key EK1 used for encrypting data and a registration auxiliary key EK2 used for transforming encrypted data, the registration key EK1 being EK1=G^ek1 mod N, where G, ek1, and N are positive integers obtained based on the master key and the public parameter, the registration auxiliary key EK2 being an integer from 1 to (Z−1) with which X=ek1*EK2 mod Z, where X and Z are positive integers obtained based on the master key and the public parameter; and a data management device comprising second processing circuitry to acquire the registration auxiliary key EK2, the public parameter, and the encrypted data, transform the encrypted data using the registration auxiliary key EK2 and the public parameter, and register transformed encrypted data obtained by transformation in a registration database in association with an identifier that identifies the plaintext data.

2. The searchable encryption system according to claim 1, wherein the first processing circuitry of the registration request device generates a random number using the public parameter, the random number being used for generating the encrypted data, and generates the encrypted data using the registration key EK1, the public parameter, and the random number.

3. The searchable encryption system according to claim 2, wherein the first processing circuitry of the registration request device encrypts a registration keyword contained in the plaintext data using the registration key EK1, the public parameter, and the random number, and generates an encrypted tag obtained by encryption as the encrypted data.

4. The searchable encryption system according to claim 2, wherein the first processing circuitry of the registration request device encrypts an index search result that indicates, in an index structure, a result of searching for a plurality of pieces of plaintext data based on a registration keyword contained in each piece of the plurality of pieces of plaintext data, using the registration key EK1, the public parameter, and the random number, and generates an encrypted index obtained by encryption as the encrypted data.

5. The searchable encryption system according to claim 1, further comprising:

a search request device comprising third processing circuitry to acquire a search key SK1 of a search secret key SK, a search keyword, and the public parameter, and generate a search query based on the search keyword and using the search key SK1 and the public parameter, the search secret key SK being generated using the master key and the public parameter, and being composed of the search key SK1 for generating a query used for a search based on a keyword used for the search and a search auxiliary key SK2 used for transforming the generated query, the search key SK1 being SK1=G^sk1 mod N, where sk1 is a positive integer obtained based on the master key and the public parameter, the search auxiliary key SK2 being an integer from 1 to (Z−1) with which X=sk1*SK2 mod Z, wherein the second processing circuitry of the data management device acquires the search query, the search auxiliary key SK2, and the public parameter, transforms the search query using the search auxiliary key SK2 and the public parameter, checks a transformed search query obtained by transformation against the transformed encrypted data registered in the registration database, extracts an identifier corresponding to the transformed encrypted data that matches the transformed search query, and outputs the extracted identifier as a search result to the search request device.

6. The searchable encryption system according to claim 5, wherein the third processing circuitry of the search request device generates a random number using the public parameter, the random number being used for generating the search query, and generates the search query using the search key SK1, the public parameter, and the random number.

7. The searchable encryption system according to claim 5, further comprising:

a key transformation device comprising fourth processing circuitry to perform key transformation of the master key, the registration secret key EK, and the search secret key SK, using a transformation key generated from the public parameter, and output a key-transformed master key, a key-transformed registration secret key EK, and a key-transformed search secret key SK obtained by key transformation; and a re-encryption device comprising fifth processing circuitry to acquire the transformation key, the public parameter, and the transformed encrypted data, re-encrypt the transformed encrypted data using the transformation key and the public parameter, and output re-encrypted transformed encrypted data obtained by re-encryption, wherein the second processing circuitry of the data management device acquires the re-encrypted transformed encrypted data from the re-encryption device, and replaces the transformed encrypted data registered in the registration database with the re-encrypted transformed encrypted data.

8. The searchable encryption system according to claim 7, further comprising a divided key generation device comprising sixth processing circuitry to generate the registration secret key EK and the search secret key SK using the master key and the public parameter, wherein the sixth processing circuitry of the divided key generation device randomly re-generates the registration secret key EK and the search secret key SK using the master key and the public parameter.

9. The searchable encryption system according to claim 1, wherein the second processing circuitry of the data management device acquires an identifier that identifies plaintext data to be deleted from the registration database, and deletes transformed encrypted data corresponding to the identifier from the registration database.

10. A data management device comprising:

processing circuitry to acquire a registration auxiliary key EK2 of a registration secret key EK, a public parameter, and encrypted data that is plaintext data encrypted using a registration key EK1 of the registration secret key EK and the public parameter, transform the encrypted data using the registration auxiliary key EK2 and the public parameter, and register transformed encrypted data obtained by transformation in a registration database in association with an identifier that identifies the plaintext data, the registration secret key EK being generated using a master key and the public parameter, and being composed of the registration key EK1 used for encrypting data and the registration auxiliary key EK2 used for transforming encrypted data, the registration key EK1 being EK1=G^ek1 mod N, where G, ek1, and N are positive integers obtained based on the master key and the public parameter, the registration auxiliary key EK2 being an integer from 1 to (Z−1) with which X=ek1*EK2 mod Z, where X and Z are positive integers obtained based on the master key and the public parameter.

11. The data management device according to claim 10, wherein the processing circuitry acquires a search auxiliary key SK2 of a search secret key SK, the public parameter, and a search query generated based on a search keyword and using a search key SK1 of the search secret key SK and the public parameter, transforms the search query using the search auxiliary key SK2 and the public parameter, checks a transformed search query obtained by transformation against the transformed encrypted data, and extracts an identifier corresponding to transformed encrypted data that matches the transformed search query, the search secret key SK being generated using the master key and the public parameter, and being composed of the search key SK1 for generating a query used for a search based on a keyword used for the search and the search auxiliary key SK2 used for transforming the generated query, the search key SK1 being SK1=G^sk1 mod N, where sk1 is a positive integer obtained based on the master key and the public parameter, the search auxiliary key SK2 being an integer from 1 to (Z−1) with which X=sk1*SK2 mod Z.

12. A searchable encryption method comprising:

acquiring a registration key EK1 of a registration secret key EK, plaintext data, and a public parameter, and encrypting the plaintext data using the registration key EK1 and the public parameter so as to generate encrypted data, the registration secret key EK being generated using a master key and the public parameter, and being composed of the registration key EK1 used for encrypting data and a registration auxiliary key EK2 used for transforming encrypted data, the registration key EK1 being EK1=G^ek1 mod N, where G, ek1, and N are positive integers obtained based on the master key and the public parameter, the registration auxiliary key EK2 being an integer from 1 to (Z−1) with which X=ek1*EK2 mod Z, where X and Z are positive integers obtained based on the master key and the public parameter; and acquiring the registration auxiliary key EK2, the public parameter, and the encrypted data, transforming the encrypted data using the registration auxiliary key EK2 and the public parameter, and registering transformed encrypted data obtained by transformation in a registration database in association with an identifier that identifies the plaintext data.

13. A non-transitory computer readable medium storing a searchable encryption program that causes a computer to execute:

a registration request process of acquiring a registration key EK1 of a registration secret key EK, plaintext data, and a public parameter, and encrypting the plaintext data using the registration key EK1 and the public parameter so as to generate encrypted data, the registration secret key EK being generated using a master key and the public parameter, and being composed of the registration key EK1 used for encrypting data and a registration auxiliary key EK2 used for transforming encrypted data, the registration key EK1 being EK1=G^ek1 mod N, where G, ek1, and N are positive integers obtained based on the master key and the public parameter, the registration auxiliary key EK2 being an integer from 1 to (Z−1) with which X=ek1*EK2 mod Z, where X and Z are positive integers obtained based on the master key and the public parameter; and a data management process of acquiring the registration auxiliary key EK2, the public parameter, and the encrypted data, transforming the encrypted data using the registration auxiliary key EK2 and the public parameter, and registering transformed encrypted data obtained by transformation in a registration database in association with an identifier that identifies the plaintext data.

* * * * *